(12) United States Patent
Hishinuma et al.

(10) Patent No.: US 12,501,033 B2
(45) Date of Patent: Dec. 16, 2025

(54) IMAGE PROCESSING DEVICE AND METHOD FOR PARTITIONING A CODING UNIT USED FOR INTER PREDICTION BASED ON BI-DIRECTIONAL OPTICAL FLOW INTO PARTITIONED PROCESSING UNITS

(71) Applicant: Sony Group Corporation, Tokyo (JP)

(72) Inventors: Sinsuke Hishinuma, Kanagawa (JP); Kenji Kondo, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 18/398,418

(22) Filed: Dec. 28, 2023

(65) Prior Publication Data

US 2024/0129459 A1 Apr. 18, 2024

Related U.S. Application Data

(63) Continuation of application No. 17/312,405, filed as application No. PCT/JP2019/049090 on Dec. 16, 2019, now abandoned.

(30) Foreign Application Priority Data

Dec. 28, 2018 (JP) .................. 2018-248147

(51) Int. Cl.
*H04N 19/109* (2014.01)
*H04N 19/119* (2014.01)
(Continued)

(52) U.S. Cl.
CPC ......... *H04N 19/109* (2014.11); *H04N 19/119* (2014.11); *H04N 19/176* (2014.11); *H04N 19/436* (2014.11); *H04N 19/577* (2014.11)

(58) Field of Classification Search
CPC .. H04N 19/109; H04N 19/119; H04N 19/176; H04N 19/433; H04N 19/436; H04N 19/567; H04N 19/577
See application file for complete search history.

(56) References Cited

U.S. PATENT DOCUMENTS 11,563,958 B2   1/2023  Abe
2012/0263231 A1  10/2012  Zhou
(Continued)

FOREIGN PATENT DOCUMENTS

JP   2012-248996 A  12/2012
WO  2012/046435 A1   4/2012
(Continued)

OTHER PUBLICATIONS

International Search Report and Written Opinion mailed on Mar. 3, 2020, received for PCT Application PCT/JP2019/049090, Filed on Dec. 16, 2019, 10 pages including English Translation.
(Continued)

*Primary Examiner* — Jessica M Prince
(74) *Attorney, Agent, or Firm* — XSENSUS LLP

(57) ABSTRACT

The present technology relates to image processing device and method that achieve a reduction in a buffer size.
The image processing device partitions a unit of processing into partitioned processing units each of which corresponds to a VPDU size or is equal to or smaller than the VPDU size, the unit of processing being used for calculation of a cost that is used for determining whether or not to perform bidirectional prediction. The image processing device makes the determination by using the cost calculated based on the partitioned processing units. The present technology is applicable to encoding devices or decoding devices.

20 Claims, 41 Drawing Sheets

(51) Int. Cl.
*H04N 19/176* (2014.01)
*H04N 19/436* (2014.01)
*H04N 19/577* (2014.01)

(56) References Cited

U.S. PATENT DOCUMENTS

| | | | |
|---|---|---|---|
| 2017/0127061 | A1 | 5/2017 | Miyamoto |
| 2018/0131931 | A1 | 5/2018 | Kondo |
| 2019/0141333 | A1 | 5/2019 | Lee |
| 2020/0021841 | A1 | 1/2020 | Leontaris et al. |
| 2020/0195923 | A1 | 6/2020 | Miyagi et al. |
| 2020/0221122 | A1 | 7/2020 | Ye et al. |
| 2020/0382795 | A1 | 12/2020 | Zhang et al. |
| 2021/0029378 | A1* | 1/2021 | He .............. H04N 19/176 |
| 2021/0243458 | A1 | 8/2021 | Abe et al. |
| 2021/0281865 | A1* | 9/2021 | Liu ............... H04N 19/51 |
| 2021/0368172 | A1* | 11/2021 | Lim .............. H04N 19/46 |
| 2022/0060744 | A1 | 2/2022 | Lee et al. |

FOREIGN PATENT DOCUMENTS

| | | |
|---|---|---|
| WO | 2018/173895 A1 | 9/2018 |
| WO | WO-2020085235 A1 | 4/2020 |

OTHER PUBLICATIONS

Xiu et al., "CE9-related: Complexity reduction and bit-width control for bi-directional optical flow (BIO)", Joint Video Experts Team (JVET) of ITU-T SG 16 WP 3 and ISO/IEC JTC 1/SC 29/WG 11, JVET-L0256_v2, Oct. 3-12, pp. 1-15.

Hsu et al., "CE1-related: Constraint for binary and ternary partitions", Joint Video Experts Team (JVET) of ITU-T SG 16 WP 3 and ISO/IEC JTC 1/SC 29/WG 11, JVET-K0556-v2, Jul. 10-18, 2018, pp. 1-3.

Kondo et al., "Non-CE9: On early termination for BDOF", Joint Video Experts Team (JVET) of ITU-TSG 16 WP3 and ISO/IEC JTC 1/SC 29/WG 11, JVET-M0073-r2, Jan. 9-18, 2019, pp. 1-5.

Chen et al., "CE9-related: BDOF buffer reduction and enabling VPDU based application", Joint Video Experts Team (JVET) of ITU-T SG 16 WP 3 and ISO/IEC JTC 1/SC 29/WVG 11, JVET-M0890-v2, Jan. 9-18, 2019, pp. 1-3.

Chen et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11, JVET-L1002-v1, Oct. 3-12, 2018, pp. 1-37.

Kondo (Sony) K et al, "CE9-2.2: On early termination of BDOF", 14. JVET Meeting; Mar. 19, 2019-Mar. 27, 2019 Geneva; (The Joint Video Exploration Team of ISO/IEC JTC1/SC29/WG11 and ITU-T SG. 16 WP 3). No. JVET-N0187, Mar. 12, 2019 (Mar. 12, 2019), XP030202672, pp. 1-8.

U.S. Appl. No. 62/748,623, filed Oct. 22, 2018, Abe Kiyofumi.

* cited by examiner

F I G. 8
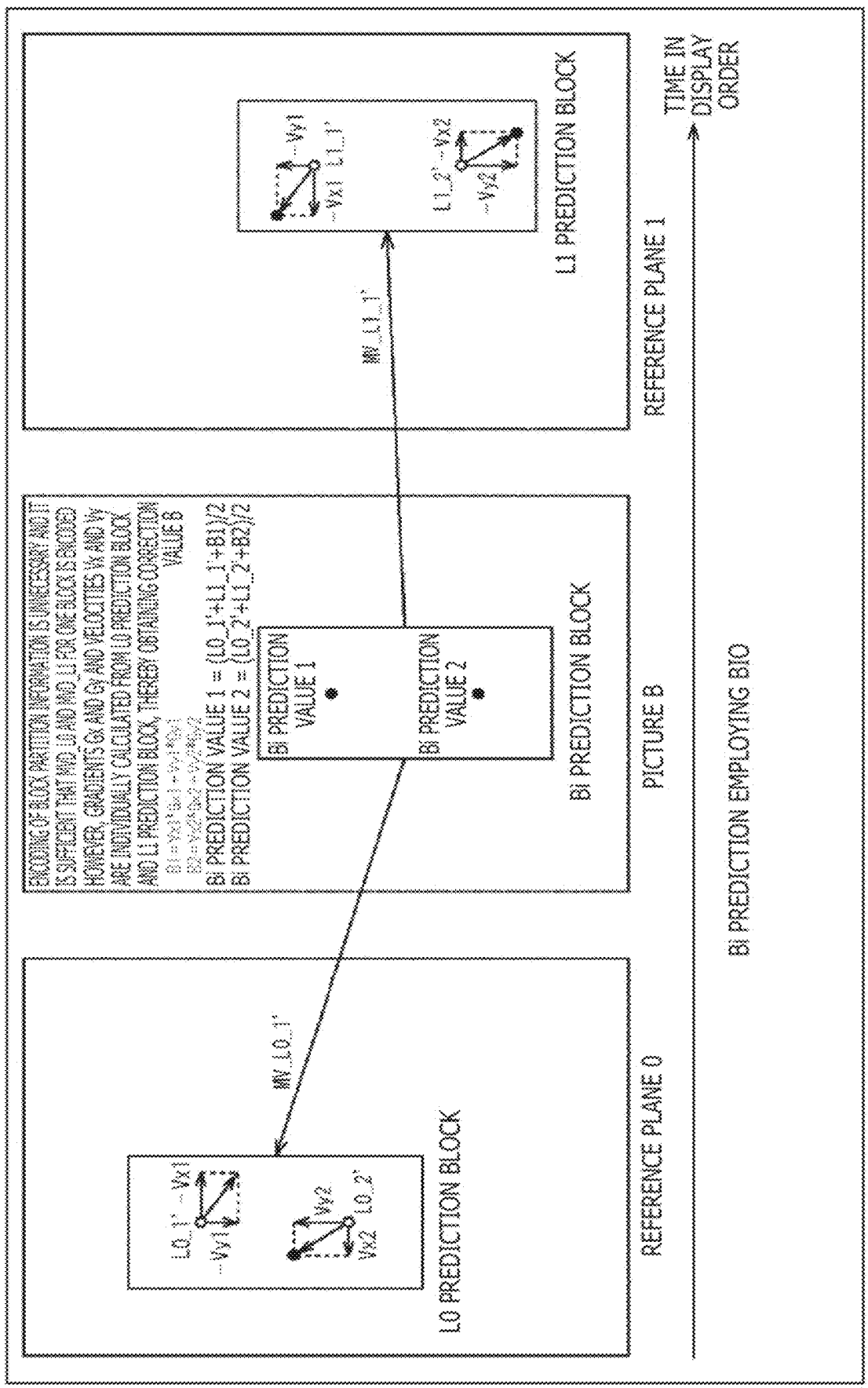

FIG.19

| PU SIZE | vPU NUMBER | PROCESSING POSITION AND SIZE |
|---|---|---|
| 128x128 | 0 | UPPER LEFT 64x64 |
| | 1 | UPPER RIGHT 64x64 |
| | 2 | LOWER LEFT 64x64 |
| | 3 | LOWER RIGHT 64x64 |
| 128x64 | 0 | LEFT 64x64 |
| | 1 | RIGHT 64x64 |
| 64x128 | 0 | TOP 64x64 |
| | 1 | BOTTOM 64x64 |
| 64x64 OR LESS | 0 | PU ITSELF |

FIG.22
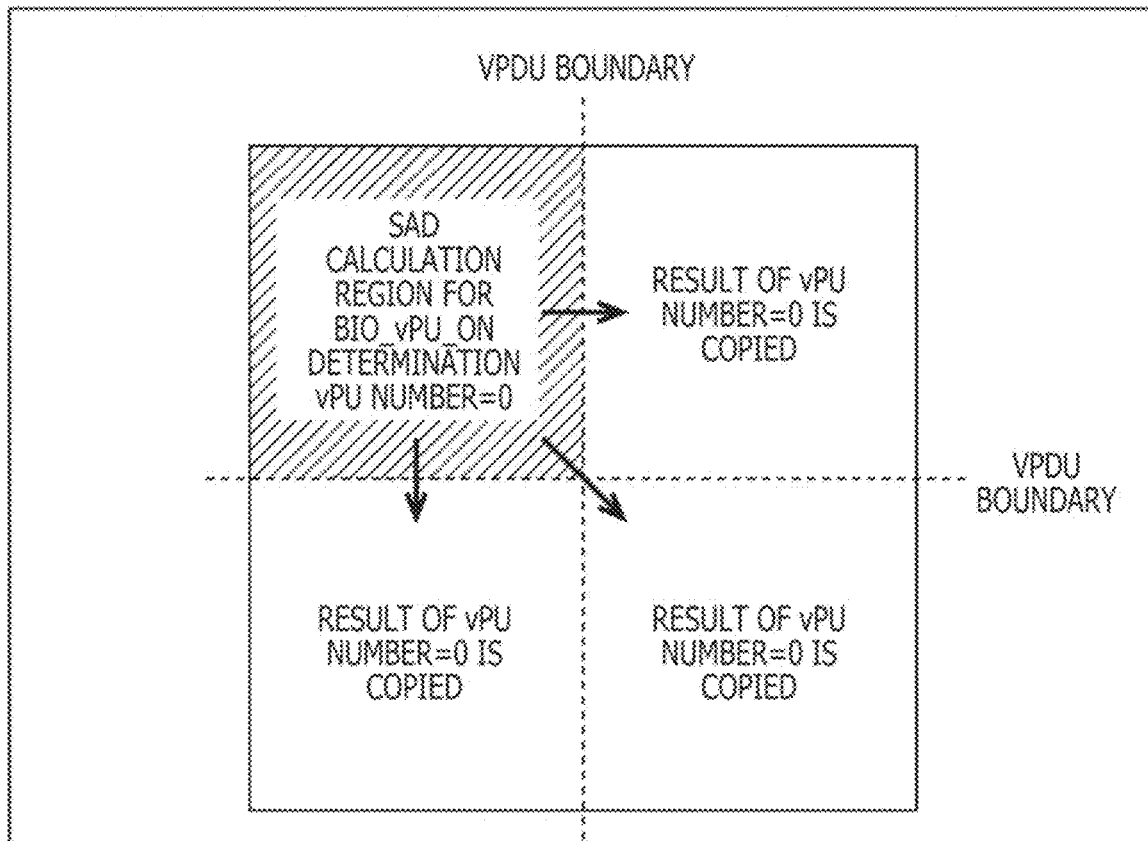
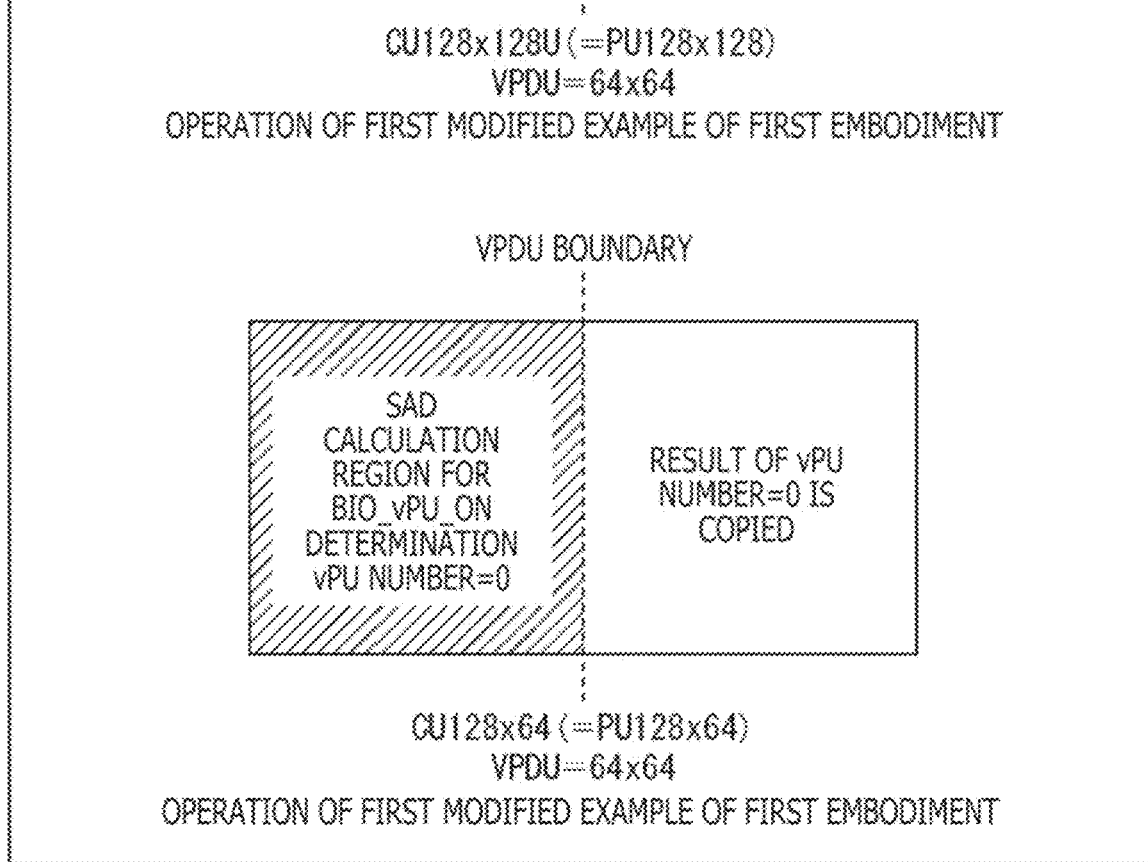

FIG.23
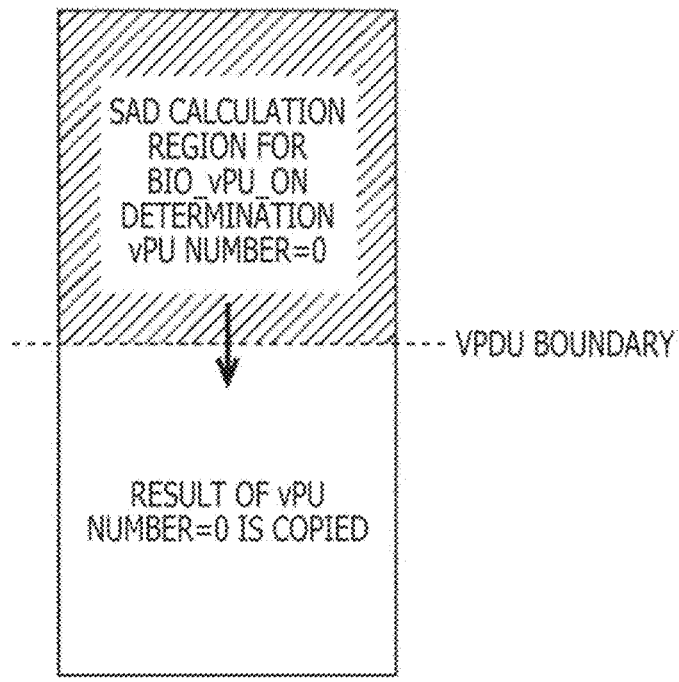
CU64×128 (=PU64×128)
VPDU=64×64
OPERATION OF FIRST MODIFIED
EXAMPLE OF FIRST EMBODIMENT
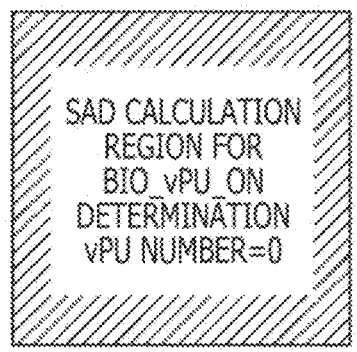
VPDU=64×64
OPERATION OF FIRST MODIFIED
EXAMPLE OF FIRST EMBODIMENT FIG.26
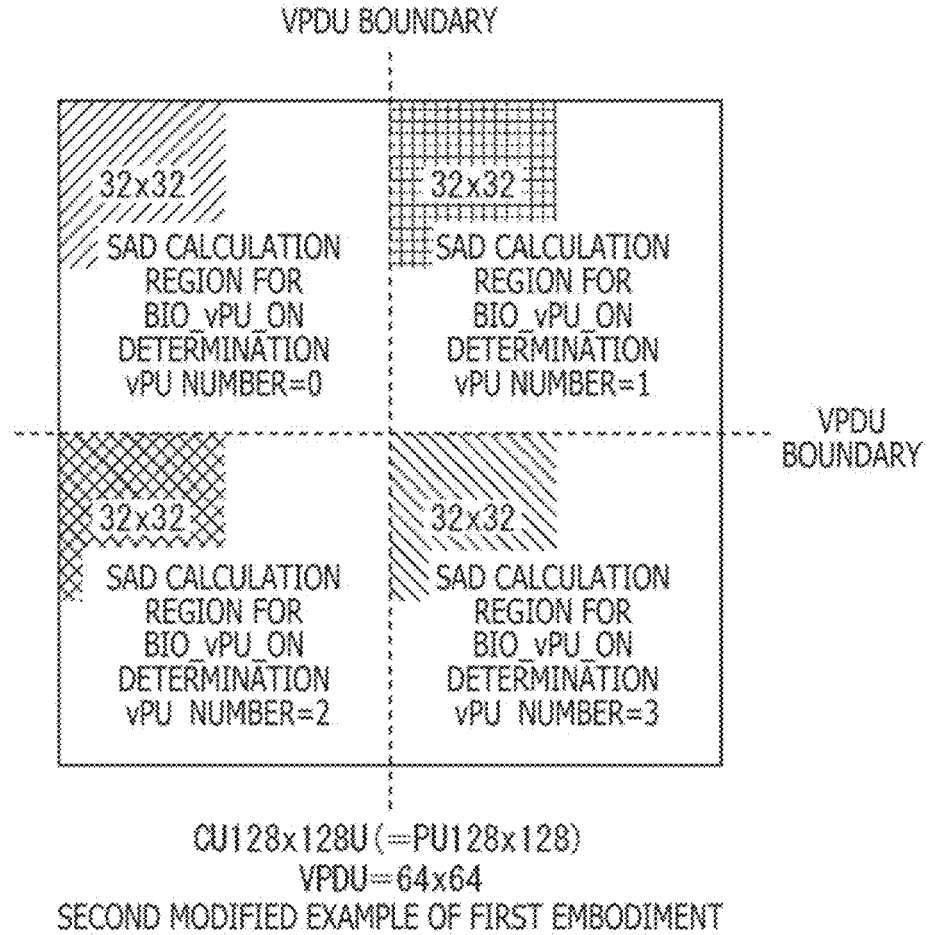
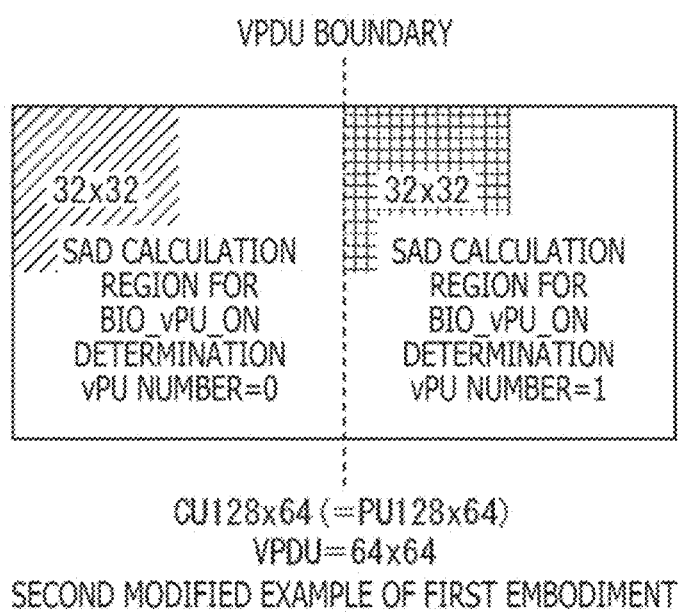

FIG.27
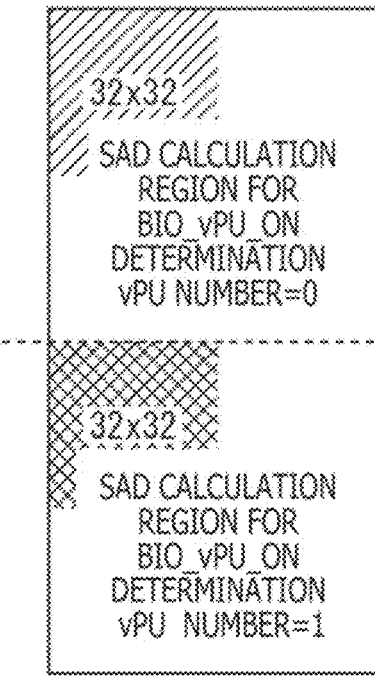
CU64×128 (=PU64×128)
VPDU=64×64
SECOND MODIFIED EXAMPLE OF SECOND EMBODIMENT
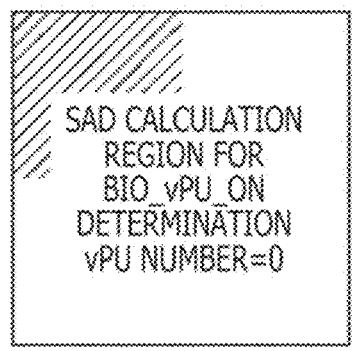
VPDU=64×64
SECOND MODIFIED EXAMPLE OF SECOND EMBODIMENT

FIG.32

| BIO_MAX_SAD_BLOCK_SIZE | sPU SIZE |
|---|---|
| 0 | 8x8 |
| 1 | 16x16 |
| 2 | 32x32 |
| 3 | 64x64 |

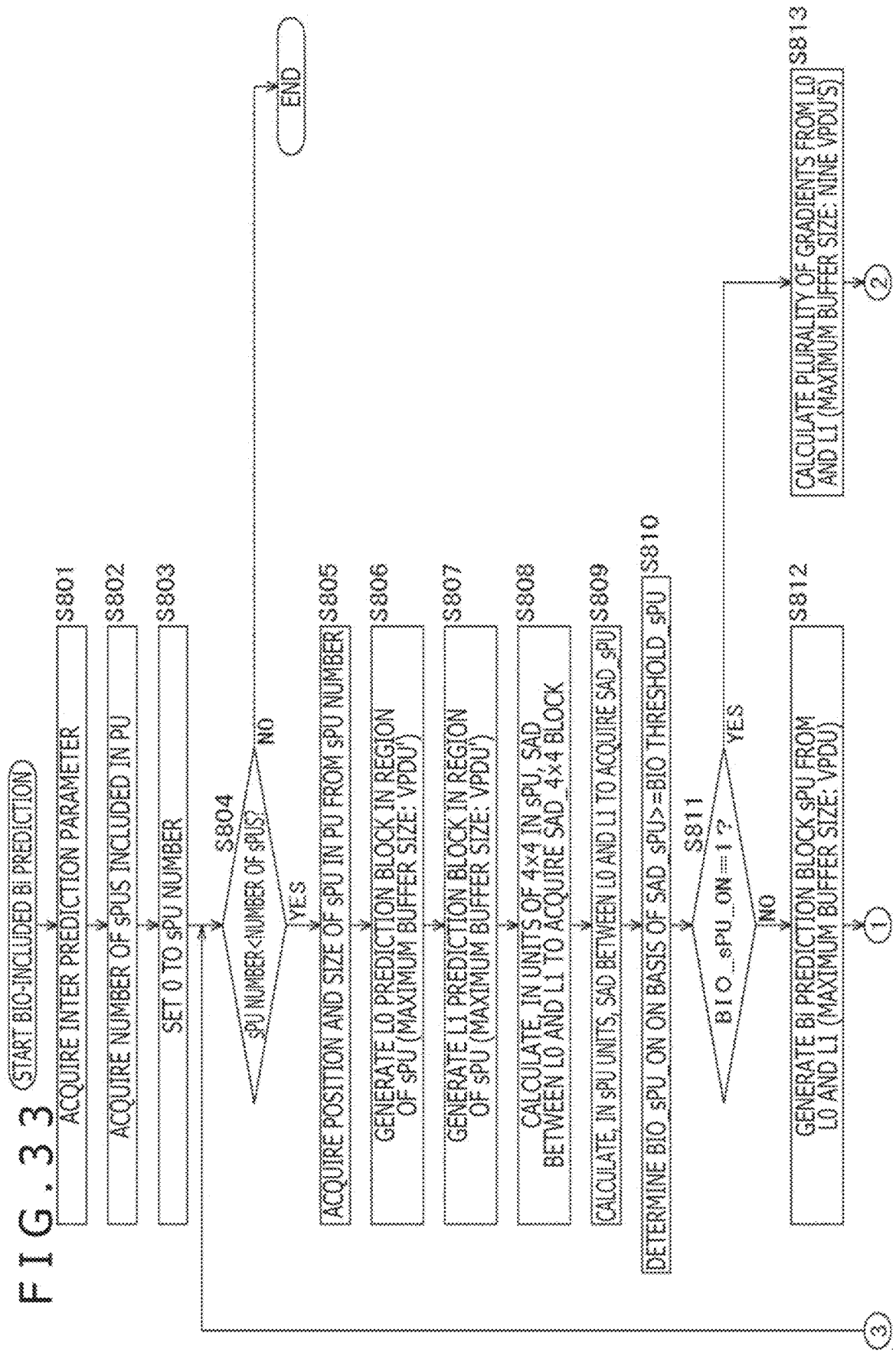

F I G . 3 4

IMAGE PROCESSING DEVICE AND METHOD FOR PARTITIONING A CODING UNIT USED FOR INTER PREDICTION BASED ON BI-DIRECTIONAL OPTICAL FLOW INTO PARTITIONED PROCESSING UNITS

CROSS-REFERENCE TO RELATED APPLICATIONS

The present application is a continuation of U.S. application Ser. No. 17/312,405, filed Jun. 10, 2021, which is based on PCT filing PCT/JP2019/049090, filed Dec. 16, 2019, which claims priority to JP 2018-248147, filed Dec. 28, 2018, the entire contents of each are incorporated herein by reference.

TECHNICAL FIELD

The present technology relates to image processing device and method, in particular, to image processing device and method that achieve a reduction in a buffer size.

BACKGROUND ART

The VVC standard that is a next-generation codec has been developed as a successor to AVC/H.264 and HEVC/H.265.

In the VVC standard in which large CUs (Coding Units) up to 128×128 are employed, the concept of VPDUs (Virtual Pipeline Data Units) has also been introduced in consideration of increases in circuit scale and power consumption in HW decoder implementation, in particular.

The VPDU size is a buffer size that allows smooth processing on each pipeline stage. The VPDU size is often set to the maximum size of TUs (Transform Units).

In VVC, the maximum TU size is 64×64, and the same is assumed to hold true for VPDUs. In VVC, one CU corresponds to one PU, and hence inter prediction processing is required to be performed on PUs larger than VPDUs. Even in this case, the PU can be partitioned into virtual vPUs (virtual PUs) to be processed. VVC is consistent with VPDUs and has been able to be implemented with reasonable HW resources until BIO (Bi-directional optical flow) described later has been employed.

The optical flow method is an image processing method for detecting the motion of an object in a moving image, to thereby estimate a direction in which the object is to move in a certain period of time. Codec inter prediction employing the optical flow method as an option enhances the encoding efficiency. The term "BIO" is based on the fact that the optical flow method is used in Bi prediction (bidirectional prediction) in which temporally continuous frames are referred to in units of frames (see NPL 1).

In normal Bi prediction, difference MVs (MVDs) are encoded since there are differences between optimal MVs and predicted MVs (PMVs). In Bi prediction employing BIO, on the other hand, a result equivalent to that in normal Bi prediction is obtained as follows: a gradient (G) and a velocity (V) are obtained by the optical flow method for prediction blocks generated with predicted MVs (PMVs). In such a case, the encoding of difference MVs (MVDs) can be unnecessary or eliminated so that the encoding efficiency is enhanced (see NPL 2).

Meanwhile, the calculation costs of the gradient (G) and the velocity (V), which are obtained in BIO, are very high. Thus, a reduction is particularly required in terms of cost-effectiveness in a case where, as a result of the calculation of the gradient (G) and the velocity (V), there is almost no difference from prediction values obtained by normal Bi prediction due to small absolute values, for example.

Various reduction methods in terms of BIO have been proposed. In one of the reduction methods, the SAD (Sum of Absolute Difference) of an L0 prediction block and an L1 prediction block is calculated when the blocks are generated, and BIO is not applied and normal Bi prediction is executed in a case where the SAD value falls below a certain threshold.

This is based on a tendency that the velocity (V) is small and BIO is thus not very effective when the SAD value is small, and achieves early termination, that is, eliminates the high cost calculation in a case where the effect is not expected.

CITATION LIST

Non Patent Literature

[NPL 1]
Jianle Chen, Yan Ye, Seung Hwan Kim, "Algorithm description for Versatile Video Coding and Test Model 3 (VTM 3)," [online], Sep. 24, 2018, Experts Team (JVET), [retrieved on Dec. 21, 2018], Internet, <http://phenix.it-sudparis.eu/jvet/doc_end_user/documents/12_Macao/wg11/JVET-L1002-v1.zip>

[NPL 2]
Xiaoyu Xiu, Yuwen He, Yan Ye, "CE9-related: Complexity reduction and bit-width control for bi-directional optical flow (BIO)," [online], Sep. 24, 2018, Experts Team (JVET), [retrieved on Dec. 21, 2018], Internet, <http://phenix.it-sudparis.eu/jvet/doc_end_user/documents/12_Macao/wg11/JVET-L0256-v3.zip>

SUMMARY

Technical Problem

In a case where the reduction method in terms of BIO described above is applied, the SAD of L0 and L1 prediction blocks is calculated for an entire PU to be compared to the threshold, thereby determining whether or not to apply BIO processing, and the processing then branches. Thus, it is difficult to virtually partition, in a case where inter prediction is performed on PUs larger than VPDUs, the PU into a plurality of vPUs.

In this case, as a buffer necessary for gradient calculation or velocity calculation, a region slightly larger than the PU is required, with the result that a BIO-included inter prediction processing unit requires a large buffer resource.

The present technology has been made in view of such circumstances, and achieves a reduction in a buffer size.

Solution to Problem

According to an aspect of the present technology, there is provided an image processing device including a control unit configured to partition a unit of processing into partitioned processing units each of which corresponds to a VPDU size or is equal to or smaller than the VPDU size, the unit of processing being used for calculation of a cost that is used for determining whether or not to perform bidirectional prediction; and a determination unit configured to make the determination by using the cost calculated based on the partitioned processing units.

According to an aspect of the present technology, a unit of processing is partitioned into partitioned processing units each of which corresponds to a VPDU size or is equal to or smaller than the VPDU size, the unit of processing being used for calculation of a cost that is used for determining whether or not to perform bidirectional prediction, and the determination is made by using the cost calculated based on the partitioned processing units.

BRIEF DESCRIPTION OF DRAWINGS

FIG. 8 is a diagram illustrating exemplary 2-block partition in Bi prediction employing BIO.

FIG. 19 is a diagram illustrating correspondences between PU size, vPU number, and processing position and size.

FIG. 22 is a diagram illustrating an example in which in a case where PUs are larger than VPDUs, a BIO determination result for a vPU number of 0 is also used for another vPU.

FIG. 23 is a diagram illustrating an example in which in a case where PUs are larger than VPDUs, a BIO determination result for the vPU number of 0 is also used for the other vPU.

FIG. 26 is a diagram illustrating an example in which whether to apply BIO is determined with a partial SAD value in each vPU.

FIG. 27 is another diagram illustrating an example in which whether to apply BIO is determined with a partial SAD value in each vPU.

FIG. 32 is a diagram illustrating correspondence between BIO_MAX_SAD_BLOCK_SIZE and sPU.

FIG. 33 is a flowchart illustrating, as an operation example according to a third embodiment of the present technology, BIO-included Bi prediction that is performed by the inter prediction unit 51.

FIG. 34 is a flowchart illustrating, as the operation example according to the third embodiment of the present technology, the BIO-included Bi prediction that is performed by the inter prediction unit 51, which is a continuation of FIG. 33.

DESCRIPTION OF EMBODIMENTS

Now, modes for carrying out the present technology are described. The following items are described in order.
0. Outline
1. First Embodiment (Exemplary Partition with vPUs)
2. Second Embodiment (Exemplary Operation Sharing with Flags)
3. Third Embodiment (Exemplary Partition with sPUs)
4. Fourth Embodiment (Example in which Use of BIO Is Prohibited)
5. Fifth Embodiment (Example in which BIO Is Always Applied)
6. Sixth Embodiment (Computer)

0. Outline

The VVC standard that is a next-generation codec has been developed as a successor to AVC/H.264 and HEVC/H.265.

In the VVC standard in which large CUs (Coding Units) up to 128×128 are employed, the concept of VPDUs (Virtual Pipeline Data Units) has also been introduced in consideration of increases in circuit scale and power consumption in HW decoder implementation, in particular.

The VPDU size is a buffer size that allows smooth processing on each pipeline stage. The VPDU size is often set to the maximum size of TUs (Transform Units).

In VVC, the maximum TU size is 64×64, and the same is assumed to hold true for VPDUs. In VVC, one CU corresponds to one PU, and hence inter prediction processing is required to be performed on PUs larger than VPDUs. Even in this case, the PU can be partitioned into virtual vPUs (virtual PUs) to be processed. VVC is consistent with VPDUs and has been able to be implemented with reasonable HW resources since only small buffers are used as illustrated in FIG. 1 to FIG. 4 until BIO (Bi-directional optical flow) described later has been employed.

<Exemplary Pipeline without Introduction of VPDUs>

Figure 1:
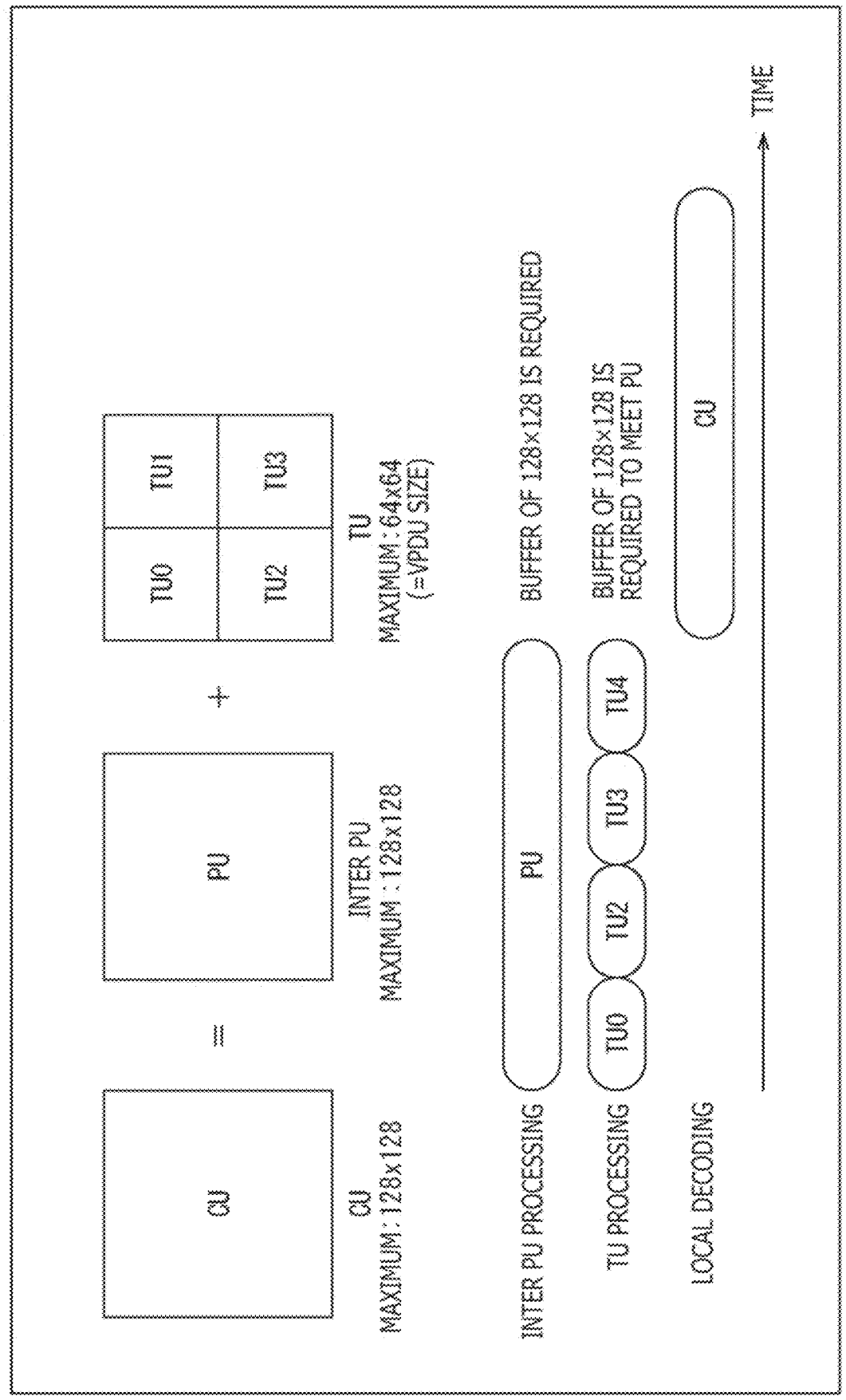
FIG. 1 is a diagram illustrating an example in which a pipeline is structured without the introduction of VPDUs.

FIG. 1 is a diagram illustrating an example in which a pipeline is structured without the introduction of VPDUs.

In the upper part of FIG. 1, the blocks of a CU, an inter PU, and a TU are illustrated.

The maximum CU size is 128×128. The maximum inter PU size is 128×128. In VVC, one CU corresponds to one PU. The TU includes a TU0 to a TU3, the maximum size of each TU is 64×64. The TU size is the VPDU size.

As illustrated in the upper part of FIG. 1, the CU is obtained by adding the inter PU generated by inter PU processing and the TU obtained by TU processing together.

In the lower part of FIG. 1, the pipeline including inter PU processing, TU processing, and local decoding processing is illustrated.

In the pipeline, the inter PU processing and the processing on the TU0 to the TU3 are performed in parallel, and the local decoding processing on the CU starts when both the processing processes are complete. Thus, the inter PU processing requires a buffer of 128×128, and the TU processing requires a buffer of 128×128 to meet the PU.

Figure 2:
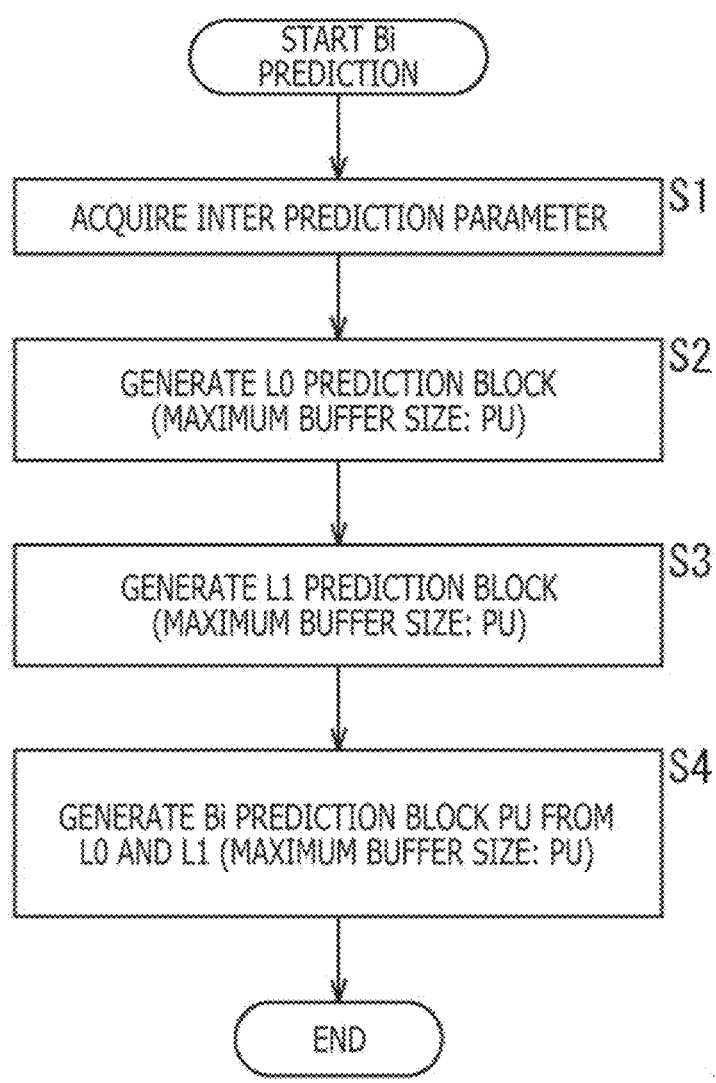
FIG. 2 is a flowchart illustrating Bi prediction that is one of inter PU processing in the case of FIG. 1.

FIG. 2 is a flowchart illustrating Bi prediction (bidirectional prediction) that is one of the inter PU processing in the case of FIG. 1.

In Step S1, inter prediction parameters are acquired.
In Step S2, an L0 prediction block is generated.
In Step S3, an L1 prediction block is generated.
In Step S4, a Bi prediction block PU is generated from the L0 prediction block and the L1 prediction block.

Note that, in Steps S2 to S4, the PU size is required as the maximum buffer size.

<Exemplary Pipeline with Introduction of VPDUs>

Figure 3:
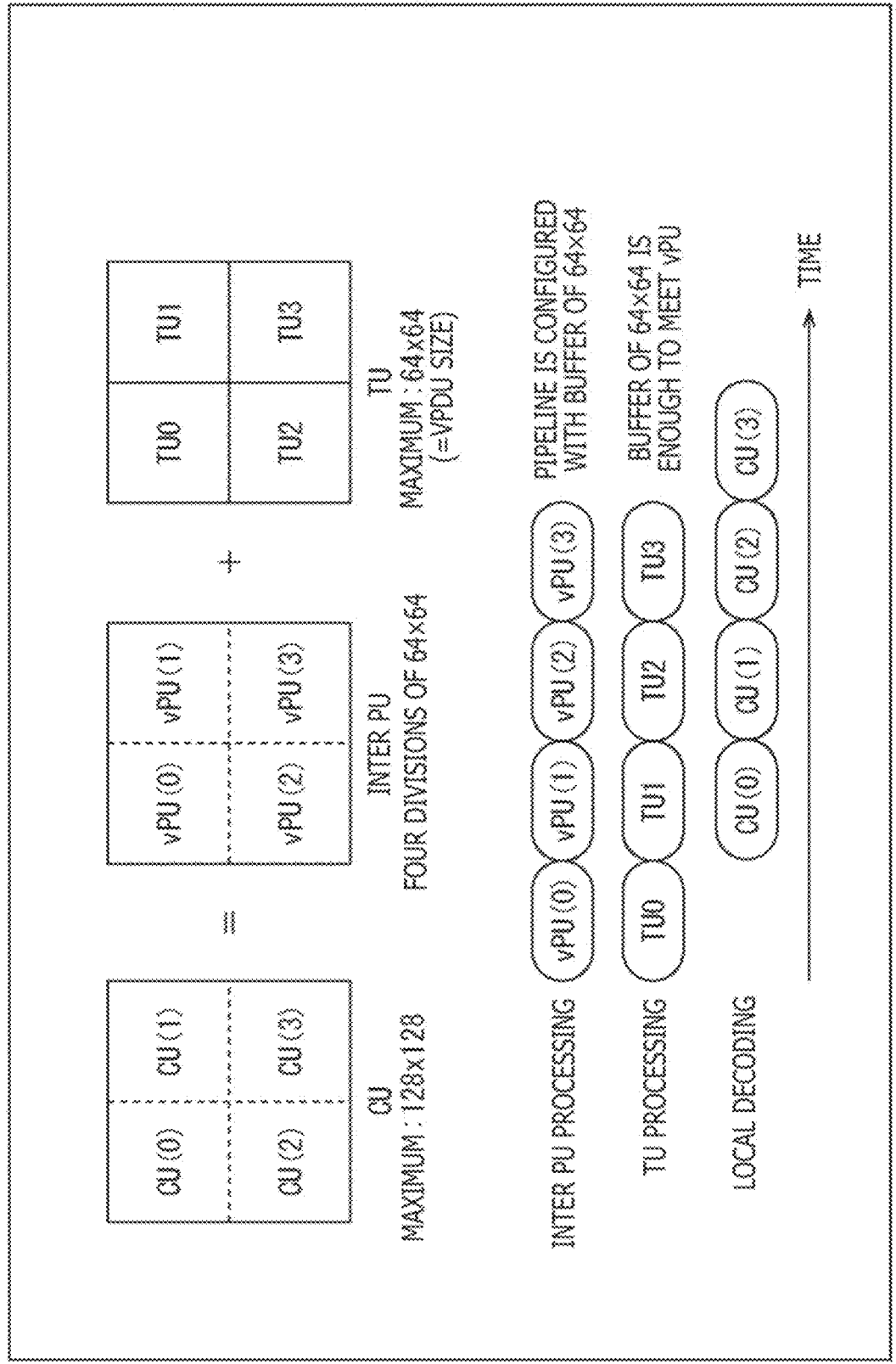
FIG. 3 is a diagram illustrating an example in which a pipeline is efficiently structured with the introduction of VPDUs.

FIG. 3 is a diagram illustrating an example in which a pipeline is efficiently structured with the introduction of VPDUs.

Note that, in FIG. 3, points common to those in the description of FIG. 1 are appropriately omitted.

In the upper part of FIG. 3, the blocks of a CU, an inter PU, and a TU are illustrated. The CU includes, unlike FIG. 1, divisions CU(0) to CU(3) since the PU is virtually partitioned into vPUs to be processed. The PU includes virtual vPU(0) to vPU(3).

In the lower part of FIG. 3, the pipeline including inter PU processing, TU processing, and local decoding processing is illustrated.

In the pipeline, the processing on the vPU(0) to the vPU(3) in the inter PU and the processing on the TU0 to the TU3 are performed in parallel. Thus, when the processing on the vPU(0) and the processing on the TU0 are complete, the local decoding processing on the CU(0) starts. When the processing on the vPU(1) and the processing on the TU1 are complete, the local decoding processing on the CU(1) starts. When the processing on the vPU(2) and the processing on the TU2 are complete, the local decoding processing on the CU(2) starts. When the processing on the vPU(3) and the processing on the TU3 are complete, the local decoding processing on the CU(3) starts.

With the pipeline structured in such a way, a buffer of 64×64 is enough in the inter PU processing, and in the TU processing, a buffer having a size of 64×64 is enough to meet the vPU.

Figure 4:
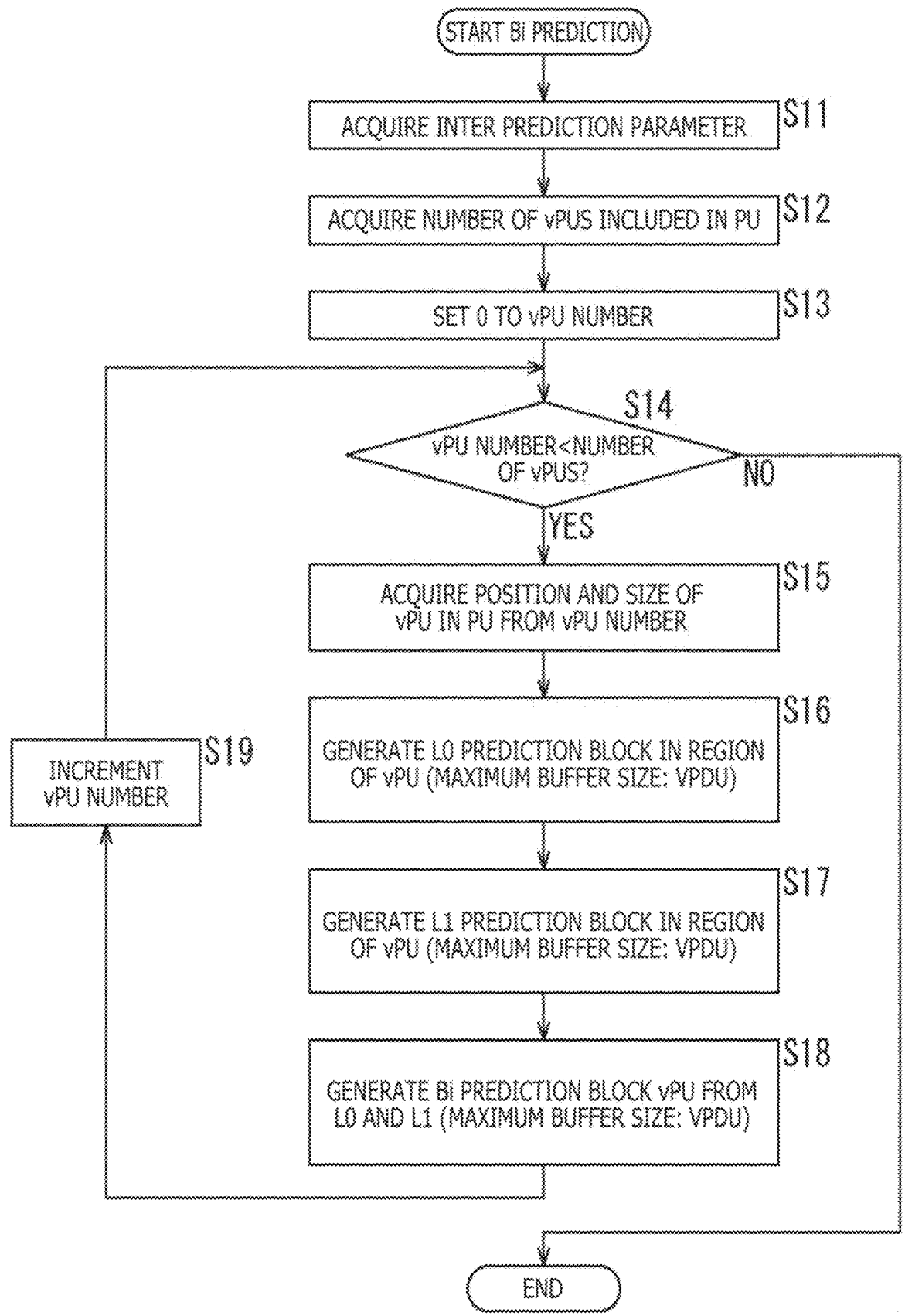
FIG. 4 is a flowchart illustrating Bi prediction that is one of inter PU processing in the case of FIG. 3.

FIG. 4 is a flowchart illustrating Bi prediction that is one of the inter PU processing in the case of FIG. 3.

In Step S11, inter prediction parameters are acquired.
In Step S12, the number of vPUs included in the PU is acquired.
In Step S13, 0 is set to the vPU number.
In Step S14, it is determined whether or not the vPU number is smaller than the number of vPUs. In a case where it is determined in Step S14 that the vPU number is smaller than the number of vPUs, the processing proceeds to Step S15.
In Step S15, the position and size of the vPU in the PU are acquired from the vPU number.
In Step S16, an L0 prediction block in the vPU region is generated.
In Step S17, an L1 prediction block in the vPU region is generated.
In Step S18, a Bi prediction block vPU is generated from the L0 prediction block and the L1 prediction block.
In Step S19, the vPU number is incremented. After that, the processing returns to Step S14, and the later processing is repeated.

Further, in a case where it is determined in Step S14 that the vPU number is equal to or larger than the number of vPUs, the Bi prediction ends.

Note that, in Steps S16 to S17, the VPDU size smaller than the PU size is enough for the maximum buffer size.

The optical flow method is an image processing method for detecting the motion of an object in a moving image, to thereby estimate a direction in which the object is to move in a certain period of time. Codec inter prediction employing the optical flow method as an option enhances the encoding efficiency. The term "BIO" is based on the fact that the optical flow method is used in Bi prediction in which temporally continuous frames are referred to in units of frames.

<Exemplary Normal Bi Prediction>

Figure 5:
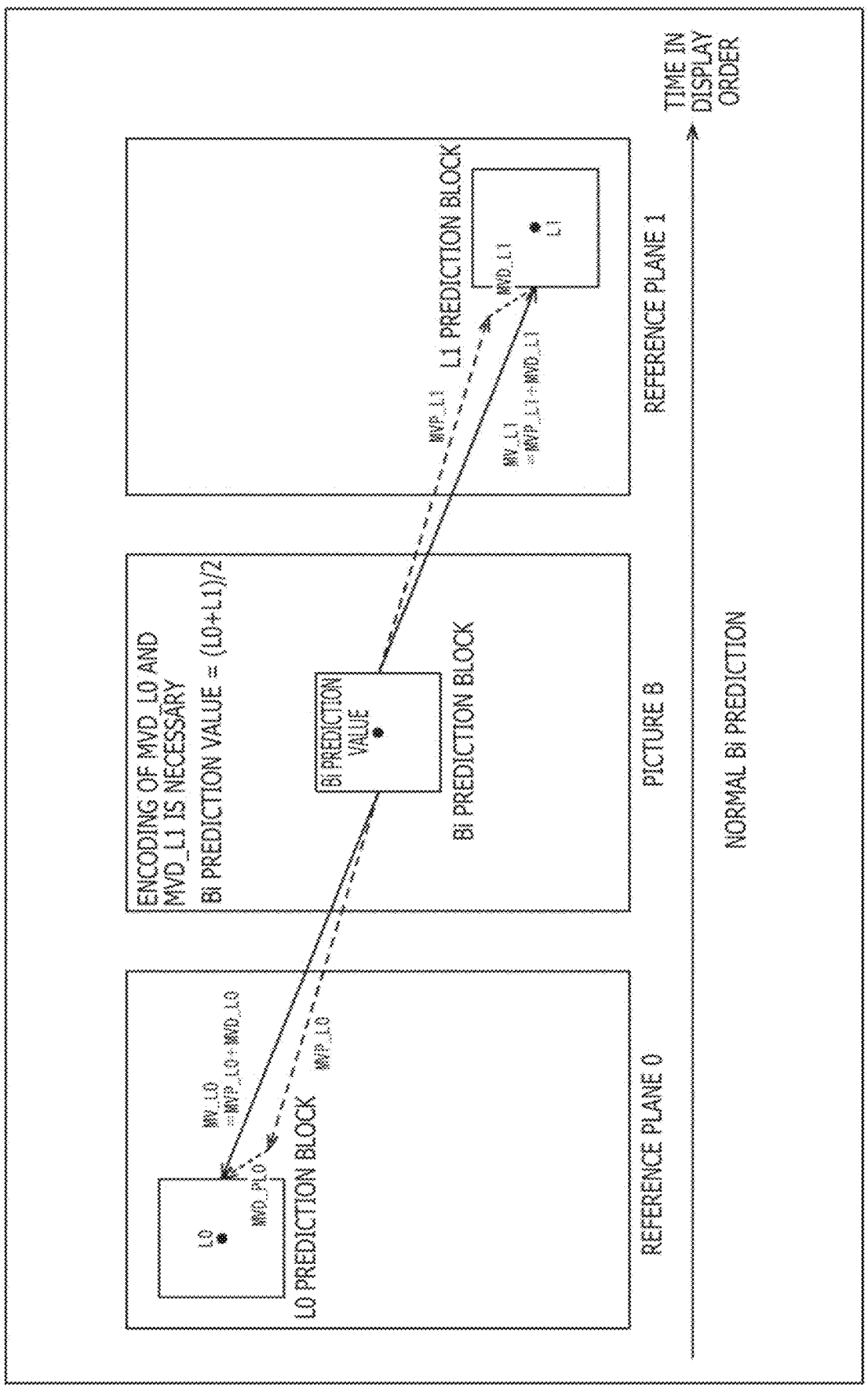
FIG. 5 is a diagram illustrating exemplary normal Bi prediction.

FIG. 5 is a diagram illustrating exemplary normal Bi prediction.

In FIG. 5, the arrow extending from the left to the right represents time in the display order. Further, FIG. 5 illustrates an example in which optimal MVs on a reference plane 0 in an L0 direction and a reference plane 1 in an L1 direction are obtained for the Bi prediction value of a Bi prediction block on a picture B. The same holds true for the following figures.

The Bi prediction value corresponds to a pixel L0 of an L0 prediction block on the reference plane 0 and a pixel L1 of an L1 prediction block on the reference plane 1, and the Bi prediction value is thus obtained from (L0+L1)/2.

As illustrated in FIG. 5, in the normal Bi prediction, optimal MVs (MV_L0 and MV_L1) are different from predicted MVs (MVP_L0 and MVP_L1), and hence the encoding of difference MVs (MVD_L0 and MVD_L1) is necessary.

<Exemplary Bi Prediction Employing BIO>

Figure 6:
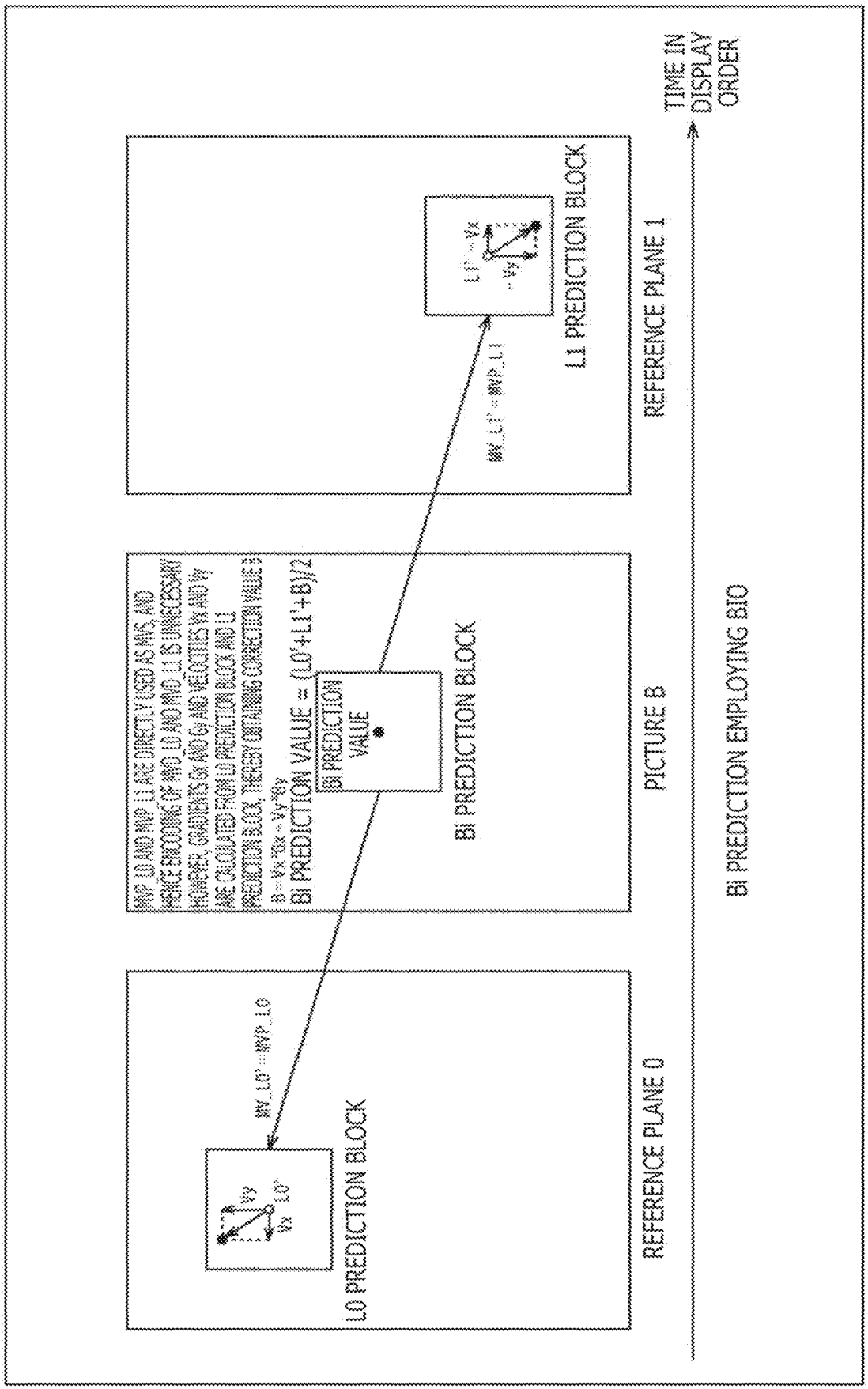
FIG. 6 is a diagram illustrating exemplary Bi prediction employing BIO.

FIG. 6 is a diagram illustrating exemplary Bi prediction employing BIO.

FIG. 6 illustrates, as the Bi prediction employing BIO, an example in which a gradient (G) and a velocity (V) are obtained by the optical flow method for prediction blocks generated with the predicted MVs (MVP_L0 and MVP_L1). The gradient (G) and the velocity (V) are obtained by the optical flow method for the prediction blocks so that a result equivalent to that in the normal Bi prediction is obtained.

In the case of the Bi prediction employing BIO, the predicted MVs (MVP_L0 and MVP_L1) are directly used as the MVs (MV_L0 and MV_L1), and hence the encoding of the difference MVs (MVD_L0 and MVD_L1) is unnecessary, which means that the encoding efficiency is enhanced.

The Bi prediction value almost corresponds to a pixel L0' of the L0 prediction block on the reference plane 0 and a pixel L1' of the L1 prediction block on the reference plane 1, and the Bi prediction value is thus obtained from (L0'+L1'+B)/2. That is, the gradients (G: Gx and Gy) and the velocities (V: Vx and Vy) are required to be calculated from the L0 prediction block and the L1 prediction block, thereby obtaining a correction value B=Vx*Gx+Vy*Gy.

<Exemplary 2—Block Partition in Bi Prediction>

Figure 7:
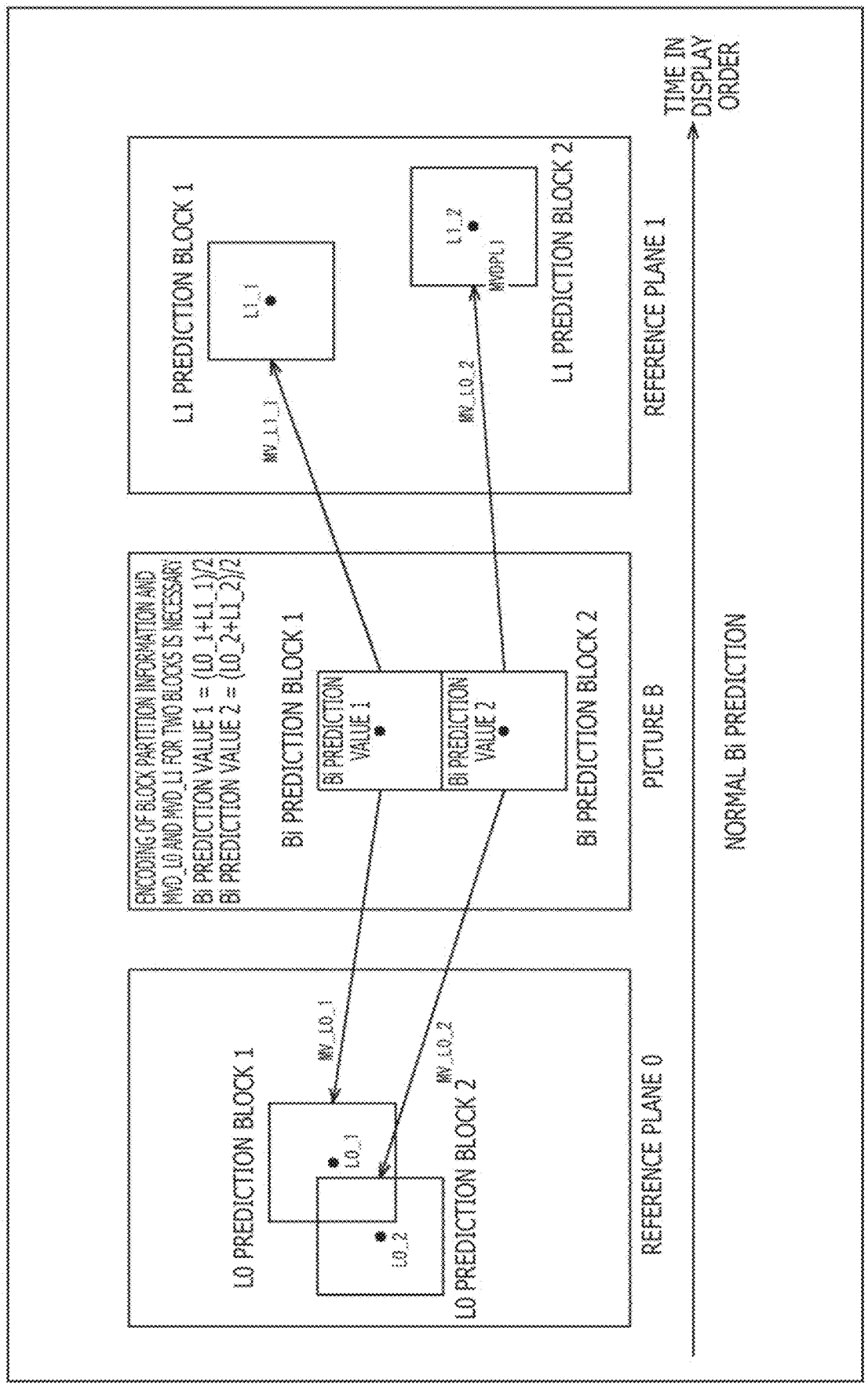
FIG. 7 is a diagram illustrating exemplary 2-block partition in normal Bi prediction.

FIG. 7 is a diagram illustrating exemplary two-block partition in the normal Bi prediction.

In the normal Bi prediction, there are two blocks so that, as illustrated in FIG. 7, block partition information regarding the two blocks and two difference MVs (MVDs) are obtained. Thus, the encoding of the block partition information regarding the two blocks and the two difference MVs (MVDs) is necessary.

<Exemplary 2—Block Partition in Bi Prediction Employing BIO>

FIG. 8 is a diagram illustrating exemplary 2-block partition in the Bi prediction employing BIO.

In the Bi prediction employing BIO, even when there are two blocks, as illustrated in FIG. 8, the gradient (G) and the velocity (V) are obtained by the optical flow method without partitioning the blocks so that a result equivalent to that in the normal Bi prediction is obtained.

As described above, in the Bi prediction employing BIO of FIG. 8, the encoding of block partition information, which is necessary in the Bi prediction of FIG. 7, can be unnecessary or eliminated, and the encoding of difference MVs (MVDs), which is necessary in the Bi prediction of FIG. 7, can be unnecessary or eliminated, with the result that the encoding efficiency can be enhanced.

Meanwhile, the calculation costs of the gradient (G) and the velocity (V), which are obtained in BIO, is very high. Thus, a reduction is particularly required in terms of cost-effectiveness in a case where, as a result of the calculation of the gradient (G) and the velocity (V), there is almost no difference from prediction values obtained by normal Bi prediction due to small absolute values, for example.

Various reduction methods in terms of BIO have been proposed. In one of the reduction methods, the SAD (Sum of Absolute Difference) of an L0 prediction block and an L1 prediction block is calculated when the blocks are generated, and BIO is not applied and normal Bi prediction is executed in a case where the SAD value falls below a certain threshold.

This is based on a tendency that the velocity (V) is small and BIO is thus not very effective when the SAD value is small, and achieves early termination, that is, eliminates the high cost calculation in a case where the effect is not expected.

In a case where the reduction method in terms of BIO described above is applied, the SAD of L0 and L1 prediction blocks is calculated for an entire PU to be compared to the threshold, thereby determining whether or not to apply BIO processing, and the processing then branches. Thus, it is difficult to virtually partition, in a case where inter prediction is performed on PUs larger than VPDUs, the PU into a plurality of vPUs.

In this case, as a buffer necessary for gradient calculation or velocity calculation, a region slightly larger than the PU is required, with the result that a BIO-included inter prediction processing unit requires a large buffer resource.

Further, in a case where the reduction in terms of BIO is implemented by HW, due to a large difference between the pipeline delay of BIO-included inter prediction and the pipeline delay of TU processing, HW implementation that maintains throughput is difficult to achieve.

Accordingly, in the present technology, a unit of processing in calculation of a cost that is used for determining whether or not to perform bidirectional prediction such as BIO (for example, PU) is partitioned into partitioned processing units each of which corresponds to the VPDU size (for example, vPU) or is equal to or smaller than the VPDU size (for example, sPU described later), and the determination is made by using the cost calculated on the basis of the partitioned processing units. Note that, the size corresponding to the VPDU size means a size slightly larger than the VPDU size.

Note that, herein, with regard to block size, "A is larger than B" means "the horizontal size of A is larger than the horizontal size of B" or "the vertical size of A is larger than the vertical size of B."

Further, with regard to block size, "A is equal to or smaller than B" means "the horizontal size of A is equal to or smaller than the horizontal size of B and the vertical size of A is equal to or smaller than the vertical size of B."

Now, the present technology is described in detail.

1. First Embodiment (Exemplary Partition with vPUs

<Configuration Example of Encoding Device>

Figure 9:
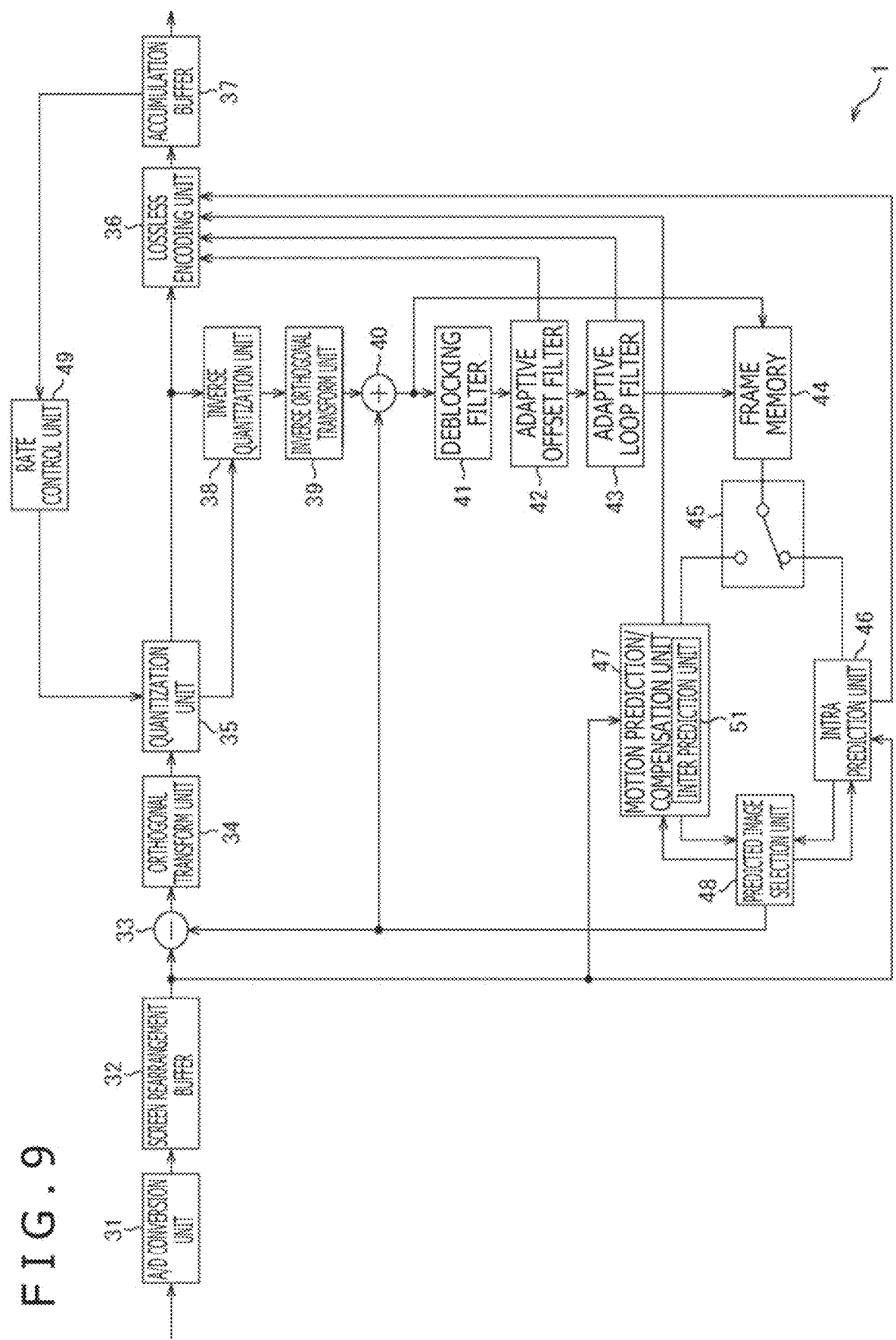
FIG. 9 is a block diagram illustrating a configuration example of an encoding device according to an embodiment of the present technology.

FIG. 9 is a block diagram illustrating a configuration example of an encoding device according to an embodiment of the present technology.

An encoding device 1 of FIG. 9 includes an A/D conversion unit 31, a screen rearrangement buffer 32, a calculation unit 33, an orthogonal transform unit 34, a quantization unit 35, a lossless encoding unit 36, an accumulation buffer 37, an inverse quantization unit 38, an inverse orthogonal transform unit 39, and an addition unit 40. Further, the encoding device 1 includes a deblocking filter 41, an adaptive offset filter 42, an adaptive loop filter 43, a frame memory 44, a switch 45, an intra prediction unit 46, a motion prediction/compensation unit 47, a predicted image selection unit 48, and a rate control unit 49.

The A/D conversion unit 31 performs A/D conversion on images in units of frames input to be encoded. The A/D conversion unit 31 outputs the images that are now the digital signals after the conversion to the screen rearrangement buffer 32 and stores the digital signals therein.

The screen rearrangement buffer 32 rearranges images in units of frames stored in a display order into an encoding order on the basis of the GOP structure. The screen rearrangement buffer 32 outputs the rearranged images to the calculation unit 33, the intra prediction unit 46, and the motion prediction/compensation unit 47.

The calculation unit 33 subtracts predicted images supplied from the predicted image selection unit 48 from images supplied from the screen rearrangement buffer 32, to thereby perform encoding. The calculation unit 33 outputs the images obtained as a result of the subtraction as residual information (difference) to the orthogonal transform unit 34. Note that, in a case where no predicted image is supplied from the predicted image selection unit 48, the calculation unit 33 directly outputs images read out from the screen rearrangement buffer 32 as residual information to the orthogonal transform unit 34.

The orthogonal transform unit 34 performs orthogonal transform processing on residual information from the calculation unit 33. The orthogonal transform unit 34 outputs the images obtained as a result of the orthogonal transform processing to the quantization unit 35.

The quantization unit 35 quantizes images obtained as a result of orthogonal transform processing supplied from the orthogonal transform unit 34. The quantization unit 35 outputs the quantized values obtained as a result of the quantization to the lossless encoding unit 36.

The lossless encoding unit 36 acquires intra prediction mode information that is information indicating an optimal intra prediction mode from the intra prediction unit 46. Further, the lossless encoding unit 36 acquires inter prediction mode information that is information indicating an optimal inter prediction mode and inter prediction parameters such as motion information and reference image information from the motion prediction/compensation unit 47.

Further, the lossless encoding unit 36 acquires offset filter information associated with an offset filter from the adaptive offset filter 42 and acquires filter coefficients from the adaptive loop filter 43.

The lossless encoding unit 36 performs, on quantized values supplied from the quantization unit 35, lossless encoding such as variable-length coding (for example, CAVLC (Context-Adaptive Variable Length Coding)) or arithmetic coding (for example, CABAC (Context-Adaptive Binary Arithmetic Coding)).

Further, the lossless encoding unit 36 losslessly encodes, as encoding information associated with encoding, the intra prediction mode information or the inter prediction mode information, the inter prediction parameters, the offset filter information, or the filter coefficients. The lossless encoding unit 36 outputs the lossless-encoded encoding information and quantized values as encoded data to the accumulation buffer 37 and accumulates the information and the quantized values therein.

The accumulation buffer 37 temporarily stores encoded data supplied from the lossless encoding unit 36. Further, the accumulation buffer 37 outputs the stored encoded data as encoded streams to the subsequent stage.

Further, the quantized values output from the quantization unit 35 are also input to the inverse quantization unit 38. The inverse quantization unit 38 inversely quantizes the quantized values, and outputs the orthogonal transform processing results obtained as a result of the inverse quantization to the inverse orthogonal transform unit 39.

The inverse orthogonal transform unit 39 performs inverse orthogonal transform processing on orthogonal transform processing results supplied from the inverse quantization unit 38. Examples of the inverse orthogonal transform include IDCT (inverse discrete cosine transform) and IDST (inverse discrete sine transform). The inverse orthogonal transform unit 39 outputs the residual information obtained as a result of the inverse orthogonal transform processing to the addition unit 40.

The addition unit 40 adds residual information supplied from the inverse orthogonal transform unit 39 and predicted images supplied from the predicted image selection unit 48 together, to thereby perform decoding. The addition unit 40 outputs the decoded images to the deblocking filter 41 and the frame memory 44.

The deblocking filter 41 performs deblocking filter processing of eliminating block deformation on decoded images supplied from the addition unit 40. The deblocking filter 41 outputs the images obtained as a result of the deblocking filter processing to the adaptive offset filter 42.

The adaptive offset filter 42 performs adaptive offset filter (SAO (Sample adaptive offset)) processing of mainly eliminating ringing on images obtained as a result of deblocking filter processing by the deblocking filter 41.

The adaptive offset filter 42 outputs the images obtained as a result of the adaptive offset filter processing to the adaptive loop filter 43. Further, the adaptive offset filter 42 supplies, as offset filter information, information indicating the types of the adaptive offset filter processing and the offsets to the lossless encoding unit 36.

The adaptive loop filter 43 includes a two-dimensional Wiener filter, for example. The adaptive loop filter 43 performs adaptive loop filter (ALF) processing on images obtained as a result of adaptive offset filter processing.

The adaptive loop filter 43 outputs the images obtained as a result of the adaptive loop filter processing to the frame memory 44. Further, the adaptive loop filter 43 outputs the filter coefficients used in the adaptive loop filter processing to the lossless encoding unit 36.

The frame memory 44 accumulates images supplied from the adaptive loop filter 43 and images supplied from the addition unit 40. Of the images accumulated in the frame memory 44 without being subjected to the filter processing, images neighboring the CUs are output as peripheral images to the intra prediction unit 46 through the switch 45.

Meanwhile, the images subjected to the filter processing to be accumulated in the frame memory 44 are output as reference images to the motion prediction/compensation unit 47 through the switch 45.

The intra prediction unit 46 performs intra prediction processing in all candidate intra prediction modes in units of PUs by using peripheral images read out from the frame memory 44 through the switch 45.

Further, the intra prediction unit 46 calculates RD costs in all the candidate intra prediction modes on the basis of images read out from the screen rearrangement buffer 32 and predicted images generated by the intra prediction processing. The intra prediction unit 46 determines an intra prediction mode having the calculated RD cost that is minimum as an optimal intra prediction mode.

The intra prediction unit 46 outputs the predicted image generated in the optimal intra prediction mode to the predicted image selection unit 48. The intra prediction unit 46 outputs, when being notified that the predicted image generated in the optimal intra prediction mode has been selected, the intra prediction mode information to the lossless encoding unit 36. Note that, the intra prediction mode is a mode indicating PU sizes, prediction directions, and the like.

The motion prediction/compensation unit 47 performs motion prediction/compensation processing in all candidate inter prediction modes. The motion prediction/compensation unit 47 includes an inter prediction unit 51 configured to compensate for predicted motions to generate predicted images.

The motion prediction/compensation unit 47 detects motion information (motion vectors) in all the candidate inter prediction modes on the basis of images supplied from the screen rearrangement buffer 32 and reference images read out from the frame memory 44 through the switch 45.

The motion prediction/compensation unit 47 supplies, to the inter prediction unit 51, PU positions in frames, PU sizes, prediction directions, reference image information, motion information, and the like that correspond to the detected motion information as inter prediction parameters.

The inter prediction unit 51 generates predicted images by BIO processing-included Bi prediction, for example, by using inter prediction parameters supplied from the motion prediction/compensation unit 47.

The motion prediction/compensation unit 47 calculates RD costs in all the candidate inter prediction modes on the basis of images supplied from the screen rearrangement buffer 32 and predicted images generated by the inter prediction unit 51. The motion prediction/compensation unit 47 determines an inter prediction mode having the minimum RD cost as an optimal inter prediction mode.

The RD cost and the predicted image in the determined optimal inter prediction mode are output to the predicted image selection unit 48. The inter prediction parameters in the determined optimal inter prediction mode are output to the lossless encoding unit 36.

The predicted image selection unit 48 determines, as an optimal prediction mode, one of an optimal intra prediction mode supplied from the intra prediction unit 46 and an optimal inter prediction mode supplied from the motion prediction/compensation unit 47 that has a smaller RD cost than the other. Then, the predicted image selection unit 48 outputs the predicted image in the optimal prediction mode to the calculation unit 33 and the addition unit 40.

The rate control unit 49 controls the rate of the quantization operation by the quantization unit 35 on the basis of encoded data accumulated in the accumulation buffer 37 so that neither overflow nor underflow occurs.

<Operation of Encoding Device>

Figure 10:
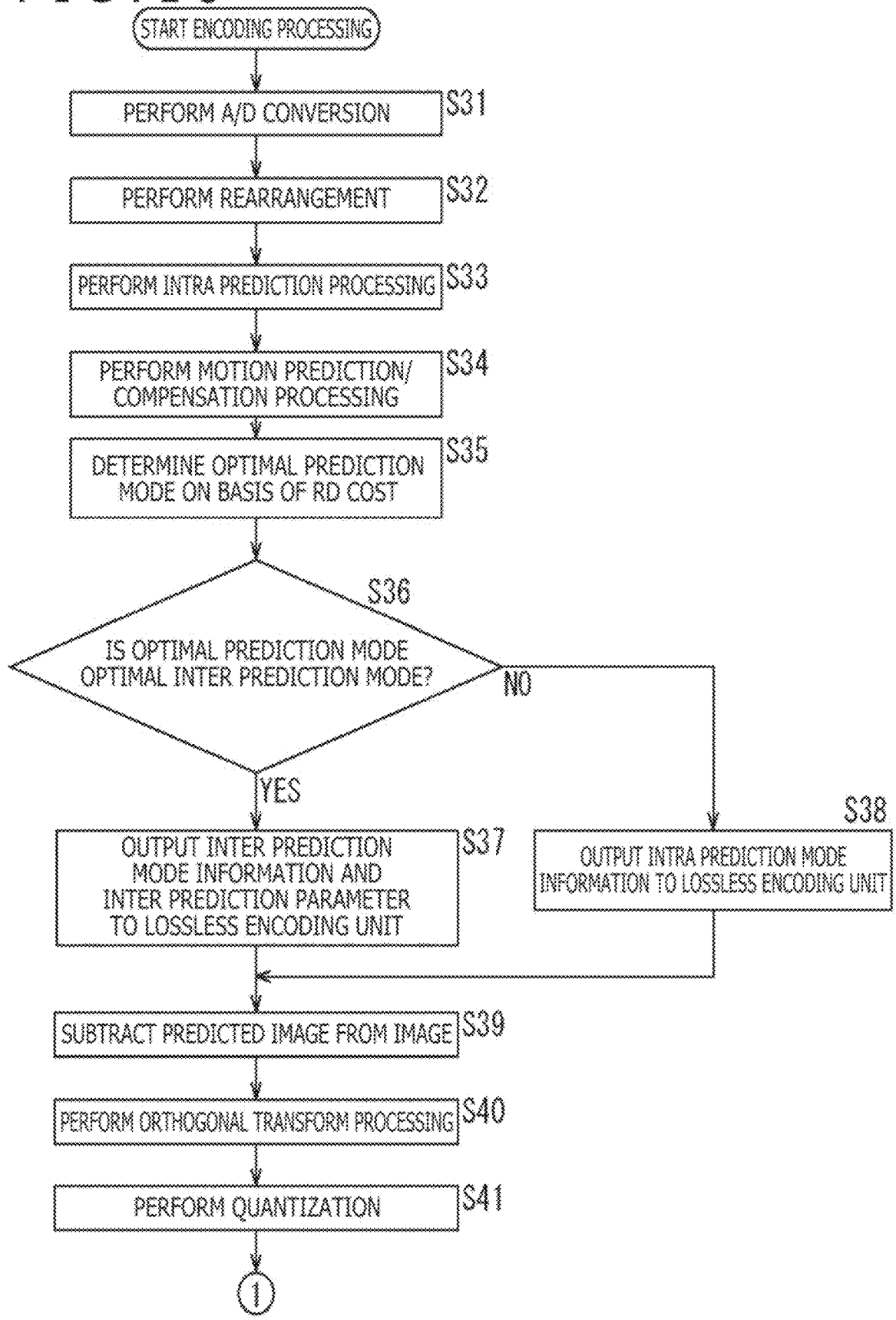
FIG. 10 is a flowchart illustrating details of encoding processing by the encoding device.
Figure 11:
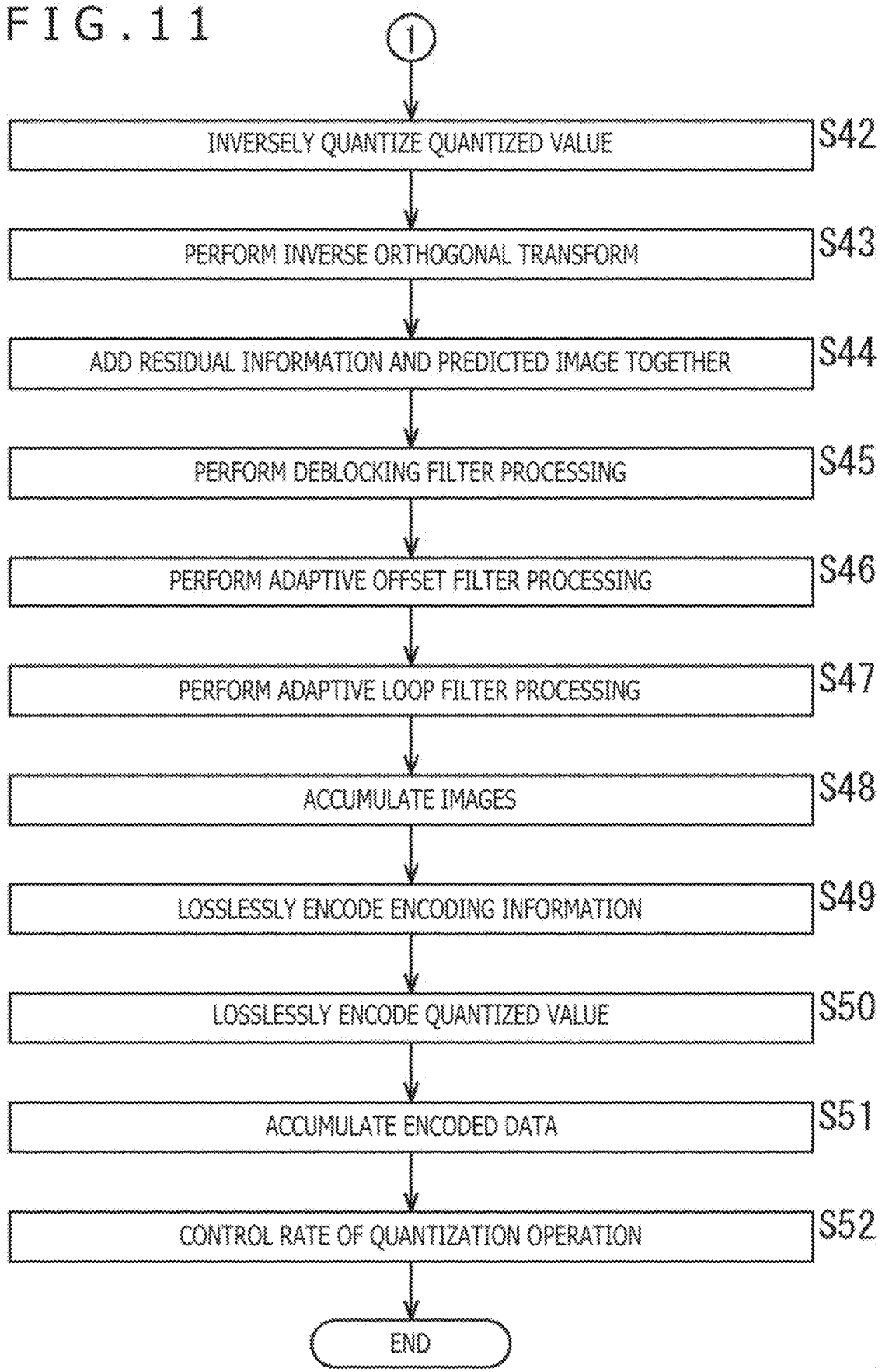
FIG. 11 is a flowchart illustrating the details of the encoding processing by the encoding device, which is a continuation of FIG. 10.

FIG. 10 and FIG. 11 are flowcharts illustrating the details of encoding processing by the encoding device.

In Step S31 of FIG. 10, the A/D conversion unit 31 performs A/D conversion on images in units of frames input to be encoded. The A/D conversion unit 31 outputs the images that are now the digital signals after the conversion to the screen rearrangement buffer 32 and stores the digital signals therein.

In Step S32, the screen rearrangement buffer 32 rearranges the frame images stored in a display order into an encoding order on the basis of the GOP structure. The screen rearrangement buffer 32 outputs the rearranged images in units of frames to the calculation unit 33, the intra prediction unit 46, and the motion prediction/compensation unit 47.

In Step S33, the intra prediction unit 46 performs intra prediction processing in all candidate intra prediction modes. Further, the intra prediction unit 46 calculates RD costs in all the candidate intra prediction modes on the basis of the image read out from the screen rearrangement buffer 32 and predicted images generated by the intra prediction processing. The intra prediction unit 46 determines an intra prediction mode having the minimum RD cost as an optimal intra prediction mode. The intra prediction unit 46 outputs the predicted image generated in the optimal intra prediction mode to the predicted image selection unit 48.

In Step S34, the motion prediction/compensation unit 47 performs motion prediction/compensation processing in all candidate inter prediction modes.

The motion prediction/compensation unit 47 detects motion information (motion vectors) in all the candidate inter prediction modes on the basis of the image supplied from the screen rearrangement buffer 32 and reference images read out from the frame memory 44 through the switch 45.

The inter prediction unit 51 generates predicted images by BIO processing-included Bi prediction, for example, by using inter prediction parameters supplied from the motion prediction/compensation unit 47.

The motion prediction/compensation unit 47 calculates RD costs in all the candidate inter prediction modes on the basis of the image supplied from the screen rearrangement buffer 32 and the predicted images generated by the inter prediction unit 51. The motion prediction/compensation unit 47 determines an inter prediction mode having the minimum RD cost as an optimal inter prediction mode.

The RD cost and the predicted image in the determined optimal inter prediction mode are output to the predicted image selection unit 48. The inter prediction parameters in the determined optimal inter prediction mode are output to the lossless encoding unit 36.

In Step S35, the predicted image selection unit 48 determines, as an optimal prediction mode, one of the optimal intra prediction mode and the optimal inter prediction mode that has a smaller RD cost than the other. Then, the predicted image selection unit 48 outputs the predicted image in the optimal prediction mode to the calculation unit 33 and the addition unit 40.

In Step S36, the predicted image selection unit 48 determines whether the optimal prediction mode is the optimal inter prediction mode. In a case where it is determined in Step S36 that the optimal prediction mode is the optimal inter prediction mode, the predicted image selection unit 48 notifies the motion prediction/compensation unit 47 that the predicted image generated in the optimal inter prediction mode has been selected.

Then, in Step S37, the motion prediction/compensation unit 47 outputs the inter prediction mode information and the inter prediction parameters to the lossless encoding unit 36. After that, the processing proceeds to Step S39.

Meanwhile, in a case where the optimal prediction mode is the optimal intra prediction mode in Step S36, the predicted image selection unit 48 notifies the intra prediction unit 46 that the predicted image generated in the optimal intra prediction mode has been selected. Then, in Step S38, the intra prediction unit 46 outputs the intra prediction mode information to the lossless encoding unit 36. After that, the processing proceeds to Step S39.

In Step S39, the calculation unit 33 subtracts the predicted image supplied from the predicted image selection unit 48 from the image supplied from the screen rearrangement buffer 32, to thereby perform encoding. The calculation unit 33 outputs the image obtained as a result of the subtraction as residual information to the orthogonal transform unit 34.

In Step S40, the orthogonal transform unit 34 performs orthogonal transform processing on the residual information. The orthogonal transform unit 34 outputs the orthogonal transform processing result obtained as a result of the orthogonal transform processing to the quantization unit 35.

In Step S41, the quantization unit 35 quantizes the orthogonal transform processing result supplied from the orthogonal transform unit 34. The quantization unit 35 outputs the quantized value obtained as a result of the quantization to the lossless encoding unit 36 and the inverse quantization unit 38.

In Step S42 of FIG. 11, the inverse quantization unit 38 inversely quantizes the quantized value from the quantization unit 35. The inverse quantization unit 38 outputs the orthogonal transform processing result obtained as a result of the inverse quantization to the inverse orthogonal transform unit 39.

In Step S43, the inverse orthogonal transform unit 39 performs inverse orthogonal transform processing on the orthogonal transform processing result. The inverse orthogonal transform unit 39 outputs the residual information obtained as a result of the inverse orthogonal transform processing to the addition unit 40.

In Step S44, the addition unit 40 adds the residual information supplied from the inverse orthogonal transform unit 39 and the predicted image supplied from the predicted image selection unit 48 together, to thereby perform decoding. The addition unit 40 outputs the decoded image to the deblocking filter 41 and the frame memory 44.

In Step S45, the deblocking filter 41 performs deblocking filter processing on the image supplied from the addition unit 40. The deblocking filter 41 outputs the image obtained as a result of the deblocking filter processing to the adaptive offset filter 42.

In Step S46, the adaptive offset filter 42 performs adaptive offset filter processing on the image obtained as a result of the deblocking filter processing. The adaptive offset filter 42 outputs the image obtained as a result of the adaptive offset filter processing to the adaptive loop filter 43. Further, the adaptive offset filter 42 outputs the offset filter information to the lossless encoding unit 36.

In Step S47, the adaptive loop filter 43 performs adaptive loop filter processing on the image obtained as a result of the adaptive offset filter processing. The adaptive loop filter 43 outputs the image obtained as a result of the adaptive loop filter processing to the frame memory 44. Further, the adaptive loop filter 43 outputs the filter coefficients used in the adaptive loop filter processing to the lossless encoding unit 36.

In Step S48, the frame memory 44 accumulates the image supplied from the adaptive loop filter 43 and the image supplied from the addition unit 40. Of the images accumulated in the frame memory 44 without being subjected to the filter processing, images neighboring the CUs are output as peripheral images to the intra prediction unit 46 through the switch 45. Meanwhile, the images subjected to the filter processing to be accumulated in the frame memory 44 are output as reference images to the motion prediction/compensation unit 47 through the switch 45.

In Step S49, the lossless encoding unit 36 losslessly encodes, as encoding information, the intra prediction mode information or the inter prediction mode information, the inter prediction parameters, the offset filter information, or the filter coefficients.

In Step S50, the lossless encoding unit 36 losslessly encodes the quantized value supplied from the quantization unit 35. Then, the lossless encoding unit 36 generates encoded data from the encoding information losslessly encoded by the processing in Step S49 and the losslessly-encoded quantized value and outputs the encoded data to the accumulation buffer 37.

In Step S51, the accumulation buffer 37 temporarily accumulates the encoded data supplied from the lossless encoding unit 36.

In Step S52, the rate control unit 49 controls the rate of the quantization operation by the quantization unit 35 on the basis of the encoded data accumulated in the accumulation buffer 37 so that neither overflow nor underflow occurs. After that, the encoding processing ends.

Note that, in the encoding processing of FIG. 10 and FIG. 11, for the sake of simple description, the intra prediction processing and the motion prediction/compensation processing are always performed, but in reality, only one of the intra prediction processing and the motion prediction/compensation processing may be performed depending on picture types or the like.

<Configuration Example of Decoding Device>

Figure 12:
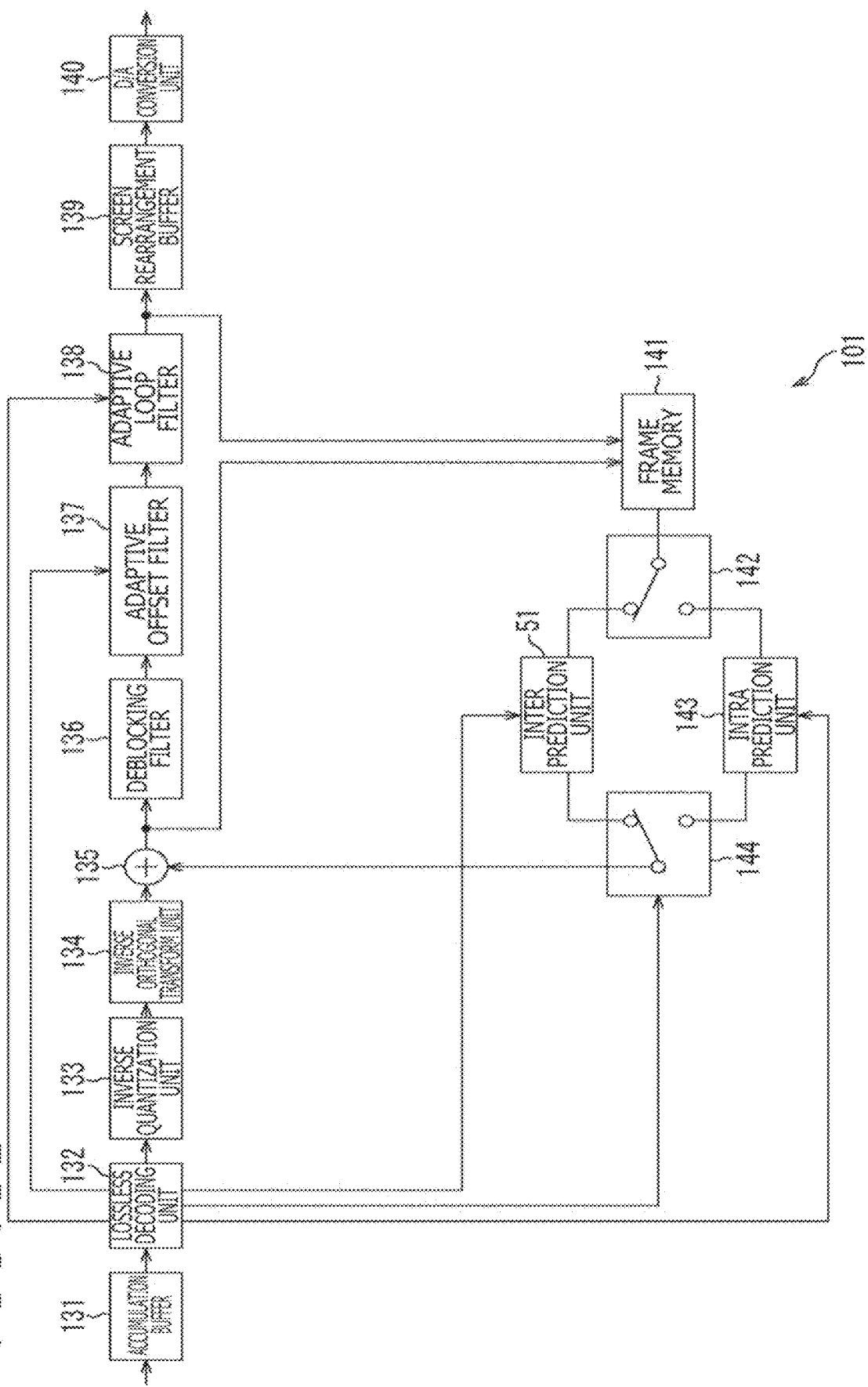
FIG. 12 is a block diagram illustrating a configuration example of an embodiment of a decoding device to which the present disclosure is applied.

FIG. 12 is a block diagram illustrating a configuration example of an embodiment of a decoding device to which the present disclosure is applied, which decodes encoded streams transmitted from the encoding device of FIG. 9.

A decoding device 101 of FIG. 12 includes an accumulation buffer 131, a lossless decoding unit 132, an inverse quantization unit 133, an inverse orthogonal transform unit 134, an addition unit 135, a deblocking filter 136, an adaptive offset filter 137, an adaptive loop filter 138, and a screen rearrangement buffer 139. Further, the decoding device 101 includes a D/A conversion unit 140, a frame memory 141, a switch 142, an intra prediction unit 143, the inter prediction unit 51, and a switch 144.

The accumulation buffer 131 of the decoding device 101 receives encoded data transmitted as encoded streams from the encoding device 1 of FIG. 9 and accumulates the encoded data. The accumulation buffer 131 outputs the accumulated encoded data to the lossless decoding unit 132.

The lossless decoding unit 132 performs lossless decoding such as variable length decoding or arithmetic decoding on encoded data from the accumulation buffer 131, to thereby obtain quantized values and encoding information. The lossless decoding unit 132 outputs the quantized values to the inverse quantization unit 133. The encoding information includes intra prediction mode information, inter prediction mode information, inter prediction parameters, offset filter information, filter coefficients, or the like.

Further, the lossless decoding unit 132 outputs the intra prediction mode information and the like to the intra prediction unit 143. The lossless decoding unit 132 outputs the inter prediction parameters, the inter prediction mode information, and the like to the inter prediction unit 51.

The lossless decoding unit 132 outputs the intra prediction mode information or the inter prediction mode information to the switch 144. The lossless decoding unit 132 outputs the offset filter information to the adaptive offset filter 137. The lossless decoding unit 132 outputs the filter coefficients to the adaptive loop filter 138.

The inverse quantization unit 133, the inverse orthogonal transform unit 134, the addition unit 135, the deblocking filter 136, the adaptive offset filter 137, the adaptive loop filter 138, the frame memory 141, the switch 142, the intra prediction unit 143, and the inter prediction unit 51 perform processing processes similar to those of the inverse quantization unit 38, the inverse orthogonal transform unit 39, the addition unit 40, the deblocking filter 41, the adaptive offset filter 42, the adaptive loop filter 43, the frame memory 44, the switch 45, the intra prediction unit 46, and the motion prediction/compensation unit 47 of FIG. 9. With this, images are decoded.

Specifically, the inverse quantization unit 133 is configured like the inverse quantization unit 38 of FIG. 9. The inverse quantization unit 133 inversely quantizes quantized values from the lossless decoding unit 132. The inverse quantization unit 133 outputs the orthogonal transform processing results obtained as a result of the inverse quantization to the inverse orthogonal transform unit 134.

The inverse orthogonal transform unit 134 is configured like the inverse orthogonal transform unit 39 of FIG. 9. The inverse orthogonal transform unit 134 performs inverse orthogonal transform processing on orthogonal transform processing results supplied from the inverse quantization unit 133. The inverse orthogonal transform unit 134 outputs the residual information obtained as a result of the inverse orthogonal transform processing to the addition unit 135.

The addition unit 135 adds residual information supplied from the inverse orthogonal transform unit 134 and predicted images supplied from the switch 144 together, to thereby perform decoding. The addition unit 135 outputs the decoded images to the deblocking filter 136 and the frame memory 141.

The deblocking filter 136 performs deblocking filter processing on images supplied from the addition unit 135 and outputs the images obtained as a result of the deblocking filter processing to the adaptive offset filter 137.

The adaptive offset filter 137 performs, by using offsets indicated by offset filter information from the lossless decoding unit 132, adaptive offset filter processing of types indicated by the offset filter information on images obtained as a result of deblocking filter processing. The adaptive offset filter 137 outputs the images obtained as a result of the adaptive offset filter processing to the adaptive loop filter 138.

The adaptive loop filter 138 performs adaptive loop filter processing on images supplied from the adaptive offset filter 137 by using filter coefficients supplied from the lossless decoding unit 132. The adaptive loop filter 138 outputs the images obtained as a result of the adaptive loop filter processing to the frame memory 141 and the screen rearrangement buffer 139.

The screen rearrangement buffer 139 stores images obtained as a result of adaptive loop filter processing in units of frames. The screen rearrangement buffer 139 rearranges the images in units of frames in the encoding order into the original display order and outputs the resultant to the D/A conversion unit 140.

The D/A conversion unit 140 performs D/A conversion on images in units of frames supplied from the screen rearrangement buffer 139 and outputs the resultant.

The frame memory 141 accumulates images obtained as a result of adaptive loop filter processing and images supplied from the addition unit 135. Of the images accumulated in the frame memory 141 without being subjected to the filter processing, images neighboring the CUs are supplied as peripheral images to the intra prediction unit 143 through the switch 142. Meanwhile, the images subjected to the filter processing to be accumulated in the frame memory 141 are output as reference images to the inter prediction unit 51 through the switch 142.

The intra prediction unit 143 performs, by using peripheral images read out from the frame memory 141 through the switch 142, intra prediction processing in an optimal intra prediction mode indicated by intra prediction mode information supplied from the lossless decoding unit 132. The intra prediction unit 143 outputs the thus generated predicted images to the switch 144.

The inter prediction unit 51 is configured like the one in FIG. 9. The inter prediction unit 51 performs, by using inter prediction parameters supplied from the lossless decoding unit 132, inter prediction in an optimal inter prediction mode indicated by inter prediction mode information, to thereby generate a predicted image.

The inter prediction unit 51 reads out, from the frame memory 141 through the switch 142, reference images specified by reference image information that is an inter prediction parameter supplied from the lossless decoding unit 132. The inter prediction unit 51 generates predicted images with BIO processing-included Bi prediction, for example, by using motion information that is an inter prediction parameter supplied from the lossless decoding unit 132 and the read-out reference images. The generated predicted images are output to the switch 144.

The switch 144 outputs, in a case where intra prediction mode information has been supplied from the lossless decoding unit 132, predicted images supplied from the intra prediction unit 143 to the addition unit 135. Meanwhile, the switch 144 outputs, in a case where inter prediction mode information has been supplied from the lossless decoding unit 132, predicted images supplied from the inter prediction unit 51 to the addition unit 135.

<Operation of Decoding Device>

Figure 13:
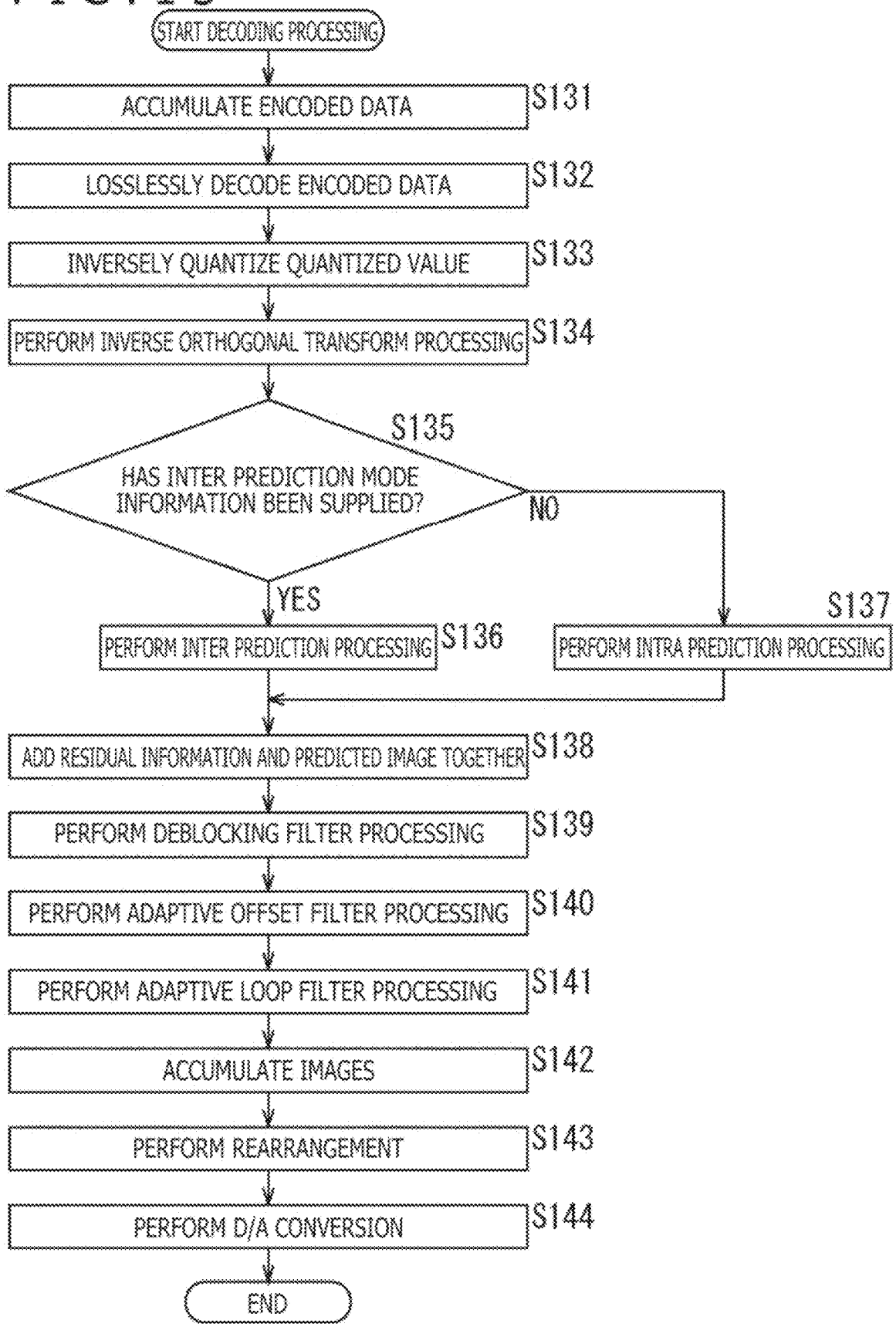
FIG. 13 is a flowchart illustrating details of decoding processing by the decoding device.

FIG. 13 is a flowchart illustrating the details of decoding processing by the decoding device.

In Step S131 of FIG. 13, the accumulation buffer 131 of the decoding device 101 receives encoded data in units of frames supplied from the preceding stage, which is not illustrated, and accumulates the encoded data. The accumulation buffer 131 outputs the accumulated encoded data to the lossless decoding unit 132.

In Step S132, the lossless decoding unit 132 losslessly decodes the encoded data from the accumulation buffer 131 to obtain a quantized value and encoding information. The lossless decoding unit 132 outputs the quantized value to the inverse quantization unit 133.

The lossless decoding unit 132 outputs intra prediction mode information and the like to the intra prediction unit 143. The lossless decoding unit 132 outputs inter prediction parameters, inter prediction mode information, and the like to the inter prediction unit 51.

Further, the lossless decoding unit 132 outputs the intra prediction mode information or the inter prediction mode information to the switch 144. The lossless decoding unit 132 supplies offset filter information to the adaptive offset filter 137 and outputs filter coefficients to the adaptive loop filter 138.

In Step S133, the inverse quantization unit 133 inversely quantizes the quantized value supplied from the lossless decoding unit 132. The inverse quantization unit 133 outputs the orthogonal transform processing result obtained as a result of the inverse quantization to the inverse orthogonal transform unit 134.

In Step S134, the inverse orthogonal transform unit 134 performs orthogonal transform processing on the orthogonal transform processing result supplied from the inverse quantization unit 133.

In Step S135, the inter prediction unit 51 determines whether the inter prediction mode information has been supplied from the lossless decoding unit 132. In a case where it is determined in Step S135 that the inter prediction mode information has been supplied, the processing proceeds to Step S136.

In Step S136, the inter prediction unit 51 reads out reference images on the basis of reference image specification information supplied from the lossless decoding unit 132, and performs, by using motion information and the reference images, motion compensation processing in an optimal inter prediction mode indicated by the inter prediction mode information. For example, the inter prediction unit 51 generates a predicted image with BIO processing-included Bi prediction. The inter prediction unit 51 outputs the generated predicted image to the addition unit 135 through the switch 144. After that, the processing proceeds to Step S138.

Meanwhile, in a case where it is determined in Step S135 that the inter prediction mode information has not been supplied, that is, in a case where the intra prediction mode information has been supplied to the intra prediction unit 143, the processing proceeds to Step S137.

In Step S137, the intra prediction unit 143 performs, by using peripheral images read out from the frame memory 141 through the switch 142, intra prediction processing in an intra prediction mode indicated by the intra prediction mode information. The intra prediction unit 143 outputs the predicted image generated as a result of the intra prediction processing to the addition unit 135 through the switch 144. After that, the processing proceeds to Step S138.

In Step S138, the addition unit 135 adds residual information supplied from the inverse orthogonal transform unit 134 and the predicted image supplied from the switch 144 together, to thereby perform decoding. The addition unit 135 outputs the decoded image to the deblocking filter 136 and the frame memory 141.

In Step S139, the deblocking filter 136 performs deblocking filter processing on the image supplied from the addition unit 135 to remove block deformation. The deblocking filter 136 outputs the image obtained as a result of the deblocking filter processing to the adaptive offset filter 137.

In Step S140, the adaptive offset filter 137 performs, on the basis of the offset filter information supplied from the lossless decoding unit 132, adaptive offset filter processing on the image obtained as a result of the deblocking filter processing. The adaptive offset filter 137 outputs the image obtained as a result of the adaptive offset filter processing to the adaptive loop filter 138.

In Step S141, the adaptive loop filter 138 performs, by using the filter coefficients supplied from the lossless decoding unit 132, adaptive loop filter processing on the image supplied from the adaptive offset filter 137. The adaptive loop filter 138 supplies the image obtained as a result of the adaptive loop filter processing to the frame memory 141 and the screen rearrangement buffer 139.

In Step S142, the frame memory 141 accumulates the image supplied from the addition unit 135 and the image supplied from the adaptive loop filter 138. Of the images accumulated in the frame memory 141 without being subjected to the filter processing, images neighboring the CUs are supplied as peripheral images to the intra prediction unit 143 through the switch 142. Meanwhile, the images subjected to the filter processing to be accumulated in the frame memory 141 are supplied as reference images to the inter prediction unit 51 through the switch 142.

In Step S143, the screen rearrangement buffer 139 stores the images supplied from the adaptive loop filter 138 in units of frames. The screen rearrangement buffer 139 rearranges the images in units of frames in the encoding order into the original display order and outputs the resultant to the D/A conversion unit 140.

In Step S144, the D/A conversion unit 140 performs D/A conversion on the image obtained as a result of the adaptive loop filter processing and outputs the resultant.

<Configuration Example of Inter Prediction Unit>

Figure 14:
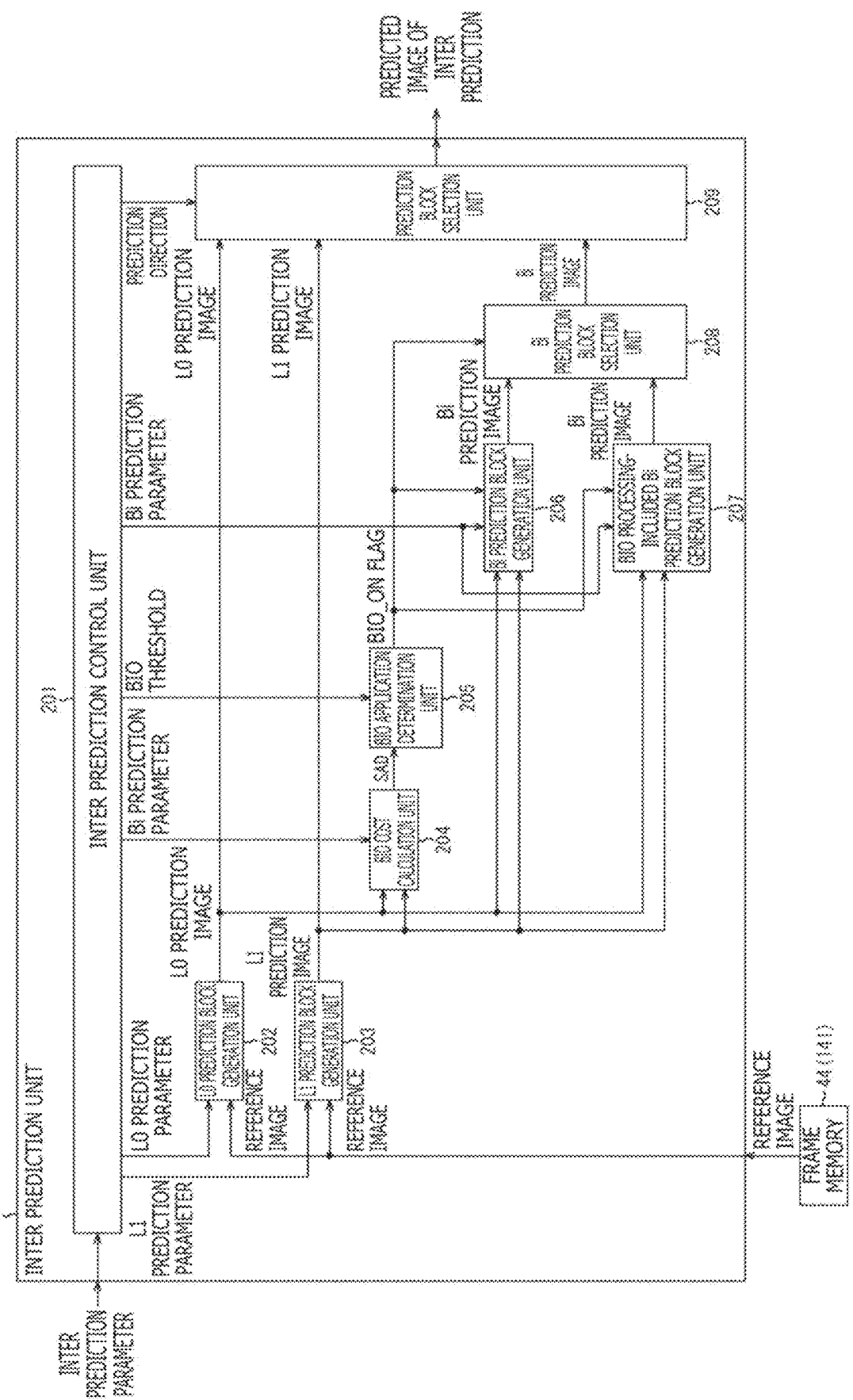
FIG. 14 is a block diagram illustrating a configuration example of an inter prediction unit.

FIG. 14 is a block diagram illustrating a configuration example of the inter prediction unit.

In FIG. 14, the inter prediction unit 51 includes an inter prediction control unit 201, an L0 prediction block generation unit 202, an L1 prediction block generation unit 203, a BIO cost calculation unit 204, a BIO application determination unit 205, a Bi prediction block generation unit 206, a BIO processing-included Bi prediction block generation unit 207, a Bi prediction block selection unit 208, and a prediction block selection unit 209.

The inter prediction control unit 201 receives, in the case of the encoding device 1, inter prediction parameters from the motion prediction/compensation unit 47 (from the lossless decoding unit 132 in the case of the decoding device 101).

The inter prediction parameters include a PU position in a frame, a PU size, a prediction direction (any one of L0, L1, and Bi is set), reference image information, motion information, and the like.

The inter prediction control unit 201 includes, for example, a CPU (Central Processing Unit) or a microprocessor. The inter prediction control unit 201 executes a predetermined program by the CPU to control the units on the basis of the contents of inter prediction parameters.

The inter prediction control unit 201 supplies L0 prediction parameters to the L0 prediction block generation unit 202, thereby controlling the L0 prediction block generation unit 202. The L0 prediction parameters include PU positions, PU sizes, reference image information REFIDX_L0, and motion information MV_L0.

The inter prediction control unit 201 supplies L1 prediction parameters to the L1 prediction block generation unit 203, thereby controlling the L1 prediction block generation unit 203. The L1 prediction parameters include PU positions, PU sizes, reference image information REFIDX_L1, and motion information MV_L1.

The inter prediction control unit 201 supplies Bi prediction parameters to the BIO cost calculation unit 204, the Bi prediction block generation unit 206, and the BIO processing-included Bi prediction block generation unit 207, thereby controlling the BIO cost calculation unit 204, the Bi prediction block generation unit 206, and the BIO processing-included Bi prediction block generation unit 207. The Bi prediction parameters include PU sizes and the like.

The inter prediction control unit 201 supplies a BIO threshold to the BIO application determination unit 205, thereby controlling the BIO application determination unit 205.

The inter prediction control unit 201 supplies a prediction direction to the prediction block selection unit 209, thereby controlling the prediction block selection unit 209.

The L0 prediction block generation unit 202 operates when the prediction direction is L0 or Bi. The L0 prediction block generation unit 202 accesses the frame memory 44 on the basis of L0 prediction parameters supplied from the inter prediction control unit 201, to thereby generate L0 prediction images from reference images. The generated L0 prediction images are supplied from the L0 prediction block generation unit 202 to the BIO cost calculation unit 204, the BIO application determination unit 205, the Bi prediction block generation unit 206, the BIO processing-included Bi prediction block generation unit 207, and the prediction block selection unit 209.

The L1 prediction block generation unit 203 operates when the prediction direction is L1 or Bi. The L1 prediction block generation unit 203 accesses the frame memory 44 on the basis of L1 prediction parameters supplied from the inter prediction control unit 201, to thereby generate L1 prediction images from reference images. The generated L1 prediction images are supplied from the L1 prediction block generation unit 203 to the BIO cost calculation unit 204, the BIO application determination unit 205, the Bi prediction block generation unit 206, the BIO processing-included Bi prediction block generation unit 207, and the prediction block selection unit 209.

The BIO cost calculation unit 204 operates when the prediction direction is Bi. The BIO cost calculation unit 204 calculates, on the basis of Bi prediction parameters supplied from the inter prediction control unit 201, the SAD of an L0 prediction image supplied from the L0 prediction block generation unit 202 and an L1 prediction image supplied from the L1 prediction block generation unit 203. The calculated SAD is supplied from the BIO cost calculation unit 204 to the BIO application determination unit 205.

The BIO application determination unit 205 operates when the prediction direction is Bi. The BIO application determination unit 205 compares the BIO threshold supplied from the inter prediction control unit 201 to a SAD supplied from the BIO cost calculation unit 204, thereby determining a BIO_ON flag. When the SAD is larger than the BIO threshold, the BIO_ON flag is determined to BIO_ON=1 that indicates the application of BIO, and when the SAD is smaller than the BIO threshold, the BIO_ON flag is determined to BIO_ON=0 that indicates the prohibition of the application of BIO.

The determined BIO_ON flag is supplied from the BIO application determination unit 205 to the Bi prediction block generation unit 206, the BIO processing-included Bi prediction block generation unit 207, and the Bi prediction block selection unit 208.

The Bi prediction block generation unit 206 operates on the basis of the BIO_ON flag supplied from the BIO application determination unit 205 when the prediction direction is Bi and BIO_ON=0 holds. The Bi prediction block generation unit 206 generates, on the basis of Bi prediction parameters supplied from the inter prediction control unit 201, Bi prediction images from L0 prediction images supplied from the L0 prediction block generation unit 202 and L1 prediction images supplied from the L1 prediction block generation unit 203. The generated Bi prediction images are supplied from the Bi prediction block generation unit 206 to the Bi prediction block selection unit 208.

The BIO processing-included Bi prediction block generation unit 207 operates on the basis of the BIO_ON flag supplied from the BIO application determination unit 205 when the prediction direction is Bi and BIO_ON=1 holds. The Bi prediction block generation unit 206 generates, on the basis of Bi prediction parameters supplied from the inter prediction control unit 201, BIO processing-included Bi prediction images from L0 prediction images supplied from the L0 prediction block generation unit 202 and L1 prediction images supplied from the L1 prediction block generation unit 203. The generated BIO processing-included Bi prediction images are supplied from the BIO processing-included Bi prediction block generation unit 207 to the Bi prediction block selection unit 208.

The Bi prediction block selection unit 208 selects Bi prediction images on the basis of the BIO_ON flag supplied from the BIO application determination unit 205. The Bi prediction block selection unit 208 selects Bi prediction images supplied from the Bi prediction block generation unit 206 in a case where BIO_ON=0 holds, and selects BIO processing-included Bi prediction images supplied from the BIO processing-included Bi prediction block generation unit 207 in a case where BIO_ON=1 holds. The selected Bi prediction images are supplied from the Bi prediction block selection unit 208 to the prediction block selection unit 209.

The prediction block selection unit 209 selects predicted images on the basis of a prediction direction supplied from the inter prediction control unit 201 and outputs the selected predicted images as the predicted images of inter prediction to the predicted image selection unit 48 of FIG. 9 (or the switch 144 of FIG. 12) on the subsequent stage.

The prediction block selection unit 209 selects L0 prediction images supplied from the L0 prediction block generation unit 202 in a case where the prediction direction is L0, and selects L1 prediction images supplied from the L1 prediction block generation unit 203 in a case where the prediction direction is L1. The prediction block selection unit 209 selects Bi prediction images supplied from the Bi prediction block selection unit 208 in a case where the prediction direction is Bi.

<Operation Example of Inter Prediction Unit>

Figure 15:
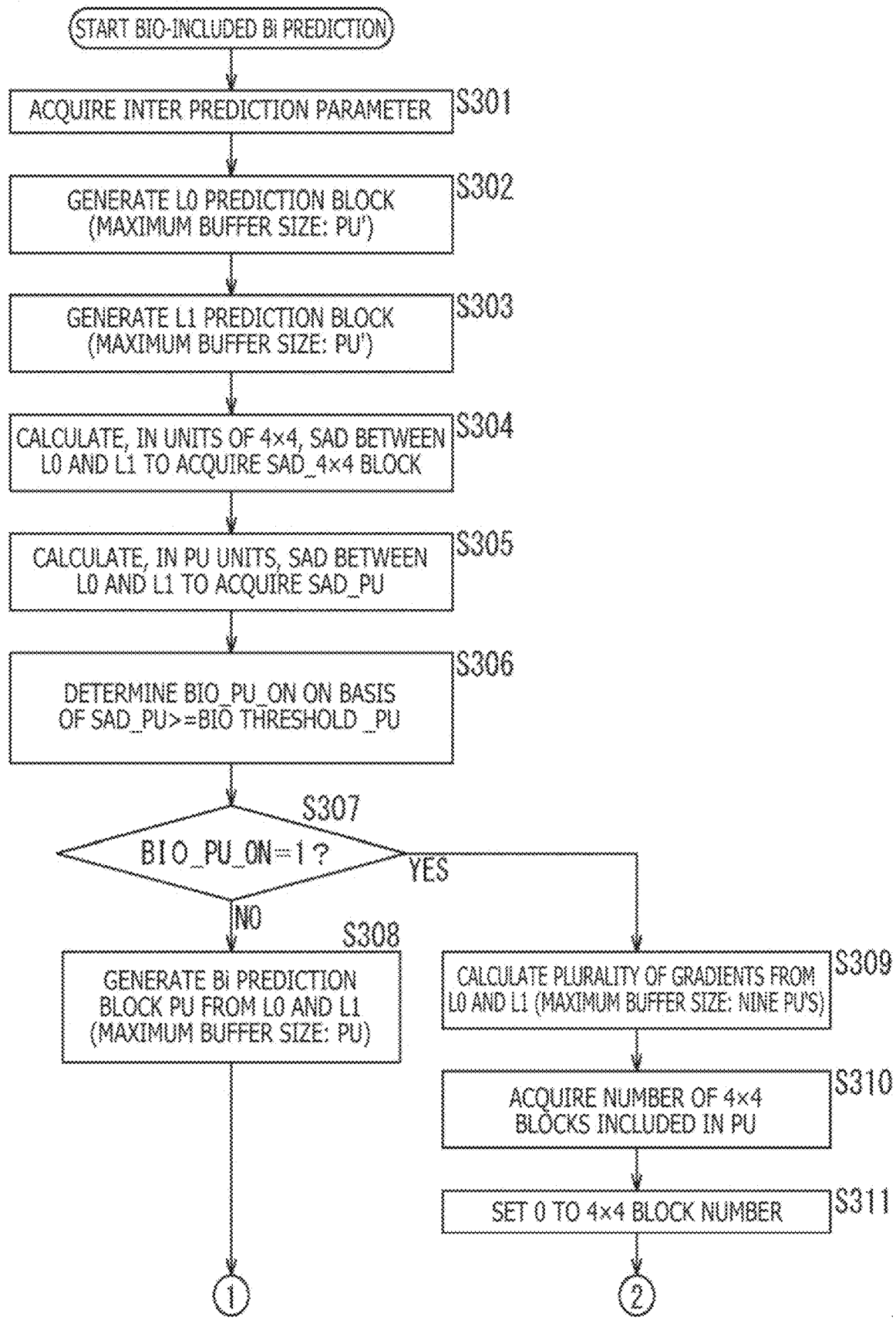
FIG. 15 is a flowchart illustrating related-art BIO-included Bi prediction.
Figure 16:
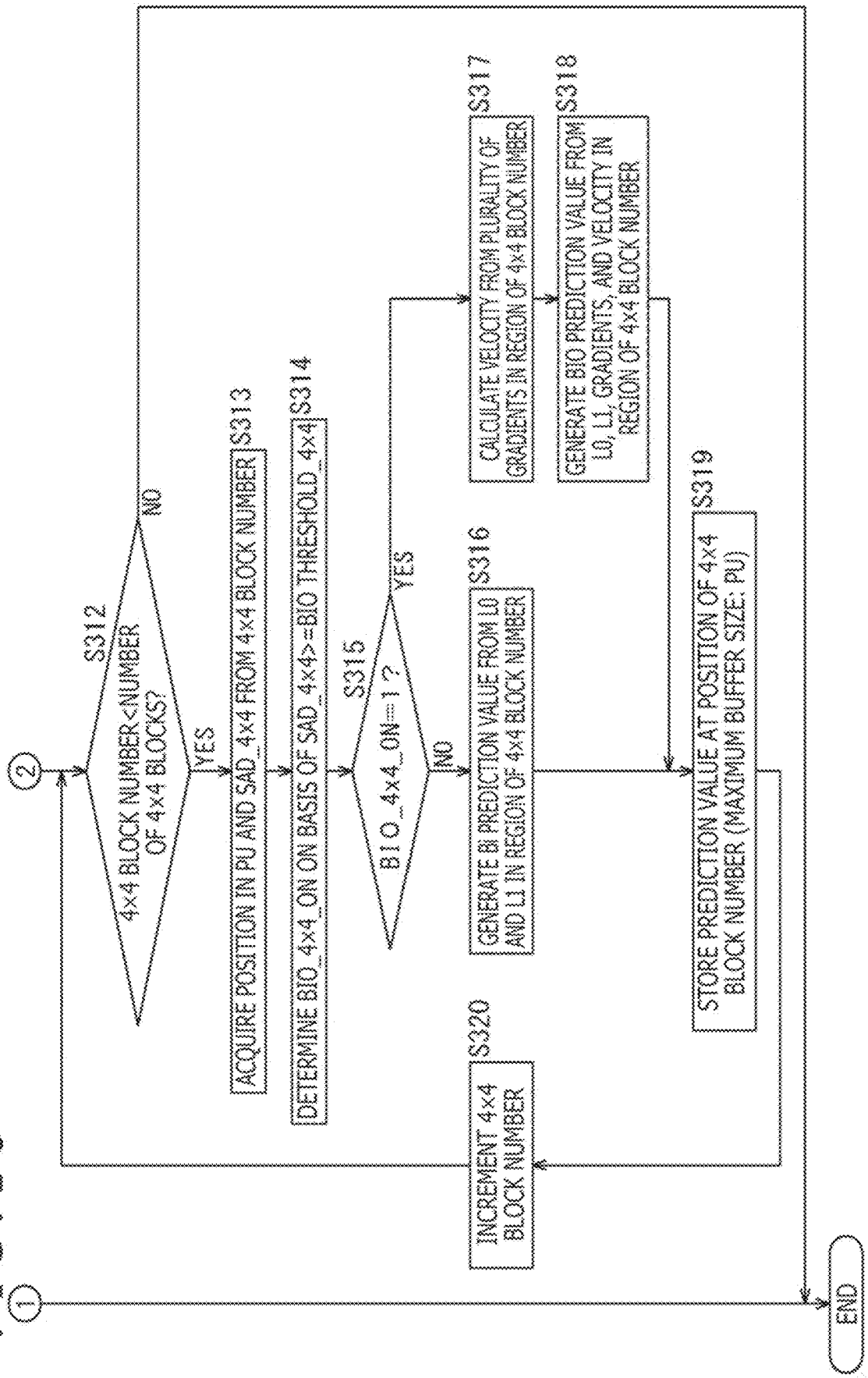
FIG. 16 is a flowchart illustrating the related-art BIO-included Bi prediction, which is a continuation of FIG. 15.

FIG. 15 and FIG. 16 are flowcharts illustrating BIO-included Bi prediction that is performed by the inter prediction unit 51.

Note that, this processing is related-art BIO-included Bi prediction processing that is compared to BIO-included Bi prediction processing of the present technology described later. Further, this BIO-included Bi prediction processing is processing that is performed on the encoding side and the decoding side, is part of the motion prediction/compensation processing in Step S34 of FIG. 10, and is part of the inter prediction processing in Step S136 of FIG. 13.

In Step S301 of FIG. 15, the inter prediction control unit 201 acquires inter prediction parameters supplied from the motion prediction/compensation unit 47. Note that, in the case of the decoding device 101, the inter prediction parameters are supplied from the lossless decoding unit 132.

The inter prediction parameters include a PU position in a frame, a PU size, a prediction direction (any one of L0, L1, and Bi is set), reference image information, motion information, and the like.

The inter prediction control unit 201 supplies L0 prediction parameters to the L0 prediction block generation unit

202. The L0 prediction parameters include a PU position, a PU size, reference image information REFIDX_L0, and motion information MV_L0. The inter prediction control unit 201 supplies L1 prediction parameters to the L1 prediction block generation unit 203. The L1 prediction parameters include a PU position, a PU size, reference image information REFIDX_L1, and motion information MV_L1.

The inter prediction control unit 201 supplies Bi prediction parameters to the BIO cost calculation unit 204, the Bi prediction block generation unit 206, and the BIO processing-included Bi prediction block generation unit 207. The Bi prediction parameters are information indicating PU sizes.

The inter prediction control unit 201 supplies the BIO threshold to the BIO application determination unit 205. The inter prediction control unit 201 supplies a prediction direction to the prediction block selection unit 209, thereby controlling the prediction block selection unit 209.

In Step S302, the L0 prediction block generation unit 202 accesses the frame memory 44 on the basis of the L0 prediction parameters supplied from the inter prediction control unit 201, to thereby generate an L0 prediction image from a reference image. Note that, in the case of the decoding device 101, the reference image is referred to through an access to the frame memory 141.

In Step S303, the L1 prediction block generation unit 203 accesses the frame memory 44 on the basis of the L1 prediction parameters supplied from the inter prediction control unit 201, to thereby generate an L1 prediction image from a reference image.

The maximum buffer size in the processing in Steps S302 and S303 is a PU' size. The PU' size represents a size that corresponds to the PU size and is slightly larger than the PU size.

In Step S304, the BIO cost calculation unit 204 calculates, in units of 4×4, the SAD of the L0 prediction image supplied from the L0 prediction block generation unit 202 and the L1 prediction image supplied from the L1 prediction block generation unit 203. The SADs calculated in units of 4×4 are accumulated so that SAD_4×4 block that is the sum of the SADs is acquired.

In Step S305, the BIO cost calculation unit 204 calculates, in units of PUs, the SAD of the L0 prediction image supplied from the L0 prediction block generation unit 202 and the L1 prediction image supplied from the L1 prediction block generation unit 203. The SADs calculated in units of PUs are accumulated so that SAD_PU that is the sum of the SADs is acquired. The acquired SAD_PU is supplied from the BIO cost calculation unit 204 to the BIO application determination unit 205.

In Step S306, the BIO application determination unit 205 determines a BIO_PU_ON flag on the basis of SAD_PU>=BIO threshold_PU. SAD_PU is supplied from the BIO cost calculation unit 204 and BIO threshold_PU is supplied from the inter prediction control unit 201. The determined BIO_PU_ON flag is supplied from the BIO application determination unit 205 to the Bi prediction block generation unit 206, the BIO processing-included Bi prediction block generation unit 207, and the Bi prediction block selection unit 208.

When the SAD is larger than the BIO threshold, the BIO_PU_ON flag is determined to BIO_PU_ON=1 that indicates the application of BIO, and when the SAD is smaller than the BIO threshold, the BIO_PU_ON flag is determined to BIO_PU_ON=0 that indicates the prohibition of the application of BIO.

In Step S307, the Bi prediction block generation unit 206 and the BIO processing-included Bi prediction block generation unit 207 determine whether or not the BIO_PU_ON flag is 1.

In a case where it is determined in Step S307 that the BIO_PU_ON flag is not 1, the processing proceeds to Step S308.

In Step S308, the Bi prediction block generation unit 206 generates a Bi prediction block PU from the L0 prediction image supplied from the L0 prediction block generation unit 202 and the L1 prediction image supplied from the L1 prediction block generation unit 203. The generated Bi prediction block PU is supplied from the Bi prediction block generation unit 206 to the Bi prediction block selection unit 208. After that, the BIO-included Bi prediction processing ends.

The maximum buffer size in the processing in Step S308 is the PU size.

Meanwhile, in a case where it is determined in Step S307 that the BIO_PU_ON flag is 1, the processing proceeds to Step S309.

In Steps S309 to S320, the BIO processing-included Bi prediction block generation unit 207 performs the processing of generating a BIO processing-included Bi prediction image.

In Step S309, the BIO processing-included Bi prediction block generation unit 207 calculates a plurality of gradients from the L0 prediction image supplied from the L0 prediction block generation unit 202 and the L1 prediction image supplied from the L1 prediction block generation unit 203. The maximum buffer size in the processing in Step S309 is the total size of nine PU's.

In Step S310, the BIO processing-included Bi prediction block generation unit 207 acquires the number of 4×4 blocks included in the PU.

In Step S311, the BIO processing-included Bi prediction block generation unit 207 sets 0 to the 4×4 block number.

In Step S312 of FIG. 16, the BIO processing-included Bi prediction block generation unit 207 determines whether or not the 4×4 block number is smaller than the number of 4×4 blocks.

In a case where it is determined in Step S312 that the 4×4 block number is smaller than the number of 4×4 blocks, the processing proceeds to Step S313.

In Step S313, the BIO processing-included Bi prediction block generation unit 207 acquires the position in the PU and SAD_4×4 from the 4×4 block number.

In Step S314, the BIO processing-included Bi prediction block generation unit 207 determines BIO_4×4_ON on the basis of SAD_4×4>=BIO threshold_4×4.

In Step S315, the BIO processing-included Bi prediction block generation unit 207 determines whether or not the BIO_4×4_ON flag is 1.

In a case where it is determined in Step S315 that the BIO_4×4_ON flag is not 1, the processing proceeds to Step S316.

In Step S316, the BIO processing-included Bi prediction block generation unit 207 generates a Bi prediction value from the L0 prediction image and the L1 prediction image in the region of the 4×4 block number.

In a case where it is determined in Step S315 that the BIO_4×4_ON flag is 1, the processing proceeds to Step S317.

In Step S317, the BIO processing-included Bi prediction block generation unit 207 calculates a velocity from the plurality of gradients in the region of the 4×4 block number.

In Step S318, the BIO processing-included Bi prediction block generation unit 207 generates a BIO prediction value from the L0 prediction image, the L1 prediction image, the gradients, and the velocity in the region of the 4×4 block number.

After Steps S316 and S318, the processing proceeds to Step S319.

In Step S319, the BIO processing-included Bi prediction block generation unit 207 stores the prediction value at the position of the 4×4 block number in the buffer. The maximum buffer size in the processing in Step 319 is the PU size.

In Step S320, the BIO processing-included Bi prediction block generation unit 207 increments the 4×4 block number. After that, the processing returns to Step S312, and the later processing is repeated.

After Step S308 or in a case where it is determined in Step S312 that the 4×4 block number is not smaller than the number of 4×4 blocks, the BIO-included Bi prediction ends.

Note that, in the BIO-included Bi processing described above, the SAD of the L0 prediction block and the L1 prediction block is calculated for the entire PU in Step S305, the SAD is compared to the threshold to determine whether or not to apply BIO processing in Step S306, and the processing branches in Step S307.

Thus, it is difficult to virtually partition, in a case where inter prediction is performed on PUs larger than VPDUs, the PU into a plurality of vPUs. As a result, the PU' size, which is slightly larger than the PU size, is required for the buffers required in Steps S302, S303, and S309 to achieve the gradient calculation in Step S309 and the velocity calculation in Step S317. The maximum PU' size is a size of 130×130 obtained by adding 2 to the PU horizontal size and the PU vertical size.

Further, in Step S308, the buffer having the PU size is required. These mean that the BIO-included inter prediction unit 51 requires a large buffer resource.

Further, in a case where the inter prediction unit 51 that requires this buffer is implemented by HW (hardware), due to a large difference between the pipeline delay of BIO-included inter prediction and the pipeline delay of TU processing, HW implementation that maintains throughput is difficult to achieve.

This affects both the encoding and decoding sides. On the encoding side, this can be avoided by a self-limiting process such as always splitting CUs into 64×64 or less. In order to secure the degree of freedom of the encoding side, however, a solution is desired. On the decoding side, which is required to meet the standard, a large HW resource is essential.

Accordingly, as described above, in the present technology, a unit of processing in calculation of a cost that is used for determining whether or not to perform bidirectional prediction such as BIO is partitioned into partitioned processing units each of which corresponds to the VPDU size or is equal to or smaller than the VPDU size, and the determination is made by using the cost calculated on the basis of the partitioned processing units.

The size corresponding to the VPDU size means the VPDU' size slightly larger than the VPDU size.

<Operation Example of Inter Prediction Unit>

Figure 17:
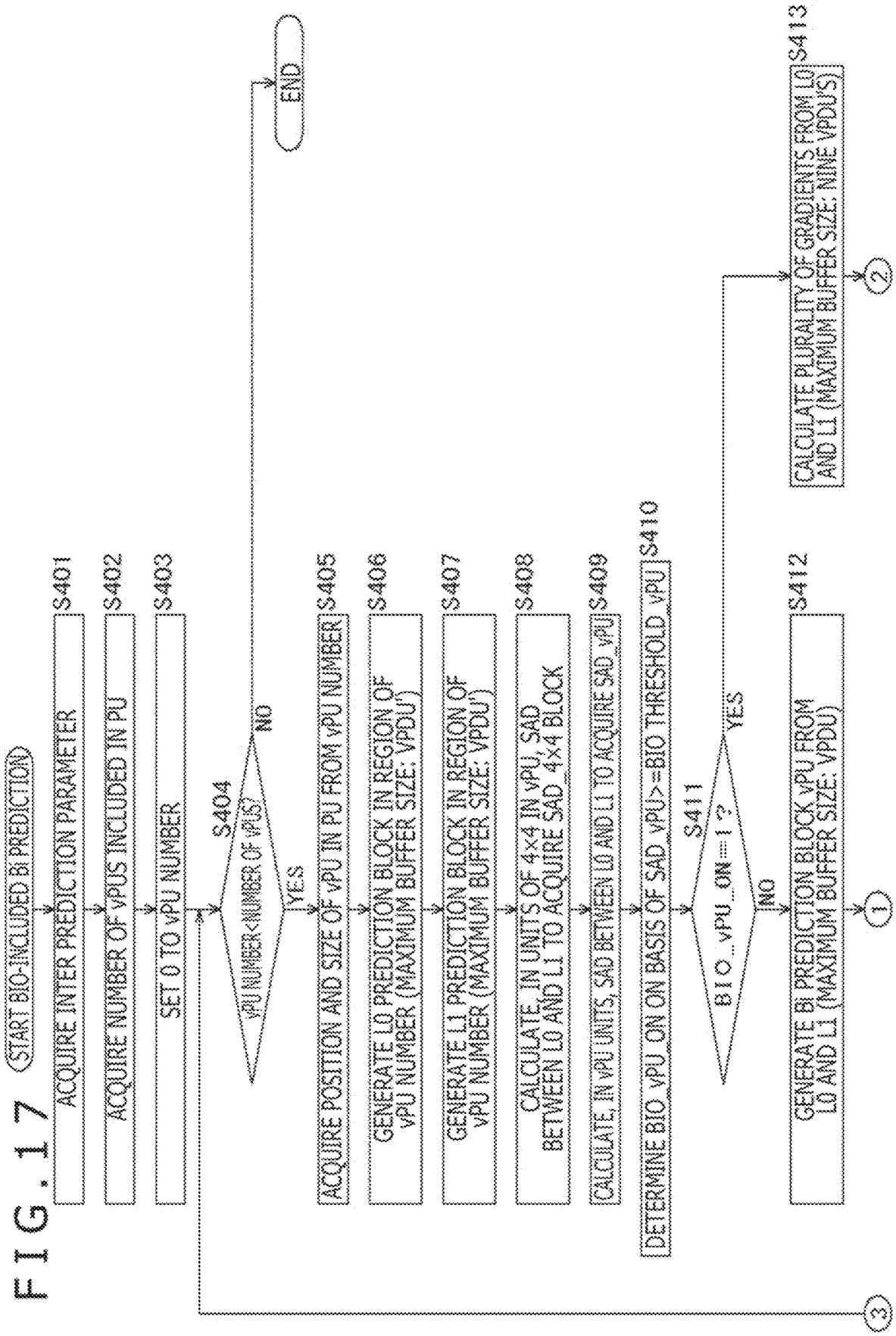
FIG. 17 is a flowchart illustrating BIO-included Bi prediction according to a first embodiment of the present technology.
Figure 18:
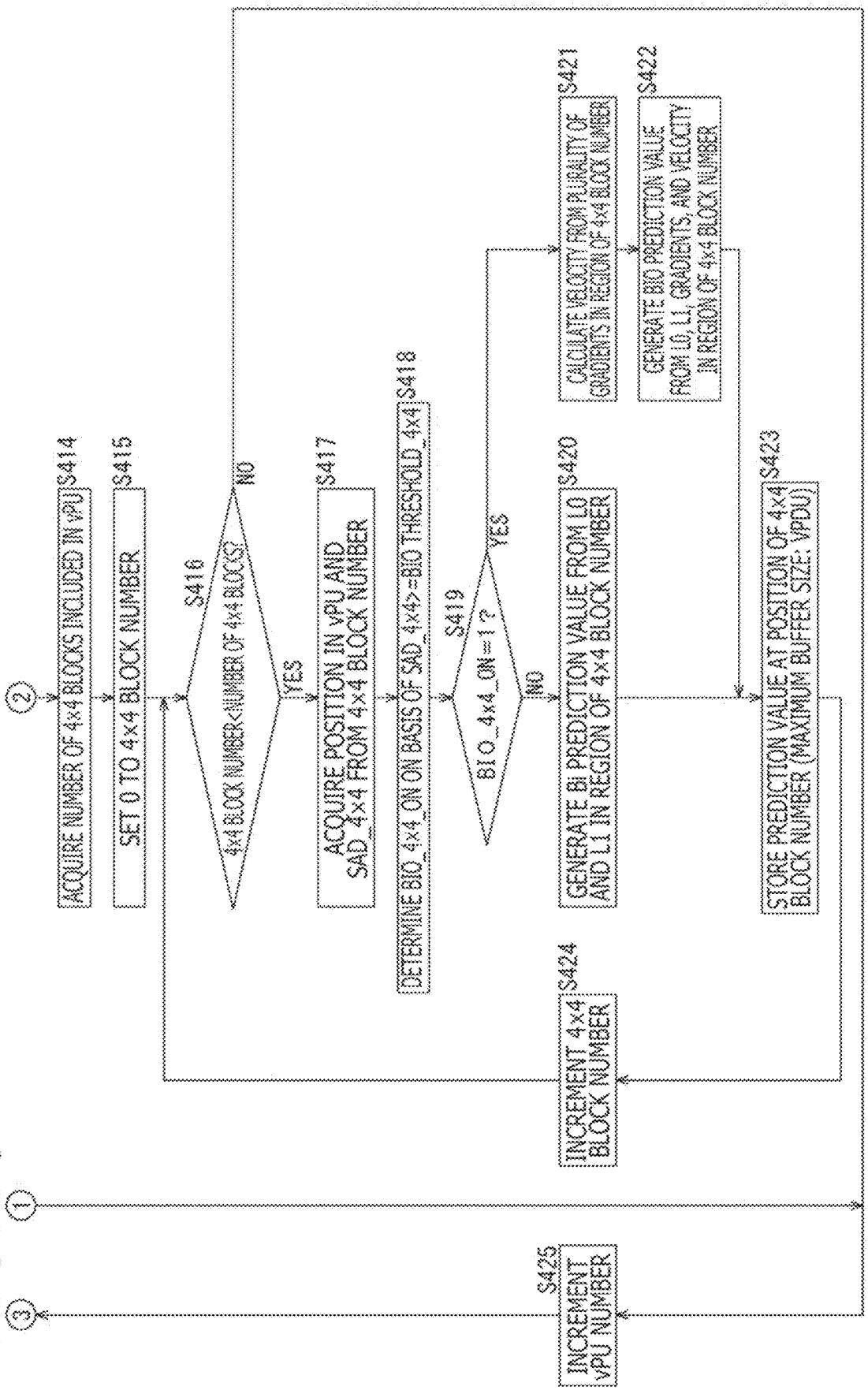
FIG. 18 is a flowchart illustrating the BIO-included Bi prediction according to the first embodiment of the present technology, which is a continuation of FIG. 17.

FIG. 17 and FIG. 18 are flowcharts illustrating, as an operation example according to the first embodiment of the present technology, BIO-included Bi prediction that is performed by the inter prediction unit 51.

The case of the encoding device 1 is illustrated in FIG. 17 and FIG. 18, and since similar processing is performed in the case of the decoding device 101, the description thereof is omitted.

In Step S401, the inter prediction control unit 201 acquires inter prediction parameters supplied from the motion prediction/compensation unit 47.

In Step S402, the inter prediction control unit 201 acquires the number of vPUs included in the PU. That is, in a case where PUs are larger than VPDUs, the PU is virtually partitioned into a plurality of vPUs. In a case where the PU is 128×128, 4 is set to the number of vPUs. In a case where the PU is 128×64 or 64×128, 2 is set to the number of vPUs. In a case where the PU is 64×64 or less, 1 is set to the number of vPUs. In the case where the number of vPUs is 1, the PU is not virtually partitioned, and processing similar to that of FIG. 15 and FIG. 16 is substantially performed.

In Step S403, the inter prediction control unit 201 sets 0 as a vPU number that is processed first.

In Step S404, the inter prediction control unit 201 determines whether or not the vPU number is smaller than the number of vPUs.

In a case where it is determined in Step S404 that the vPU number is smaller than the number of vPUs, the processing proceeds to Step S405.

In Step S405, the inter prediction control unit 201 acquires, from the PU size and the vPU number, the position and size of the vPU indicating a region in the PU to be processed.

FIG. 19 is a diagram illustrating the correspondences between PU size, vPU number, and processing position and size.

When the PU size is 128×128 and the vPU number is 0, the processing position is at the upper left and the size is 64×64. When the vPU number is 1, the processing position is at the upper right and the size is 64×64. When the vPU number is 2, the processing position is at the lower left and the size is 64×64. When the vPU number is 3, the processing position is at the lower right and the size is 64×64.

When the PU size is 128×64 and the vPU number is 0, the processing position is on the left and the size is 64×64. When the vPU number is 1, the processing position is on the right and the size is 64×64.

When the PU size is 64×128 and the vPU number is 0, the processing position is at the top and the size is 64×64. When the vPU number is 1, the processing position is at the bottom and the size is 64×64.

When the PU size is 64×64 or less and the vPU number is 0, the processing position is the PU itself.

Returning to FIG. 17, the position and size of the vPU acquired in Step S405 are supplied to the L0 prediction block generation unit 202 and the L1 prediction block generation unit 203.

In Step S406, the L0 prediction block generation unit 202 generates an L0 prediction block in the region of the vPU number.

In Step S407, the L1 prediction block generation unit 203 generates an L1 prediction block in the region of the vPU number.

The maximum buffer size in the processing in Steps 406 and S407 is, for example, the VPDU' size including a slightly large region that is required for the gradient calculation in Step S413 and the velocity calculation in Step S421. The VPDU' size represents the above-mentioned size corresponding to the VPDU size, which is the size slightly larger than the VPDU size. The VPDU' size is 66×66 obtained by adding 2 to the horizontal and vertical sizes, for example.

In the determination of BIO application on the subsequent stage, SAD values up to the VPDU size are used, and hence the buffer size for storing the L0 prediction block and L1 prediction block generated here can be based on the VPDU size.

In Step S408, the BIO cost calculation unit 204 calculates, in units of 4×4 in the vPU, the SAD of the L0 prediction image supplied from the L0 prediction block generation unit 202 and the L1 prediction image supplied from the L1 prediction block generation unit 203. The SADs calculated in units of 4×4 are accumulated so that SAD_4×4 block that is the sum of the SADs is acquired.

To determine whether to apply BIO by a 4×4 block unit, which is the unit in velocity calculation, to thereby achieve early termination for non-effective cases on the subsequent stage, this SAD_4×4 block is required to be stored. However, the buffer size for storing SAD_4×4 block can be reduced to ¼ of the size in Step S304 of FIG. 15.

In Step S409, the BIO cost calculation unit 204 calculates, in units of vPUs, the SAD of the L0 prediction image supplied from the L0 prediction block generation unit 202 and the L1 prediction image supplied from the L1 prediction block generation unit 203. The SADs calculated in units of vPUs are accumulated so that SAD_vPU that is the sum of the SADs is acquired. The acquired SAD_vPU is supplied from the BIO cost calculation unit 204 to the BIO application determination unit 205.

In Step S410, the BIO application determination unit 205 determines the BIO_vPU_ON flag on the basis of SAD_vPU>=BIO threshold_vPU. SAD_vPU is supplied from the BIO cost calculation unit 204 and BIO threshold_vPU is supplied from the inter prediction control unit 201. BIO threshold_vPU is a value obtained by scaling BIO threshold_PU to a value based on the vPU size obtained in Step S405.

The determined BIO_vPU_ON flag is supplied from the BIO application determination unit 205 to the Bi prediction block generation unit 206, the BIO processing-included Bi prediction block generation unit 207, and the Bi prediction block selection unit 208.

In Step S411, the Bi prediction block generation unit 206 and the BIO processing-included Bi prediction block generation unit 207 determine whether or not the BIO_vPU_ON flag is 1.

In a case where it is determined in Step S411 that the BIO_vPU_ON flag is not 1, the processing proceeds to Step S412 since BIO is not effective to the entire vPU.

In Step S412, the Bi prediction block generation unit 206 generates a Bi prediction block vPU from the L0 prediction image supplied from the L0 prediction block generation unit 202 and the L1 prediction image supplied from the L1 prediction block generation unit 203. The generated Bi prediction block vPU is stored in the buffer and supplied from the Bi prediction block generation unit 206 to the Bi prediction block selection unit 208.

In a case where the pipeline is structured in HW implementation, TU processing in units of VPDUs is executed in parallel to vPU inter prediction, and hence next processing can start at this timing. Thus, it is enough that the buffer prepared here to store Bi prediction has the maximum VPDU size. After that, the processing proceeds to Step S425 of FIG. 18.

Meanwhile, in a case where it is determined in Step S411 that the BIO_vPU_ON flag is 1, the processing proceeds to Step S413.

In Step S413, the BIO processing-included Bi prediction block generation unit 207 calculates a plurality of gradients from the L0 prediction block supplied from the L0 prediction block generation unit 202 and the L1 prediction block supplied from the L1 prediction block generation unit 203.

In Step S413, 9 types of intermediate parameters are calculated from the L0 prediction block and the L1 prediction block. The amount of change between the L0 prediction block and the L1 prediction block, and the amount of horizontal or vertical change in pixel value in each prediction block are calculated. These are collectively referred to as "gradient." The gradients are required to be calculated by as many pixels as prediction blocks, and hence it is enough that the buffer required here has the total size of nine VPDU's at most.

In Step S414 of FIG. 18, the BIO processing-included Bi prediction block generation unit 207 acquires the number of 4×4 blocks included in the vPU. For example, in the case of a vPU of 64×64, the number of 4×4 blocks is 256. In the optical flow, the highest prediction accuracy is achieved when velocities are obtained in units of pixels to calculate prediction values. This, however, requires large-scale calculation. In BIO, velocities are calculated in units of 4×4 blocks in view of the balanced trade-off of performance and cost.

In Step S415, the BIO processing-included Bi prediction block generation unit 207 sets 0 as a 4×4 block number that is processed first.

In Step S416, the BIO processing-included Bi prediction block generation unit 207 determines whether or not the 4×4 block number is smaller than the number of 4×4 blocks.

In a case where it is determined in Step S416 that the 4×4 block number is smaller than the number of 4×4 blocks, the processing proceeds to Step S417.

In Step S417, the BIO processing-included Bi prediction block generation unit 207 acquires the position in the vPU and SAD_4×4 from the 4×4 block number. The 4×4 blocks are processed in the raster scan order.

In Step S418, the BIO processing-included Bi prediction block generation unit 207 determines BIO_4×4_ON on the basis of SAD_4×4>=BIO threshold_4×4.

In Step S419, the BIO processing-included Bi prediction block generation unit 207 determines whether or not the BIO_4×4_ON flag is 1.

In a case where it is determined in Step S419 that the BIO_4×4_ON flag is not 1, the processing proceeds to Step S420 since BIO is not expected to be effective to the 4×4 block.

In Step S420, the BIO processing-included Bi prediction block generation unit 207 calculates the average of the L0 prediction image and the L1 prediction image in the region of the 4×4 block number, to thereby generate a Bi prediction value.

In a case where it is determined in Step S419 that the BIO_4×4_ON flag is 1, the processing proceeds to Step S421.

In Step S421, the BIO processing-included Bi prediction block generation unit 207 calculates a velocity from the plurality of gradients in the region of the 4×4 block number.

In Step S422, the BIO processing-included Bi prediction block generation unit 207 generates a BIO prediction value from the L0 prediction image, the L1 prediction image, the gradients, and the velocity in the region of the 4×4 block number.

After Steps S420 and S422, the processing proceeds to Step S423.

In Step S423, the BIO processing-included Bi prediction block generation unit 207 stores the prediction value generated in Step S420 or Step S422 at the position of the 4×4 block number in the buffer. The maximum buffer size in the processing in Step 423 is the VPDU size. The buffer may be the buffer that is used in the processing in S412.

In Step S424, the BIO processing-included Bi prediction block generation unit 207 increments the 4×4 block number. After that, the processing returns to Step S416, and the later processing is repeated.

After Step S412 or in a case where it is determined in Step S416 that the 4×4 block number is equal to or larger than the number of 4×4 blocks, the processing proceeds to Step S425.

In Step S425, the inter prediction control unit 201 increments the vPU number. The processing returns to Step S404, and the later processing is repeated.

In a case where it is determined in Step S404 that the vPU number is equal to or larger than the number of vPUs, the BIO processing-included Bi prediction ends.

Figure 20:
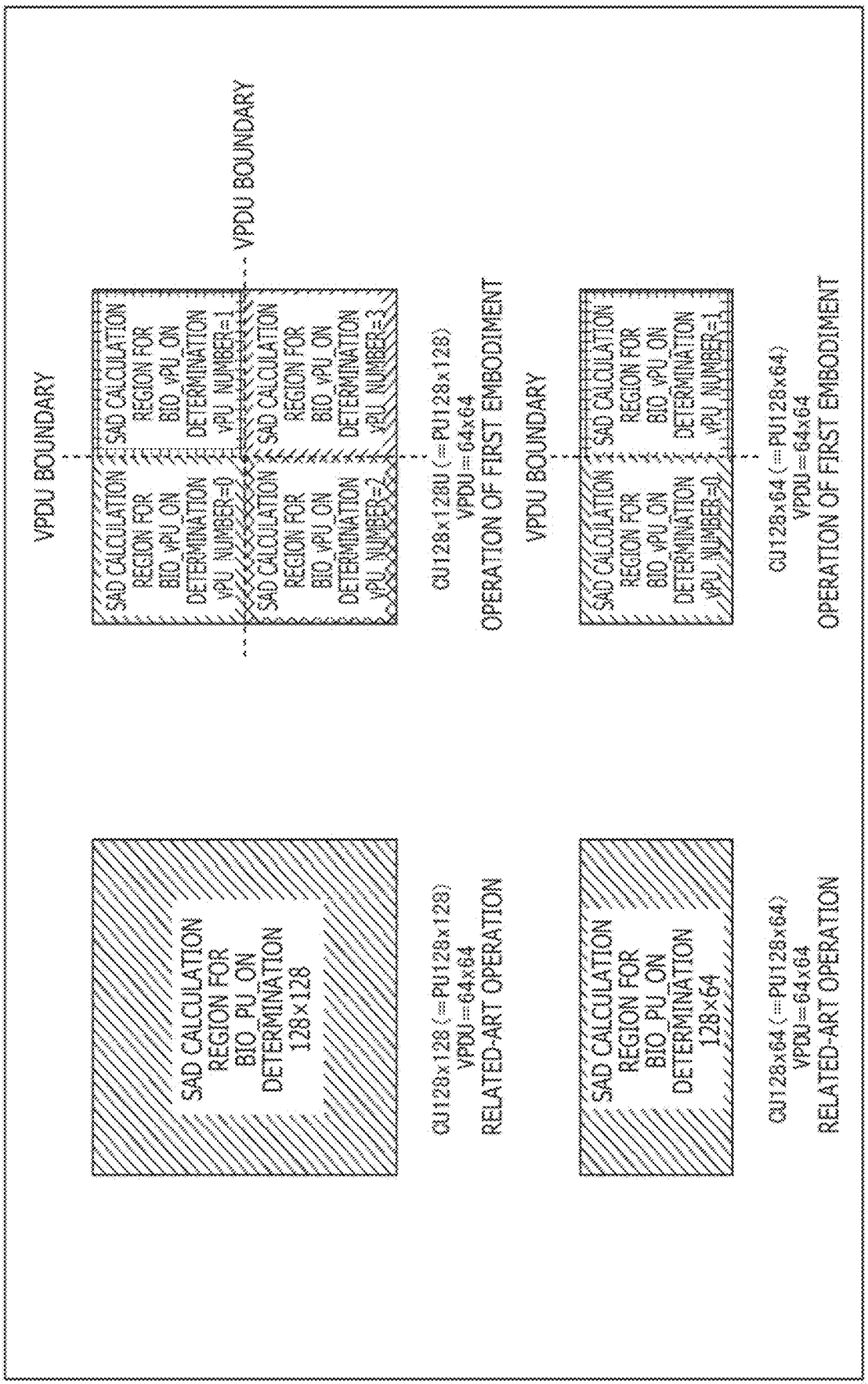
FIG. 20 is a diagram illustrating comparisons between related-art operation and operation according to the first embodiment of the present technology.
Figure 21:
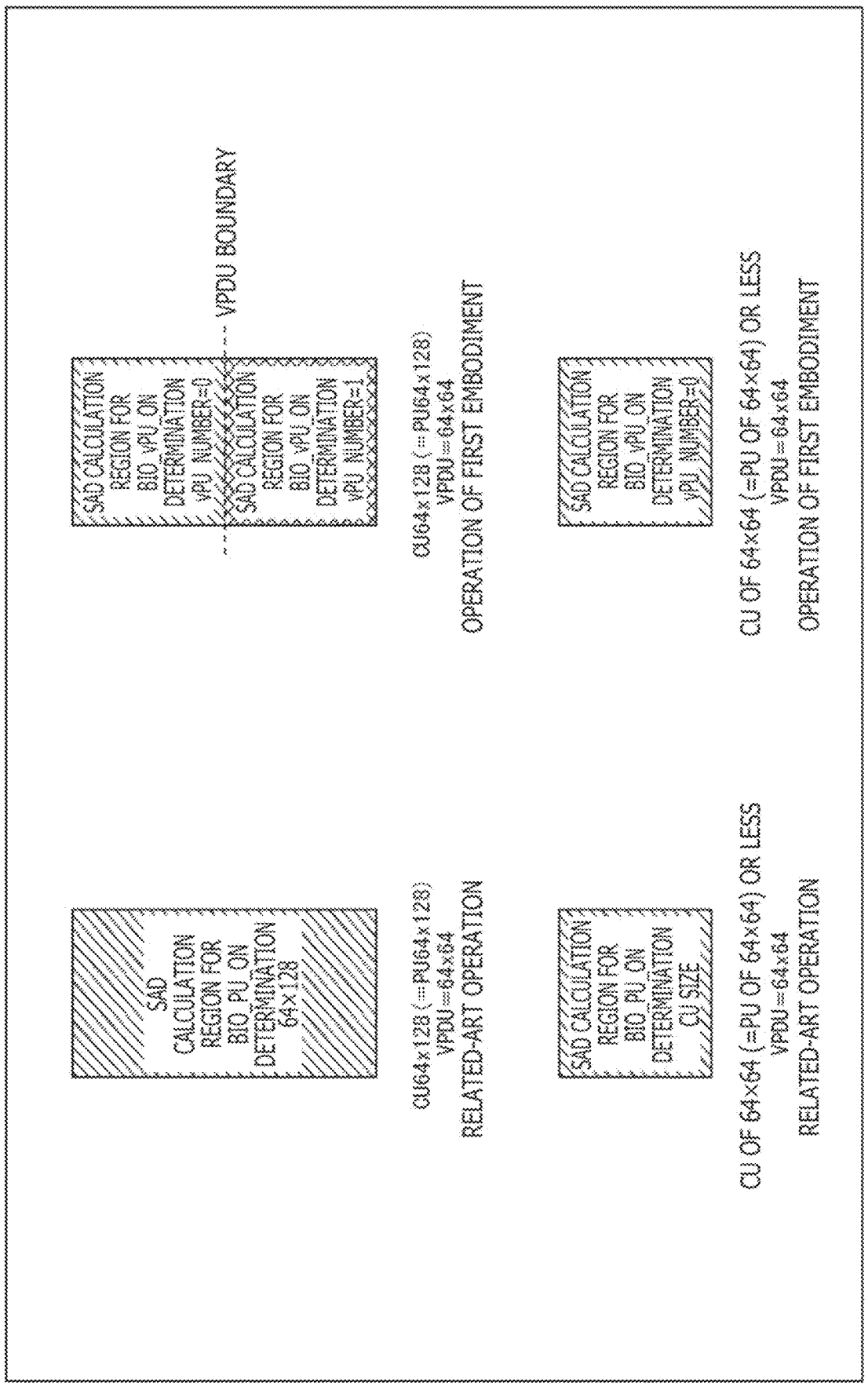
FIG. 21 is a diagram illustrating comparisons between the related-art operation and the operation according to the first embodiment of the present technology.

FIG. 20 and FIG. 21 are diagrams illustrating comparisons between related-art operation and operation according to the first embodiment of the present technology.

In the upper part of FIG. 20, the related-art operation and the operation according to the first embodiment of the present technology are illustrated in terms of ranges in which SADs have been calculated first for BIO application determination in a case where the CU (PU) is 128×128 and VPDU=64×64 holds. In the case of the CU (PU) of 128×128, the CU (PU) is partitioned into four vPUs that are SAD calculation regions for BIO_vPU_ON determination.

In the lower part of FIG. 20, the related-art operation and the operation according to the first embodiment of the present technology are illustrated in terms of ranges in which SADs have been calculated first for BIO application determination in a case where the CU (PU) is 128×64 and VPDU=64×64 holds. In the case of the CU (PU) of 128×64, the CU (PU) is partitioned into two left and right vPUs that are SAD calculation regions for BIO_vPU_ON determination.

In the upper part of FIG. 21, the related-art operation and the operation according to the first embodiment of the present technology are illustrated in terms of ranges in which SADs have been calculated first for BIO application determination in a case where the CU (PU) is 64×128 and VPDU=64×64 holds. In the case of the CU (PU) of 64×128, the CU (PU) is partitioned into two top and bottom vPUs that are SAD calculation regions for BIO_vPU_ON determination.

In the lower part of FIG. 21, the related-art operation and the operation according to the first embodiment of the present technology are illustrated in terms of ranges in which SADs have been calculated first for BIO application determination in a case where the CU (PU) is 64×64 or less and VPDU=64×64 holds. In the case of the CU (PU) of 64×64 or less, the CU (PU) is not partitioned and includes a single vPU that is a SAD calculation region for BIO_vPU_ON determination.

In the related-art operation, the SAD for the entire PU is required, and hence the large L0 prediction block and the large L1 prediction block are required to be prepared and stored in advance. In the present technology, on the other hand, in the PU larger than the VPDU, whether to apply BIO is determined for each vPU obtained by virtually partitioning the PU, and the buffer for the L0 prediction block and the L1 prediction block prepared and stored in advance can therefore be reduced in size.

Further, the buffers that are used in Steps S412, S413, and S423 of FIG. 17 and FIG. 18 can be reduced to ¼ of the buffers that are used in Steps S308, S309, and S319 of FIG. 15 and FIG. 16.

As tools for generating two prediction blocks on the decoding side and making determination through cost calculation, to thereby enhance the encoding efficiency of inter prediction, such as BIO, there are FRUC (Frame Rate Up-Conversion) and DMVR (Decoder-side motion vector refinement). In FRUC and DMVR, L0 prediction blocks and L1 prediction blocks that are larger than a PU size are generated and SADs or similar costs are calculated for the purpose of MV correction instead of early termination in BIO.

In a case where PUs are larger than VPDUs, processing similar to that in the present technology is required. Also in FRUC and DMVR, as in the present technology, a case where PUs are larger than VPDUs can be handled as follows: the PU is virtually partitioned into a plurality of vPUs, and MV correction is performed for each vPU.

The SAD calculation and BIO application determination for an entire PU in the related-art operation and the SAD calculation and BIO application determination for each vPU in the present technology, which are descried above, are generally mainly intended to achieve early termination, and hence a further reduction can be achieved.

First Modified Example

In the first embodiment described above, the example in which in a case where PUs are larger than VPDUs, the PU is virtually partitioned into a plurality of vPUs, and a SAD is calculated to determine whether to apply BIO for each vPU is described. The vPUs of the PU are originally included in the same PU, and hence it is conceivable that a certain partial tendency is similar to the tendencies of the different portions.

FIG. 22 and FIG. 23 are diagrams illustrating, as a first modified example, an example in which in a case where PUs are larger than VPDUs, a BIO determination result for a vPU number of 0 is also used for other vPUs on the premise of the tendency described above.

In the upper part of FIG. 22, there are illustrated ranges in which SADs have been calculated first for BIO application determination in a case where the CU (PU) is 128×128 and VPDU=64×64 holds. In the case of the CU (PU) of 128×128, of vPUs obtained by partitioning the CU (PU) into four as SAD calculation regions for BIO_vPU_ON determination, a SAD for the vPU at the upper left (vPU number=0) is calculated, and the result for the vPU having the vPU number of 0 is copied and used for the remaining vPUs (upper right, lower left, and upper right).

In the lower part of FIG. 22, there are illustrated ranges in which SADs have been calculated first for BIO application determination in a case where the CU (PU) is 128×64 and VPDU=64×64 holds. In the case of the CU (PU) of 128×64, of vPUs obtained by partitioning the CU (PU) into two as SAD calculation regions for BIO_vPU_ON determination, a SAD for the vPU on the left (vPU number=0) is calculated, and the result for the vPU having the vPU number of 0 is copied and used for the other vPU (right).

In the upper part of FIG. 23, there are illustrated ranges in which SADs have been calculated first for BIO application determination in a case where the CU (PU) is 64×128 and VPDU=64×64 holds. In the case of the CU (PU) of 128×64, of vPUs obtained by partitioning the CU (PU) into two as SAD calculation regions for BIO_vPU_ON determination, a SAD for the vPU at the top (vPU number=0) is calculated, and the result for the vPU having the vPU number of 0 is copied and used for the other vPU (bottom).

In the lower part of FIG. 23, there is illustrated a range in which a SAD has been calculated first for BIO application determination in a case where the CU (PU) is 64×64 or less and VPDU=64×64 holds. In the case of the CU (PU) of 64×64 or less, the CU (PU) is not partitioned and includes a single vPU as a SAD calculation region for BIO_vPU_ON determination.

<Operation Example of Inter Prediction Unit>

Figure 24:
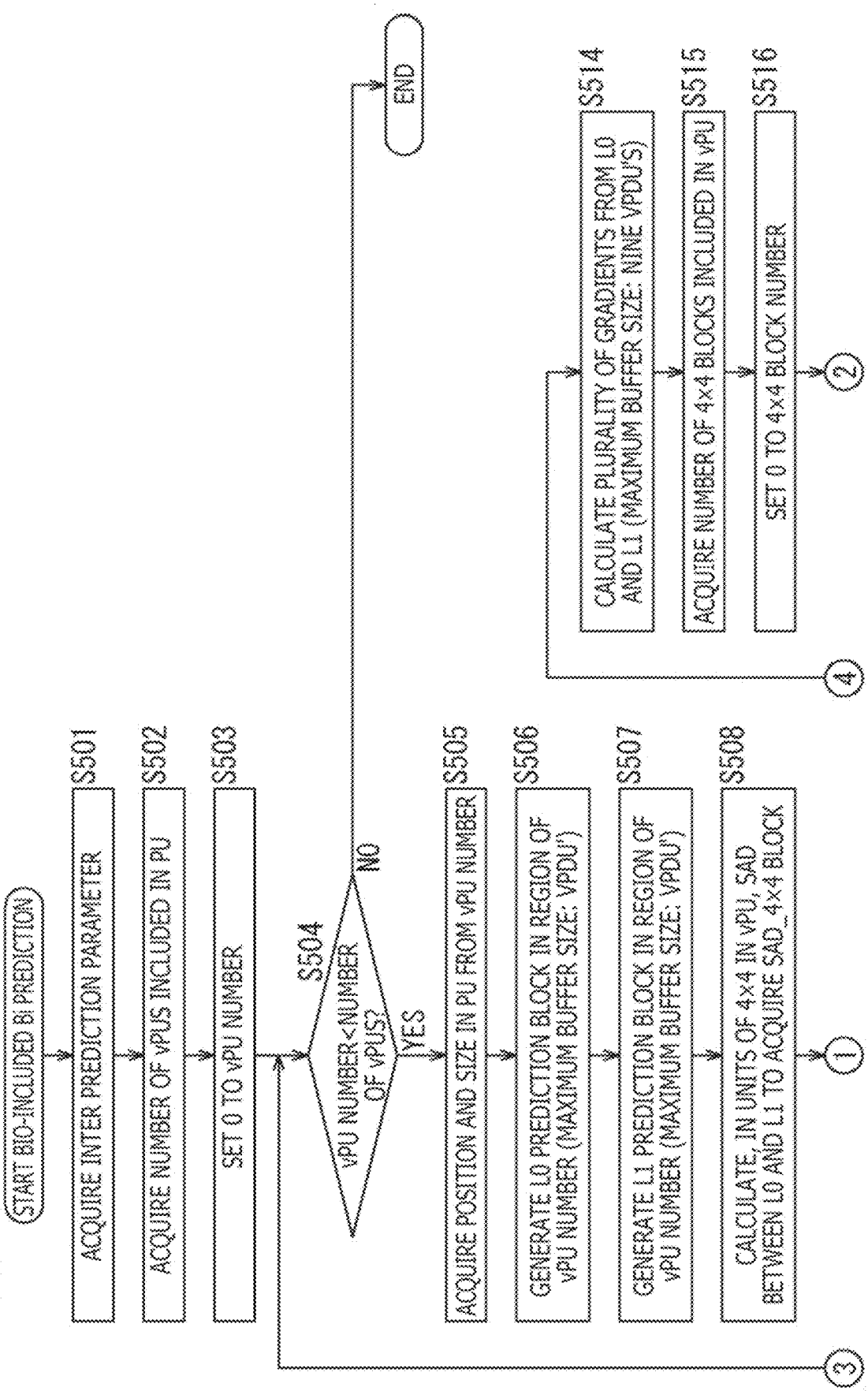
FIG. 24 is a flowchart illustrating BIO-included Bi prediction in the cases of FIG. 22 and FIG. 23.
Figure 25:
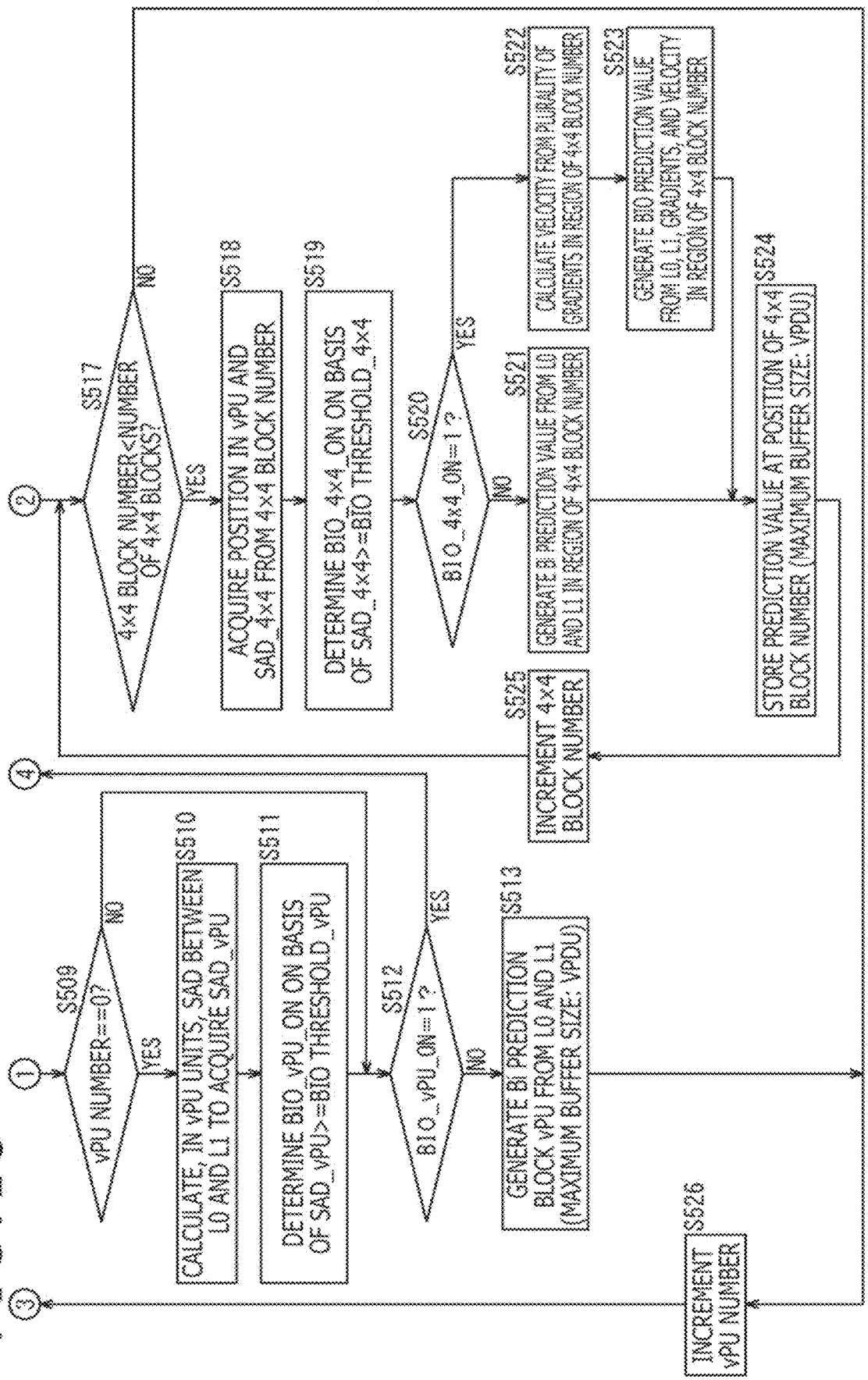
FIG. 25 is a flowchart illustrating the BIO-included Bi prediction in the cases of FIG. 22 and FIG. 23, which is a continuation of FIG. 24.

FIG. 24 and FIG. 25 are flowcharts illustrating BIO-included Bi prediction in the case of FIG. 23.

In Steps S501 to S508 and Steps S510 to S526 of FIG. 24 and FIG. 25, processing basically similar to that in Steps S401 to S425 of FIG. 17 and FIG. 18 is performed, and hence the description thereof, which is redundant, is appropriately omitted.

In Step S508 of FIG. 25, the BIO cost calculation unit 204 calculates, in units of 4×4 in the vPU, the SAD of the L0 prediction image supplied from the L0 prediction block generation unit 202 and the L1 prediction image supplied from the L1 prediction block generation unit 203. The SADs calculated in units of 4×4 are accumulated so that SAD_4×4 block that is the sum of the SADs is acquired.

In Step S509, the BIO cost calculation unit 204 determines whether or not the vPU number is 0.

In a case where it is determined in Step S509 that the vPU number is 0, the processing proceeds to Step S510.

In Step S510, the BIO cost calculation unit 204 calculates, in units of vPUs, the SAD of the L0 prediction image supplied from the L0 prediction block generation unit 202 and the L1 prediction image supplied from the L1 prediction block generation unit 203. The SADs calculated in units of vPUs are accumulated so that SAD_vPU that is the sum of the SADs is acquired. The acquired SAD_vPU is supplied from the BIO cost calculation unit 204 to the BIO application determination unit 205.

In Step S511, the BIO application determination unit 205 determines the BIO_vPU_ON flag on the basis of SAD_vPU>=BIO threshold_vPU. SAD_vPU is supplied from the BIO cost calculation unit 204 and BIO threshold_vPU is supplied from the inter prediction control unit 201. After that, the processing proceeds to Step S512.

Meanwhile, in a case where it is determined that the vPU number is not 0, the processing skips Steps S510 and S511 and proceeds to Step S512.

As described above, in the PU, only for the vPUs that are positioned first in the raster scan order, the SAD accumulation and BIO determination for the vPUs are performed, with the result that the processing related to early termination and time taken for the processing can be reduced.

Second Modified Example

FIG. 26 and FIG. 27 are diagrams illustrating, as a second modified example, an example in which whether to apply BIO is determined with a partial SAD value in each vPU.

In the upper part of FIG. 26, there are illustrated ranges in which SADs have been calculated first for BIO application determination in a case where the CU (PU) is 128×128 and VPDU=64×64 holds. In the case of the CU (PU) of 128×128, a SAD is calculated for an upper left partial region (32×32) of each vPU obtained by partitioning the CU (PU) into two as SAD calculation regions for BIO_vPU_ON determination.

In the lower part of FIG. 26, there are illustrated ranges in which SADs have been calculated first for BIO application determination in a case where the CU (PU) is 128×64 and VPDU=64×64 holds. In the case of the CU (PU) of 128×64, a SAD is calculated for an upper left partial region (32×32) of each vPU obtained by partitioning the CU (PU) into two as SAD calculation regions for BIO_vPU_ON determination.

In the upper part of FIG. 27, there are illustrated ranges in which SADs have been calculated first for BIO application determination in a case where the CU (PU) is 64×128 and VPDU=64×64 holds. In the case of the CU (PU) of 64×128, a SAD is calculated for an upper left partial region (32×32) of each vPU obtained by partitioning the CU (PU) into two as SAD calculation regions for BIO_vPU_ON determination.

In the lower part of FIG. 27, there is illustrated a range in which a SAD has been calculated first for BIO application determination in a case where the CU (PU) is 64×64 or less and VPDU=64×64 holds. In the case of the CU (PU) of 64×64 or less, a SAD is calculated for an upper left partial region (32×32) of the CU (PU) not partitioned and including a vPU as a SAD calculation region for BIO_vPU_ON determination.

As described above, FIG. 26 and FIG. 27 illustrate the examples in which whether to apply BIO is determined in the upper-left ¼ region of each vPU. The upper-left ¼ regions are used in consideration of compatibility with a case where the pipeline is structured with HW. This is because BIO application determination becomes possible when the L0 prediction blocks and the L1 prediction blocks in the upper-left ¼ regions are prepared.

Whether to apply BIO is determined only for the partial region of each vPU so that the buffers that are prepared on the pipeline stages can be reduced to be smaller than the VPDU size.

Note that, the partial region has any size, and the cost (SAD) calculation can be performed for a partial region having a size of 0×0, for example. That is, 0 means that the cost is not calculated and early termination is skipped.

Further, the region for calculating a SAD necessary for determining BIO_vPU_ON in each vPU can be dynamically changed.

<Operation Example of Inter Prediction Unit>

Figure 28:
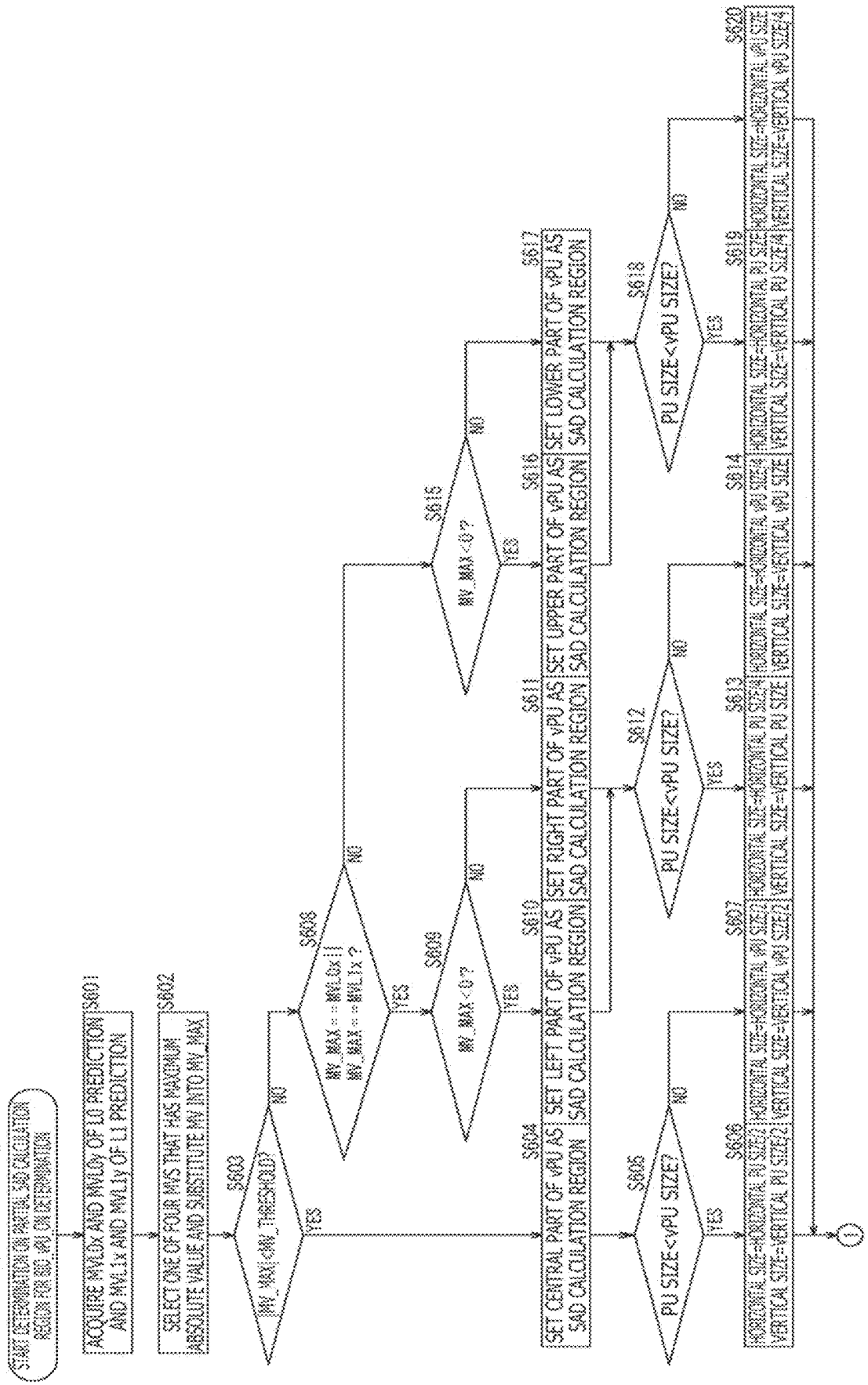
FIG. 28 is a flowchart illustrating the processing of determining a partial SAD calculation region for determining BIO_vPU_ON in each vPU.
Figure 29:
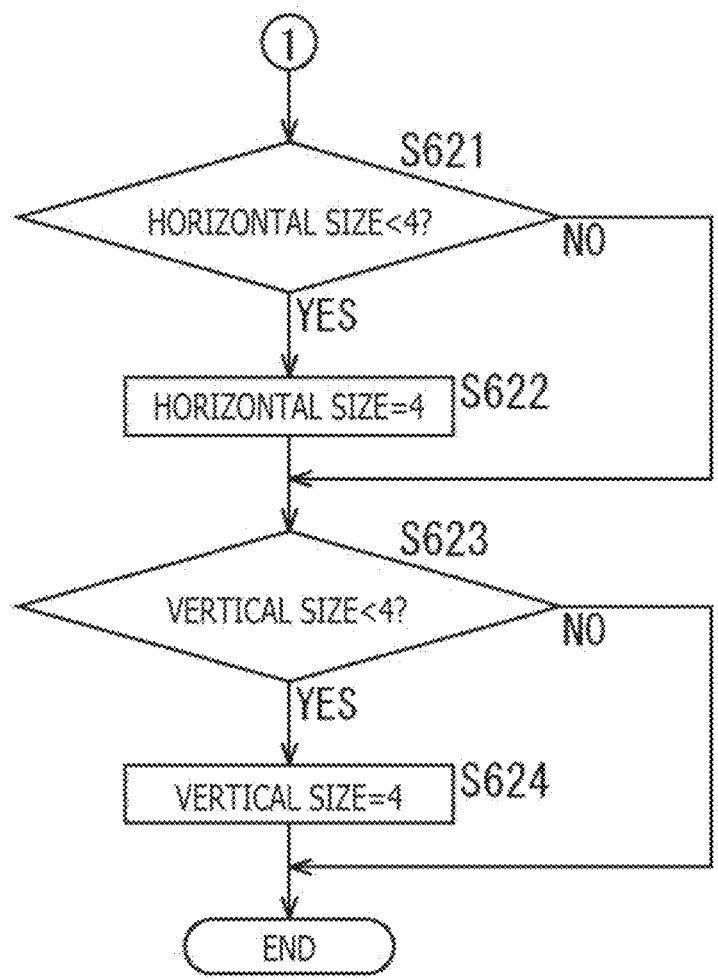
FIG. 29 is a flowchart illustrating the processing of determining a partial SAD calculation region for determining BIO_vPU_ON in each vPU, which is a continuation of FIG. 28.

FIG. 28 and FIG. 29 are flowcharts illustrating the processing of determining a partial SAD calculation region for BIO_vPU_ON determination in each vPU.

In FIG. 28 and FIG. 29, two MVs for generating an L0 prediction block and an L1 prediction block are divided into four, namely, horizontal components and vertical components, and whether the correction of BIO is effective to a region farthest from a reference position is determined on the assumption that such a region has inaccurate motion information. This processing is performed before Step S509 of FIG. 25, for example. In this case, the following flow is conceivable: in Step S509, it is determined whether or not the vPU number corresponds to an installed region, and the processing in Steps S510 and S511 is performed only on the set region.

In Step S601, the inter prediction control unit 201 acquires MVL0x and MVL0y of L0 prediction and MVL1 and MVL1y of L1 prediction.

In Step S602, the inter prediction control unit 201 selects one of the four MVs that has the maximum absolute value and substitutes the MV into MV_MAX.

In Step S603, the inter prediction control unit 201 determines whether or not |MV_MAX|<MV_threshold holds.

In a case where it is determined in Step S603 that |MV_MAX|<MV_threshold holds, the processing proceeds to Step S604.

In Step S604, the inter prediction control unit 201 sets the central part of the vPU as a SAD calculation region.

In Step S605, the inter prediction control unit 201 determines whether or not PU size<vPU size holds.

In a case where it is determined in Step S605 that PU size<vPU size holds, the processing proceeds to Step S606.

In Step S606, the inter prediction control unit 201 determines that horizontal size=horizontal PU size/2 and vertical size=vertical PU size/2 hold.

In a case where it is determined in Step S605 that PU size<vPU size does not hold, the processing proceeds to Step S607.

In Step S607, the inter prediction control unit 201 determines that horizontal size=horizontal vPU size/2 and vertical size=vertical vPU size/2 hold.

Meanwhile, in a case where it is determined in Step S603 that |MV_MAX|<MV_threshold does not hold, the processing proceeds to Step S608.

In Step S608, the inter prediction control unit 201 determines whether or not MV_MAX==MVL0x||MV_MAX==MVL1x holds.

In a case where it is determined in Step S608 that MV_MAX==MVL0x||MV_MAX==MVL1x holds, the processing proceeds to Step S609.

In Step S609, the inter prediction control unit 201 determines whether or not MV_MAX is smaller than 0.

In a case where it is determined in Step S609 that MV_MAX is smaller than 0, the processing proceeds to Step S610.

In Step S610, the inter prediction control unit 201 sets the left part of the vPU as the SAD calculation region.

In a case where it is determined in Step S609 that MV_MAX is equal to or larger than 0, the processing proceeds to Step S611.

In Step S611, the inter prediction control unit 201 sets the right part of the vPU as the SAD calculation region.

After Step S610 or S611, the processing proceeds to Step S612.

In Step S612, the inter prediction control unit 201 determines whether or not PU size<vPU size holds.

In a case where it is determined in Step S612 that PU size<vPU size holds, the processing proceeds to Step S613.

In Step S613, the inter prediction control unit 201 determines that horizontal size=horizontal PU size/4 and vertical size=vertical PU size hold.

In a case where it is determined in Step S612 that PU size<vPU size does not hold, the processing proceeds to Step S614.

In Step S614, the inter prediction control unit 201 determines that horizontal size=horizontal vPU size/4 and vertical size=vertical vPU size hold.

Further, in a case where it is determined in Step S608 that MV_MAX==MVL0x||MV_MAX==MVL1x does not hold, the processing proceeds to Step S615.

In Step S615, the inter prediction control unit 201 determines whether or not MV_MAX<0 holds.

In a case where it is determined in Step S615 that MV_MAX<0 holds, the processing proceeds to Step S616.

In Step S616, the inter prediction control unit 201 sets the upper part of the vPU as the SAD calculation region.

In a case where it is determined in Step S615 that MV_MAX<0 does not hold, the processing proceeds to Step S617.

In Step S617, the inter prediction control unit 201 sets the lower part of the vPU as the SAD calculation region.

After Step S616 or S617, the processing proceeds to Step S618.

In Step S618, the inter prediction control unit 201 determines whether or not PU size<vPU size holds.

In a case where it is determined in Step S618 that PU size<vPU size holds, the processing proceeds to Step S619.

In Step S619, the inter prediction control unit 201 determines that horizontal size=horizontal PU size and vertical size=vertical PU size/4 hold.

In a case where it is determined in Step S618 that PU size<vPU size does not hold, the processing proceeds to Step S620.

In Step S620, the inter prediction control unit 201 determines that horizontal size=horizontal vPU size and vertical size=vertical vPU size/4 hold.

After Step S606, Step S607, Step S613, Step S614, Step S619, and Step S620, the processing proceeds to Step S621 of FIG. 29.

In Step S621, the inter prediction control unit 201 determines whether or not horizontal size<4 holds.

In a case where it is determined in Step S621 that horizontal size<4 holds, the processing proceeds to Step S622.

In Step S622, the inter prediction control unit 201 determines that horizontal size=4 holds, and the processing proceeds to Step S623.

In a case where it is determined in Step S621 that horizontal size<4 does not hold, the processing skips Step S622 and proceeds to Step S623.

In Step S623, the inter prediction control unit 201 determines whether or not vertical size<4 holds.

In a case where it is determined in Step S623 that vertical size<4 holds, the processing proceeds to Step S624.

In Step S624, the inter prediction control unit 201 determines that vertical size=4 holds, and the processing of determining a partial SAD calculation region for BIO_vPU_ON determination ends.

In a case where it is determined in Step S623 that vertical size<4 does not hold, the processing skips Step S624, and the processing of determining a partial SAD calculation region for BIO_vPU_ON determination ends.

The processing of calculating SADs for partial regions to determine whether to apply BIO as described can also be applied to FRUC and DMVR. However, in FRUC and DMVR, the calculation of SADs or similar costs and the determination thereafter, which are used for early termination in BIO, are directly reflected in the inter prediction accuracy. Thus, there is a possibility that the price paid for the omission of cost calculation is high, and it can therefore be said that the processing of calculating SADs for partial regions to determine whether to apply BIO is processing unique to BIO.

2. Second Embodiment (Exemplary Operation Sharing with Flags)

In a second embodiment, as in the first embodiment, in a case where PUs are larger than VPDUs, the PU is virtually partitioned into vPUs, and the processing is performed in units of vPUs.

In the second embodiment, unlike the first embodiment, 1 bit of the BIO_PU_ON flag is included in bitstreams that are transmitted/received between the encoding device 1 and the decoding device 101 so that the operation of the encoding device 1 and the operation of the decoding device 101 can be shared.

<Operation Example of Inter Prediction Unit>

Figure 30:
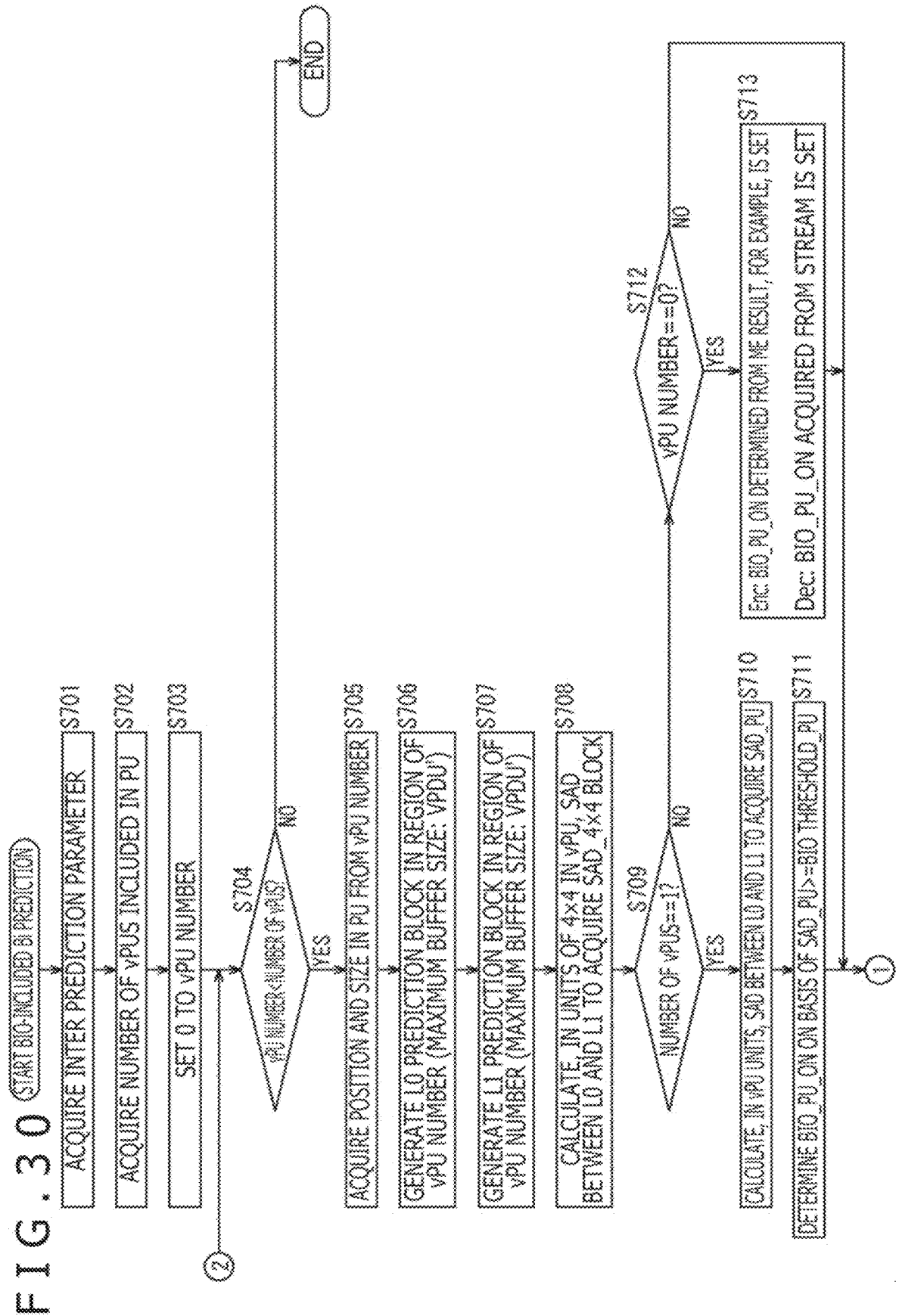
FIG. 30 is a flowchart illustrating, as an operation example according to a second embodiment of the present technology, BIO-included Bi prediction that is performed by an inter prediction unit 51.
Figure 31:
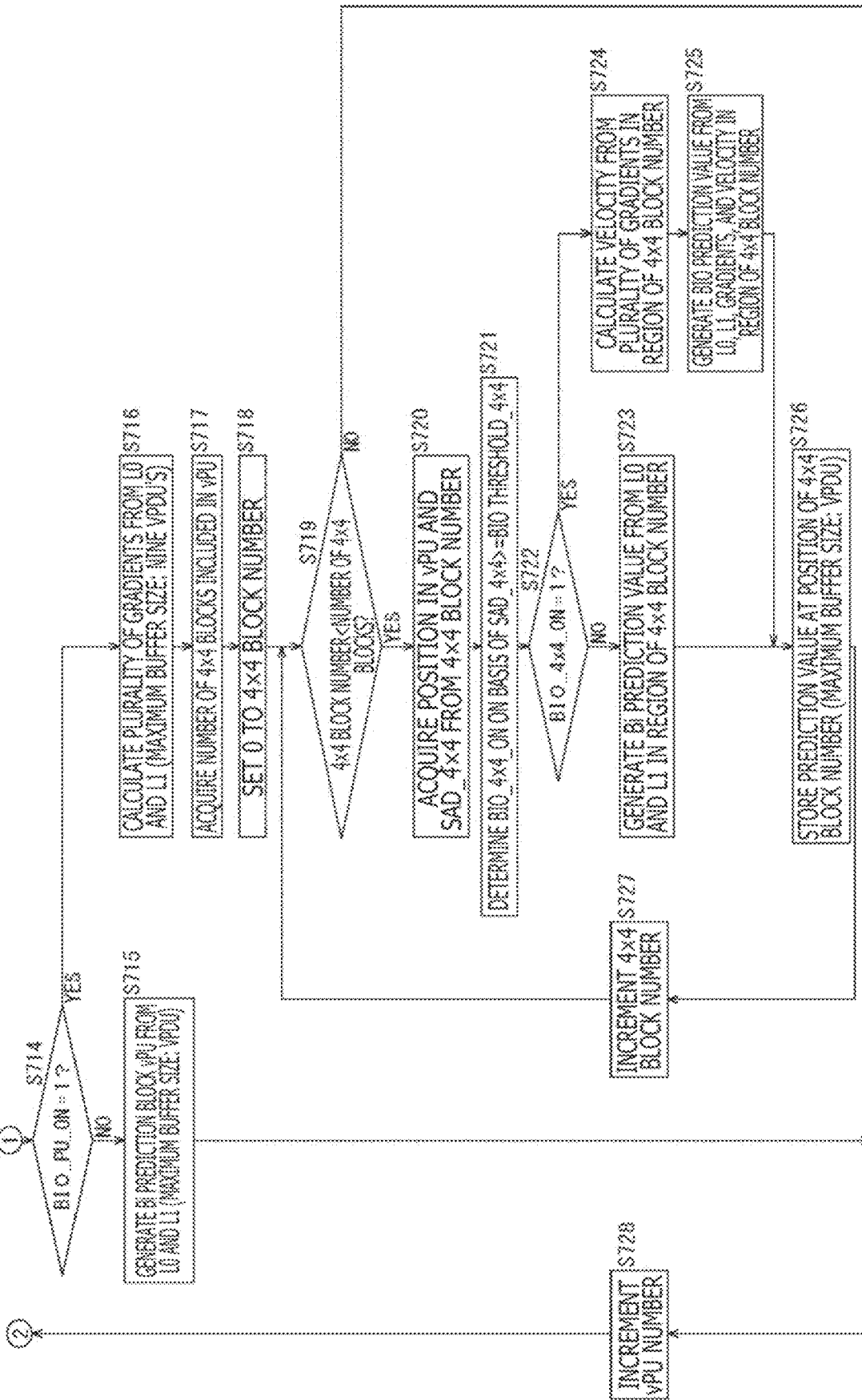
FIG. 31 is a flowchart illustrating, as the operation example according to the second embodiment of the present technology, the BIO-included Bi prediction that is performed by the inter prediction unit 51, which is a continuation of FIG. 30.

FIG. 30 and FIG. 31 are flowcharts illustrating, as an operation example according to the second embodiment of the present technology, BIO-included Bi prediction that is performed by the inter prediction unit 51.

In Steps S701 to S708 and Steps S715 to S728 of FIG. 30 and FIG. 31, processing basically similar to that in Steps S401 to S408 and Steps S412 to S425 of FIG. 17 and FIG. 18 is performed, and hence the description thereof, which is redundant, is appropriately omitted.

In Step S708 of FIG. 30, the BIO cost calculation unit 204 calculates, in units of 4×4 in the vPU, the SAD of the L0 prediction image supplied from the L0 prediction block generation unit 202 and the L1 prediction image supplied from the L1 prediction block generation unit 203. The SADs calculated in units of 4×4 are accumulated so that SAD_4×4 block that is the sum of the SADs is acquired.

In Step S709, the inter prediction control unit 201 determines whether or not the number of vPUs is 1.

In a case where it is determined in Step S709 that the number of vPUs is 1, the processing proceeds to Step S710. In Steps S710 and S711, processing similar to the processing that is performed in units of PUs is performed.

In Step S710, the BIO cost calculation unit 204 calculates, in units of vPUs, the SAD of the L0 prediction image supplied from the L0 prediction block generation unit 202 and the L1 prediction image supplied from the L1 prediction block generation unit 203. The SADs calculated in units of vPUs are accumulated so that SAD_PU that is the sum of the SADs is acquired. The acquired SAD_PU is supplied from the BIO cost calculation unit 204 to the BIO application determination unit 205.

In Step S711, the BIO application determination unit 205 determines the BIO_PU_ON flag on the basis of SAD_PU>=BIO threshold_PU. SAD_PU is supplied from the BIO cost calculation unit 204 and BIO threshold_PU is supplied from the inter prediction control unit 201. After that, the processing proceeds to Step S714.

In a case where it is determined in Step S709 that the vPU number is not 1, the processing proceeds to Step S712.

In Step S712, the inter prediction control unit 201 determines whether or not the vPU number is 0.

In a case where it is determined in Step S709 that the vPU number is 0, the processing proceeds to Step S713.

In Step S713, the inter prediction control unit 201 sets BIO_PU_ON. In the case of the encoding device 1, BIO_PU_ON determined from a motion estimation (ME) result, for example, is set. In the case of the decoding device 101, BIO_PU_ON acquired from the stream is set.

In a case where it is determined in Step S712 that the vPU number is not 0, the processing skips Step S713 and proceeds to Step S714 of FIG. 31.

In Step S714, it is determined whether or not the BIO_PU_ON flag is 1.

In a case where it is determined in Step S714 that the BIO_PU_ON flag is not 1, the processing proceeds to Step S715 since BIO is not effective to the entire PU.

In Step S715, the Bi prediction block generation unit 206 generates a Bi prediction block vPU from the L0 prediction image supplied from the L0 prediction block generation unit 202 and the L1 prediction image supplied from the L1 prediction block generation unit 203. The generated Bi prediction block vPU is stored in the buffer and supplied from the Bi prediction block generation unit 206 to the Bi prediction block selection unit 208.

Meanwhile, in a case where it is determined in Step S714 that the BIO_PU_ON flag is 1, the processing proceeds to Step S716.

In Step S716, the BIO processing-included Bi prediction block generation unit 207 calculates a plurality of gradients from the L0 prediction block supplied from the L0 prediction block generation unit 202 and the L1 prediction block supplied from the L1 prediction block generation unit 203.

As described above, when the BIO_PU_ON flag is included in bitstreams, the operation of the encoding device 1 and the operation of the decoding device 101 can be shared.

Note that, a deterioration in encoding efficiency due to the inclusion of the flag in bitstreams is concerned, and hence the BIO_PU_ON flag is not included in all the layers, but is included only in a case where PUs are larger than VPDUs so that the value of 1 bit is relatively small. In a case where PUs are not larger than VPDUs, as illustrated in Steps S709 to S713 of FIG. 30, SAD values are calculated in units of PUs and whether to apply BIO is determined as in the first embodiment.

In a case where the BIO_PU_ON flag is included in bitstreams, the encoding device 1 may freely set 0 or 1 to the BIO_PU_ON flag. When the encoding device 1 is a sufficiently high-performance device, a determination method in which motion compensation is performed with BIO_PU_ON flags of 0 and 1, and one of the BIO_PU_ON flags that provides a favorable result is determined may be employed. Further, a determination method in which the BIO_PU_ON flag is set to 0 when the PU size is 128×128, and is otherwise set to 1 may be employed.

Meanwhile, in the decoding device 101, the BIO_PU_ON flag is decoded on the PU layer of the CU in the Bi prediction mode in which the PUs are larger than the VPDUs so that, when the vPU number is 0, the BIO_PU_ON flag is acquired in Step S713, and the processing proceeds. In the vPUs having the vPU numbers of 1 or larger, in which the BIO_PU_ON flags have already been set, the processing skips Step S713 and proceeds from Step S712 to Step S714.

A method similar to the second embodiment described above is applicable to FRUC and DMVR, but the application of the second embodiment to FRUC or DMVR is mostly pointless. This is because data for MV correction is included in bitstreams substantially means that difference MVs (MVDs) are encoded.

3. Third Embodiment (Exemplary Partition with sPUs)

In a third embodiment, a virtual partition size is different from that of the first embodiment. In a case where PUs are larger than VPDUs, the PU is virtually partitioned into sPUs, and the processing is performed in units of sPUs.

That is, since a unit of the processing of calculating SADs to determine whether to apply BIO is any unit that does not cross over VPDU boundaries and is equal to or smaller than the VPDU size, in the third embodiment, a PU is virtually partitioned into plurality of sPUs with separately given information, and whether to apply BIO is determined for each sPU.

To give the information, a variable such as BIO_MAX_SAD_BLOCK_SIZE is added to and included in bitstreams to be shared by the encoding device 1 and the decoding device 101.

FIG. 32 is a diagram illustrating the correspondence between BIO_MAX_SAD_BLOCK_SIZE and sPU.

In a case where BIO_MAX_SAD_BLOCK_SIZE is 1, the sPU size is 8×8. In a case where BIO_MAX_SAD_BLOCK_SIZE is 2, the sPU size is 16×16. In a case where BIO_MAX_SAD_BLOCK_SIZE is 3, the sPU size is 32×32. In a case where BIO_MAX_SAD_BLOCK_SIZE is 4, the sPU size is 64×64.

The value of BIO_MAX_SAD_BLOCK_SIZE may be set to any value based on the performance of the encoding device 1, or may be determined in advance as a profile/level constraint serving as a standard. There is a level constraint that sets BIO_MAX_SAD_BLOCK_SIZE depending on picture sizes to be handled, that is, sets BIO_MAX_SAD_BLOCK_SIZE to 0 for SD or less, 1 for HD, 2 for 4K, and 3 for 8K, for example.

<Operation Example of Inter Prediction Unit>

FIG. 33 and FIG. 34 are flowcharts illustrating, as an operation example according to the third embodiment of the present technology, BIO-included Bi prediction that is performed by the inter prediction unit 51.

Note that, in Steps S801 to S825 of FIG. 33 and FIG. 34, processing basically similar to that in Steps S401 to S425 of FIG. 17 and FIG. 18 is performed although the vPU is replaced by the sPU different from the vPU in size, and hence the description thereof, which is redundant, is appropriately omitted.

Figure 35:
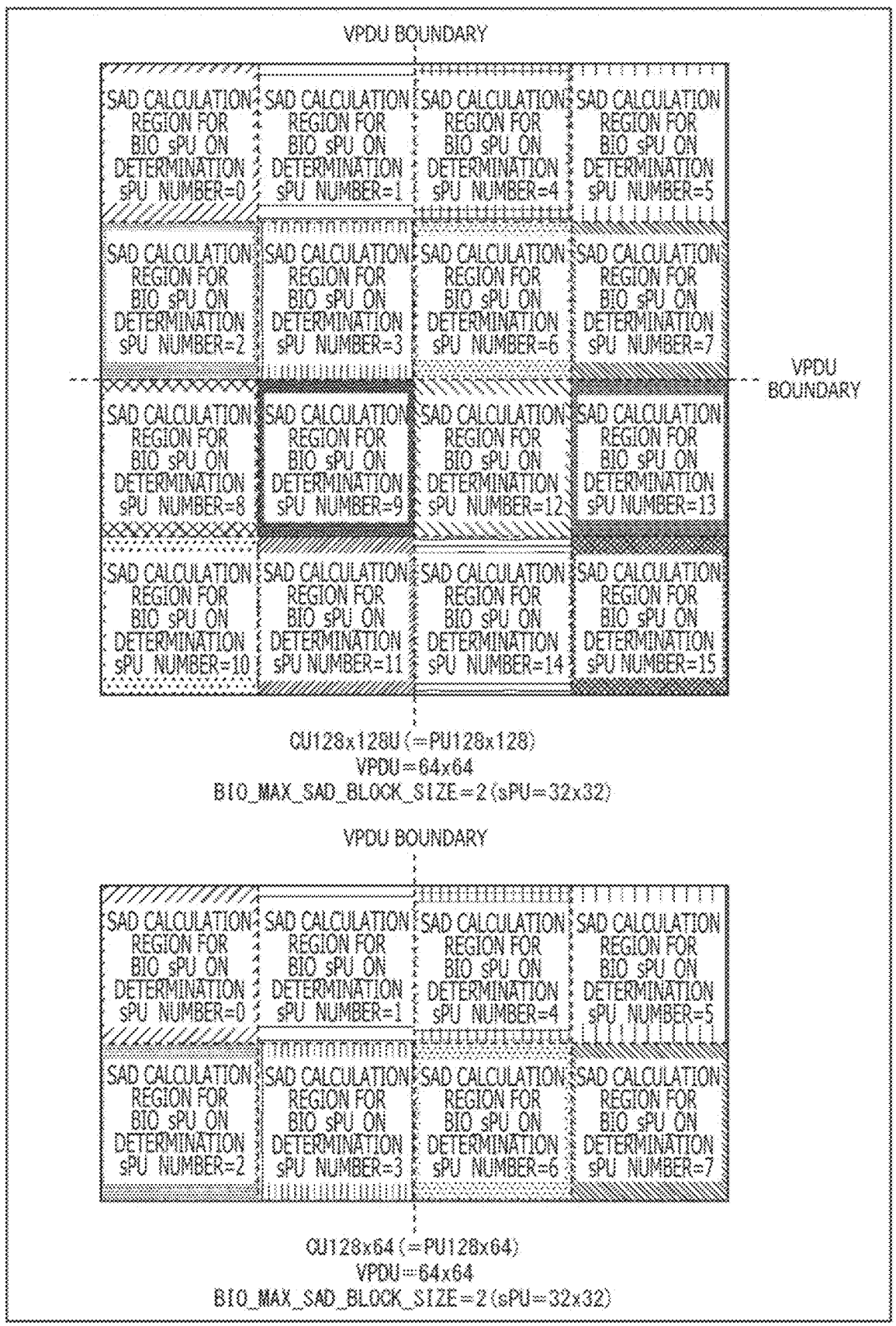
FIG. 35 is a diagram illustrating exemplary regions for calculating SADs in each PU in a case where BIO_MAX_SAD_BLOCK_SIZE is 2.
Figure 36:
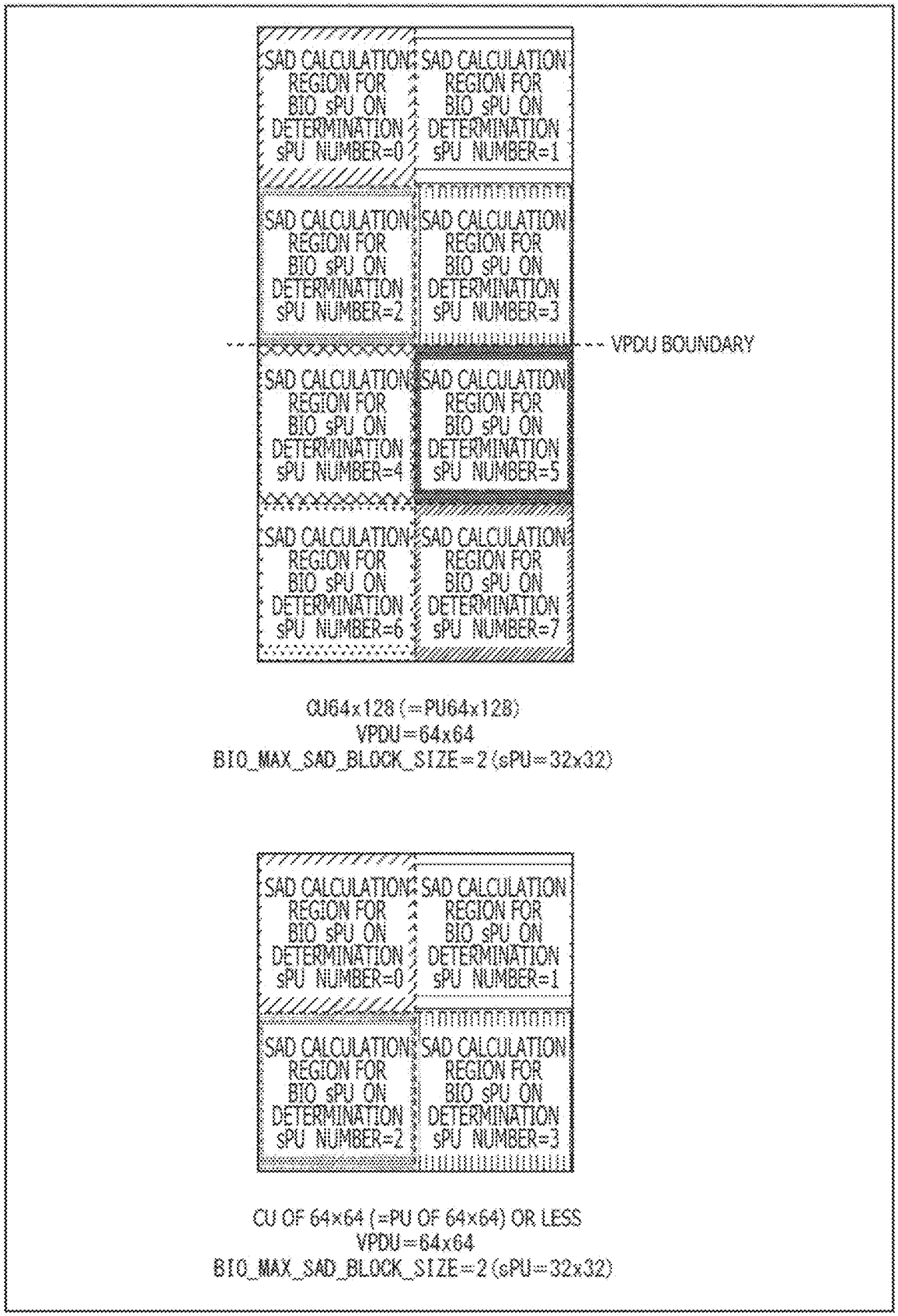
FIG. 36 is another diagram illustrating exemplary regions for calculating SADs in each PU in the case where BIO_MAX_SAD_BLOCK_SIZE is 2.

FIG. 35 and FIG. 36 are diagrams illustrating exemplary regions for calculating SADs in each PU in a case where BIO_MAX_SAD_BLOCK_SIZE is 2.

In the upper part of FIG. 35, there are illustrated regions for calculating SADs for sPUs in a case where the CU (PU) is 128×128, VPDU=64×64 holds, and BIO_MAX_SAD_BLOCK_SIZE is 2 (sPU=32×32). In the case of the upper part of FIG. 35, the PU is partitioned into 16 sPUs that do not cross over the VPDU boundaries.

In the lower part of FIG. 35, there are illustrated regions for calculating SADs for sPUs in a case where the CU (PU) is 128×64, VPDU=64×64 holds, and BIO_MAX_SAD_BLOCK_SIZE is 2 (sPU=32×32). In the case of the lower part of FIG. 35, the PU is partitioned into eight sPUs that do not cross over the VPDU boundaries.

In the upper part of FIG. 36, there are illustrated regions for calculating SADs for sPUs in a case where the CU (PU) is 64×128, VPDU=64×64 holds, and BIO_MAX_SAD_BLOCK_SIZE is 2 (sPU=32×32). In the case of the upper part of FIG. 36, the PU is partitioned into eight sPUs that do not cross over the VPDU boundaries.

In the lower part of FIG. 36, there are illustrated regions for calculating SADs for sPUs in a case where the CU (PU) is 64×64 or less, VPDU=64×64 holds, and BIO_MAX_SAD_BLOCK_SIZE is 2 (sPU=32×32). In the case of the upper part of FIG. 36, the PU is partitioned into four sPUs that do not cross over the VPDU boundaries.

As described above, in the third embodiment of the present technology, a PU is virtually partitioned into a plurality of sPUs with separately given information, and whether to apply BIO is determined for each sPU. With this, the buffer size can be further reduced as compared to the buffer size in the case of by using vPUs.

4. Fourth Embodiment (Example in which Use of BIO Is Prohibited)

In a fourth embodiment, in a case where PUs are larger than VPDUs, the use of BIO is constrained. With this, the buffer size can be reduced.

<Operation Example of Inter Prediction Unit>

Figure 37:
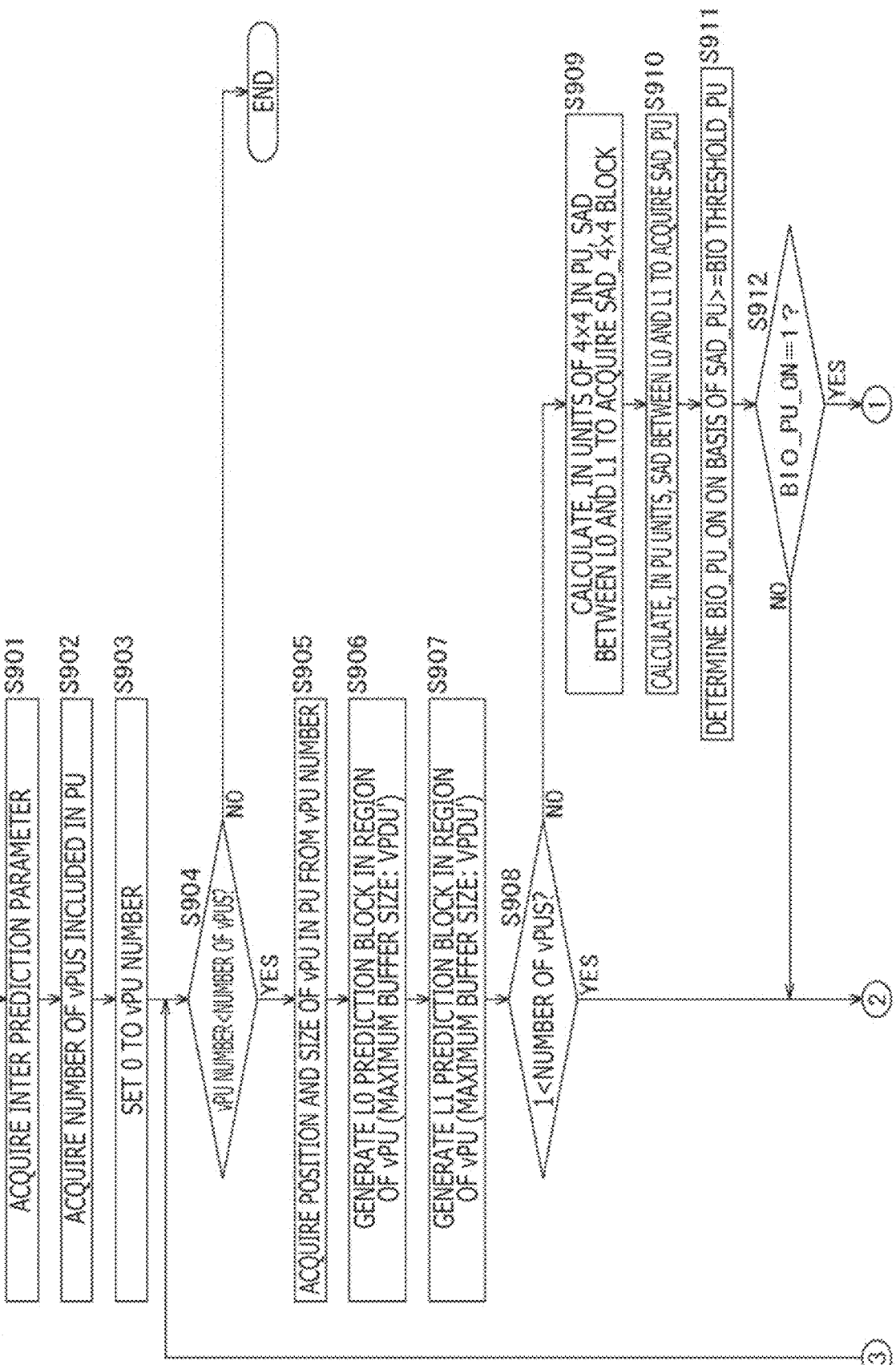
FIG. 37 is a flowchart illustrating, as an operation example according to a fourth embodiment of the present technology, BIO-included Bi prediction that is performed by the inter prediction unit 51.
Figure 38:
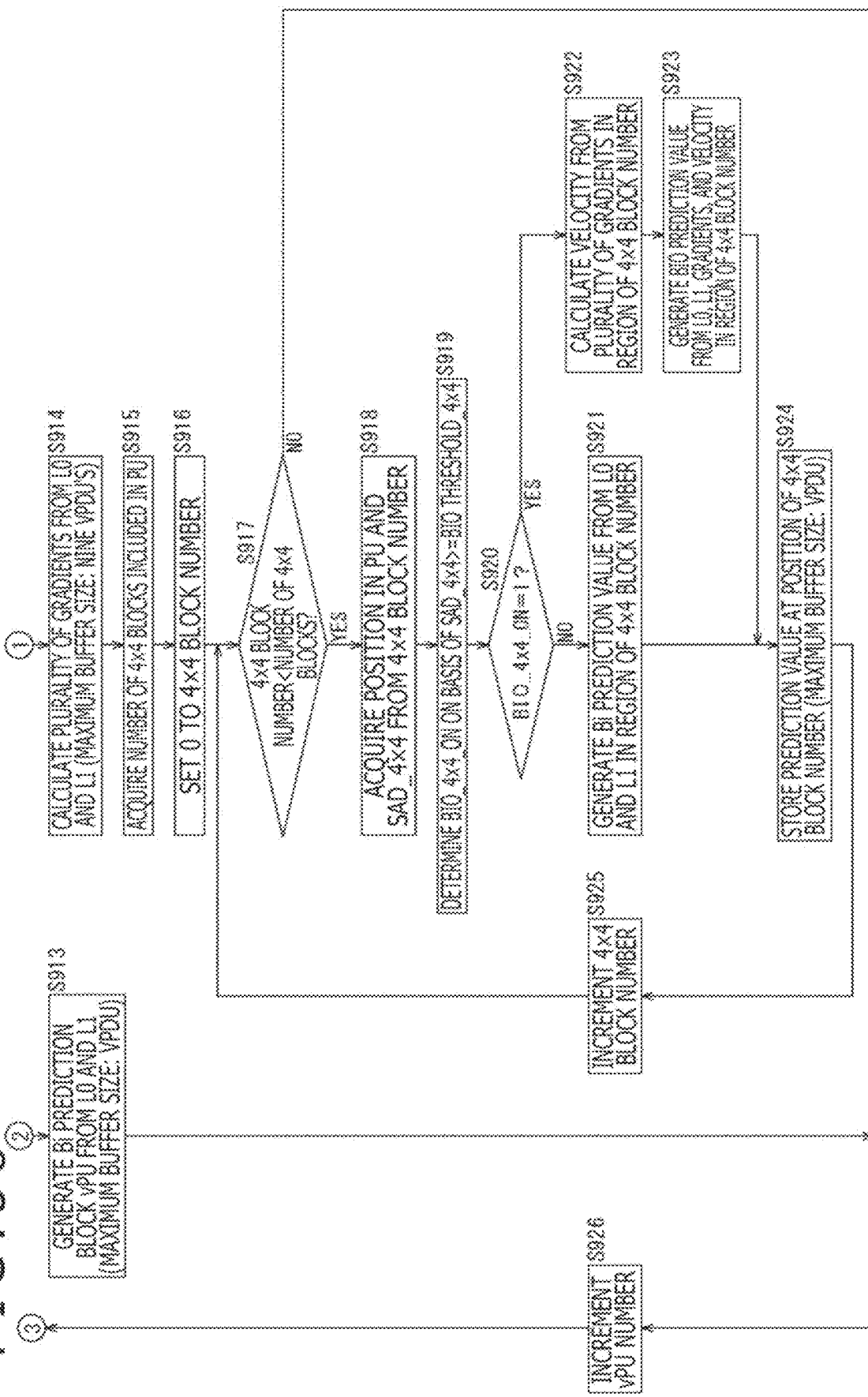
FIG. 38 is a flowchart illustrating, as the operation example according to the fourth embodiment of the present technology, the BIO-included Bi prediction that is performed by the inter prediction unit 51, which is a continuation of FIG. 37.

FIG. 37 and FIG. 38 are flowcharts illustrating, as an operation example according to the fourth embodiment of the present technology, BIO-included Bi prediction that is performed by the inter prediction unit 51.

In Steps S901 to S907 and S926 of FIG. 37 and FIG. 38, processing basically similar to that in Steps S401 to S407 and S425 of FIG. 17 and FIG. 18 is performed, and hence the description thereof, which is redundant, is appropriately omitted. Further, in Steps S909 to S925 of FIG. 37 and FIG. 38, processing basically similar to that in Steps S304 to S320 of FIG. 15 and FIG. 16 is performed, and hence the description thereof, which is redundant, is appropriately omitted.

In Step S907, the L1 prediction block generation unit 203 generates an L1 prediction block in the region of the vPU number.

In Step S908, the inter prediction control unit 201 determines whether or not 1<the number of vPUs holds.

In a case where it is determined in Step S908 that 1<the number of vPUs does not hold, the processing proceeds to Step S909. In a case where the number of vPUs is 1, that is, vPU=PU holds, the processing subsequent to Step S909 is similar to the processing subsequent to Step S309 of FIG. 15.

In a case where it is determined in Step S908 that 1<the number of vPUs holds, the processing proceeds to Step S913 of FIG. 38.

Further, in a case where it is determined in Step S912 that the BIO_vPU_ON flag is not 1, the processing proceeds to Step S913 since BIO is not effective to the entire vPU.

In Step S913, the Bi prediction block generation unit 206 generates a Bi prediction block vPU from the L0 prediction image supplied from the L0 prediction block generation unit 202 and the L1 prediction image supplied from the L1 prediction block generation unit 203. The generated Bi prediction block vPU is stored in the buffer and supplied from the Bi prediction block generation unit 206 to the Bi prediction block selection unit 208.

As described above, in FIG. 37 and FIG. 38, between Step S907 to S913, Step S908 is added as the conditional branch step for determining whether or not there are a plurality of vPUs, that is, whether or not a PU is larger than a VPDU.

In a case where the PU is larger than the VPDU, the processing proceeds from Step S908 to normal Bi prediction in Step S913 in which BIO is not used and SAD value calculation for the entire PU is unnecessary, and hence, as in FIG. 4, the PU can be partitioned into virtual vPUs to be processed.

The processing in Steps S909 to S925, which come after the branch in Step S908, is similar to that in the related-art BIO-included Bi prediction (S304 to S320 of FIG. 15 and FIG. 16). However, the processing proceeds to Step S909 in a case where the PU is equal to or smaller than the VPDU, and hence SAD calculation for the entire PU only uses a resource equal to or smaller than the VPDU.

5. Fifth Embodiment (Example in which BIO Is Always Applied)

In a fifth embodiment, in a case where PUs are larger than VPDUs, BIO is always applied so that the buffer size is reduced.

<Operation Example of Inter Prediction Unit>

Figure 39:
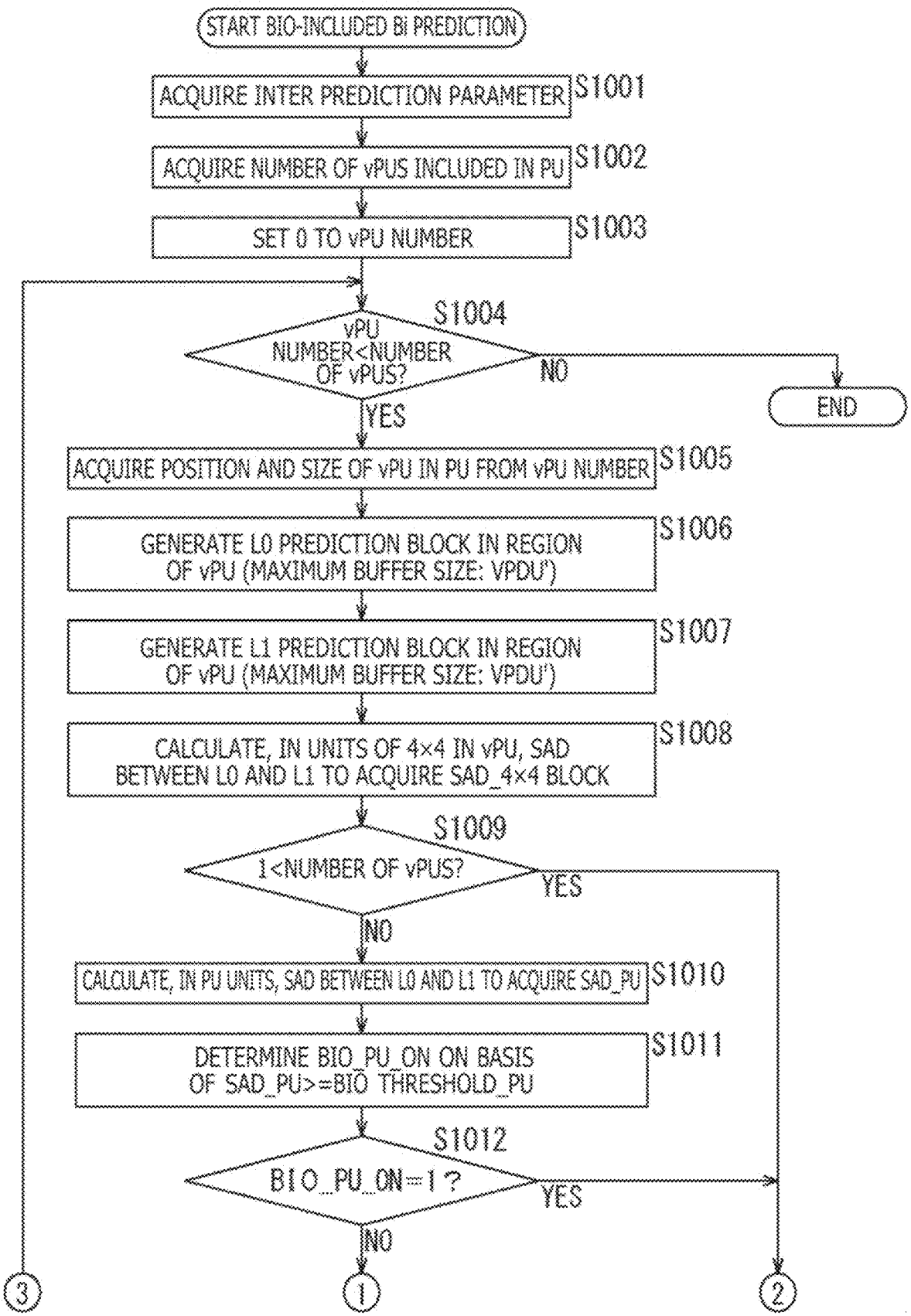
FIG. 39 is a flowchart illustrating, as an operation example according to a fifth embodiment of the present technology, BIO-included Bi prediction that is performed by the inter prediction unit 51.
Figure 40:
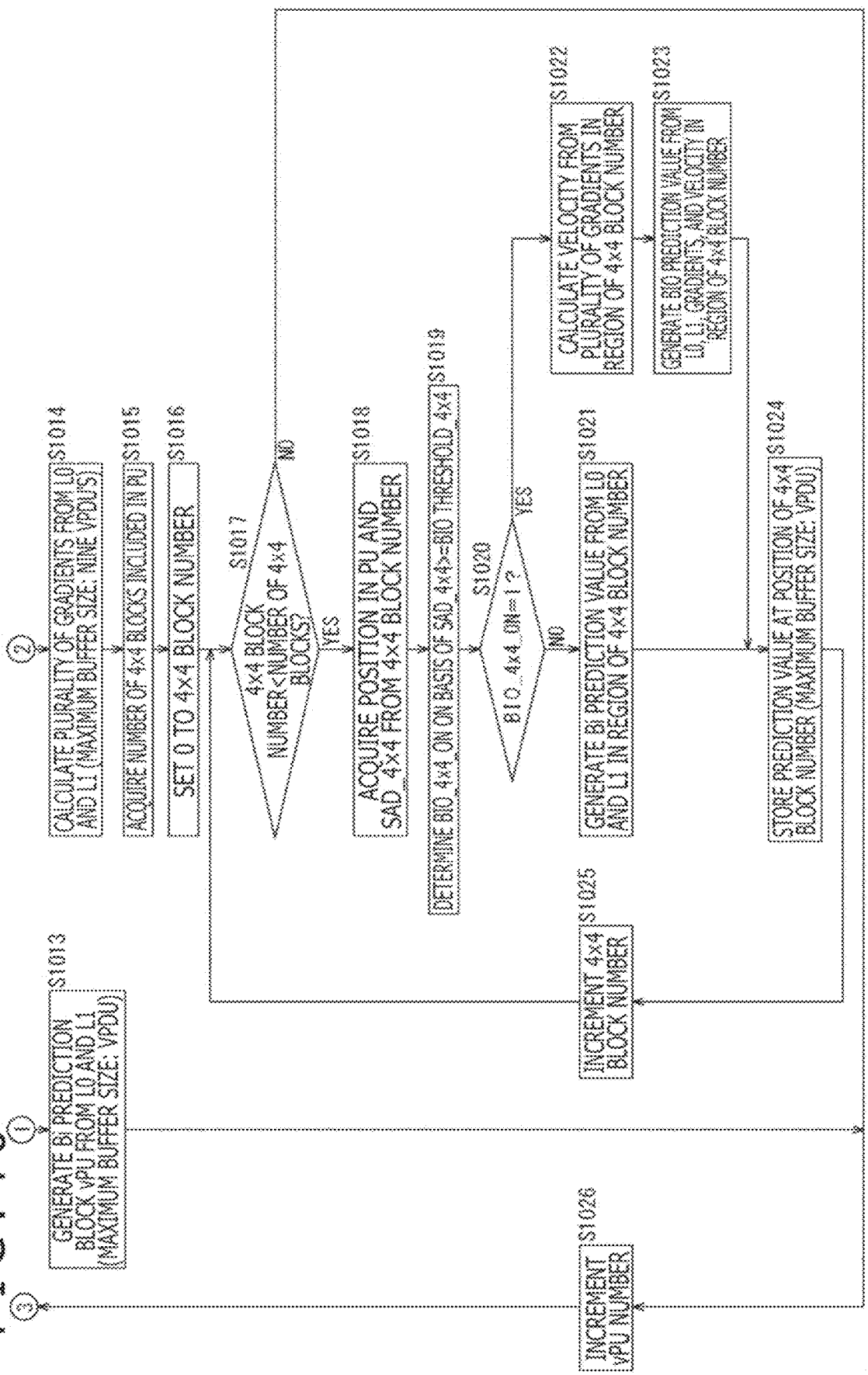
FIG. 40 is a flowchart illustrating, as the operation example according to the fifth embodiment of the present technology, the BIO-included Bi prediction that is performed by the inter prediction unit 51, which is a continuation of FIG. 39.

FIG. 39 and FIG. 40 are flowcharts illustrating, as an operation example according to the fifth embodiment of the present technology, BIO-included Bi prediction that is performed by the inter prediction unit 51.

In Steps S1001 to S1008 and S1026 of FIG. 39 and FIG. 40, processing basically similar to that in Steps S401 to S408 and S425 of FIG. 17 and FIG. 18 is performed, and hence the description thereof, which is redundant, is appropriately omitted. Further, in Steps S1014 to S1025 of FIG. 39 and FIG. 40, processing basically similar to that in Steps S309 to S320 of FIG. 15 and FIG. 16 is performed, and hence the description thereof, which is redundant, is appropriately omitted.

In Step S1008, the BIO cost calculation unit 204 calculates, in units of 4×4 in the vPU, the SAD of the L0 prediction image supplied from the L0 prediction block generation unit 202 and the L1 prediction image supplied from the L1 prediction block generation unit 203. The SADs calculated in units of 4×4 are accumulated so that SAD_4×4 block that is the sum of the SADs is acquired.

In Step S1009, the inter prediction control unit 201 determines whether or not 1<the number of vPUs holds.

In a case where it is determined in Step S1009 that 1<the number of vPUs does not hold, the processing proceeds to Step S1010.

In Step S1010, the BIO cost calculation unit 204 calculates, in units of PUs, the SAD of the L0 prediction image supplied from the L0 prediction block generation unit 202 and the L1 prediction image supplied from the L1 prediction block generation unit 203. The SADs calculated in units of PUs are accumulated so that SAD_PU that is the sum of the SADs is acquired. The acquired SAD_PU is supplied from the BIO cost calculation unit 204 to the BIO application determination unit 205.

In Step S1011, the BIO application determination unit 205 determines the BIO_PU_ON flag on the basis of SAD_PU>=BIO threshold_PU. SAD_PU is supplied from the BIO cost calculation unit 204 and BIO threshold_PU is supplied from the inter prediction control unit 201.

In Step S1012, it is determined whether or not the BIO_PU_ON flag is 1.

In a case where it is determined in Step S1012 that the BIO_PU_ON flag is not 1, the processing proceeds to Step S1013 of FIG. 40 since BIO is not effective to the entire vPU.

In Step S1013, the Bi prediction block generation unit 206 generates a Bi prediction block vPU from the L0 prediction image supplied from the L0 prediction block generation unit 202 and the L1 prediction image supplied from the L1 prediction block generation unit 203. The generated Bi prediction block vPU is stored in the buffer and supplied from the Bi prediction block generation unit 206 to the Bi prediction block selection unit 208.

In a case where it is determined in Step S1012 that the BIO_PU_ON flag is 1, the processing proceeds to Step S1014 of FIG. 40.

Further, in a case where it is determined in Step S1009 that 1<the number of vPUs holds, the processing proceeds to Step S1014.

In Step S1014 and the later steps, BIO processing similar to that in Steps S309 to S320 of FIG. 15 is performed.

As described above, in FIG. 39 and FIG. 40, in Step S1009, the conditional branch for determining whether or not there are a plurality of vPUs, that is, whether or not a PU is larger than a VPDU is added.

In a case where the PU is larger than the VPDU, the processing bypasses the SAD calculation to the threshold determination in S1010 to S1012 to proceed to the BIO application processing in Step S1014 and the later steps so that SAD calculation for the entire PU is not necessary, and hence, as in FIG. 4, the PU can be partitioned into virtual vPUs to be processed.

The processing proceeds to Step S1010 to S1012 in a case where the PU is equal to or smaller than the VPDU, and hence SAD calculation for the entire PU only uses a resource equal to or smaller than the VPDU.

Note that, the fifth embodiment is not applicable to FRUC and DMVR because of the following reason. Since SAD calculation in BIO is for the purpose of early termination, the cost calculation can be avoided with another criterion such as the PU size as in the fifth embodiment. Cost calculation in FRUC and DMVR is, however, key processing in MV correction, and is difficult to avoid.

As described above, according to the present technology, a unit of processing in calculation of a cost that is used for determining whether to perform bidirectional prediction such as BIO or not is partitioned into partitioned processing units each of which corresponds to the VPDU size (for example, vPU) or is equal to or smaller than the VPDU size (for example, sPU), and the determination is made by using the cost calculated on the basis of the partitioned processing units. With this, the buffer size can be reduced.

VVC can be implemented with BIO so that the necessary sizes of the various buffers can be reduced to ¼ of the related-art buffer sizes.

Further, the HW configuration can be optimized so that BIO can be implemented with the buffers, some of which have sizes greatly smaller than ¼ of the related-art sizes.

6. Sixth Embodiment (Computer)

<Configuration Example of Computer>

The series of processing processes described above can be executed by hardware or software. In a case where the series of processing processes is executed by software, a program configuring the software is installed on a computer incorporated in dedicated hardware or a general-purpose personal computer from a program recording medium.

Figure 41:
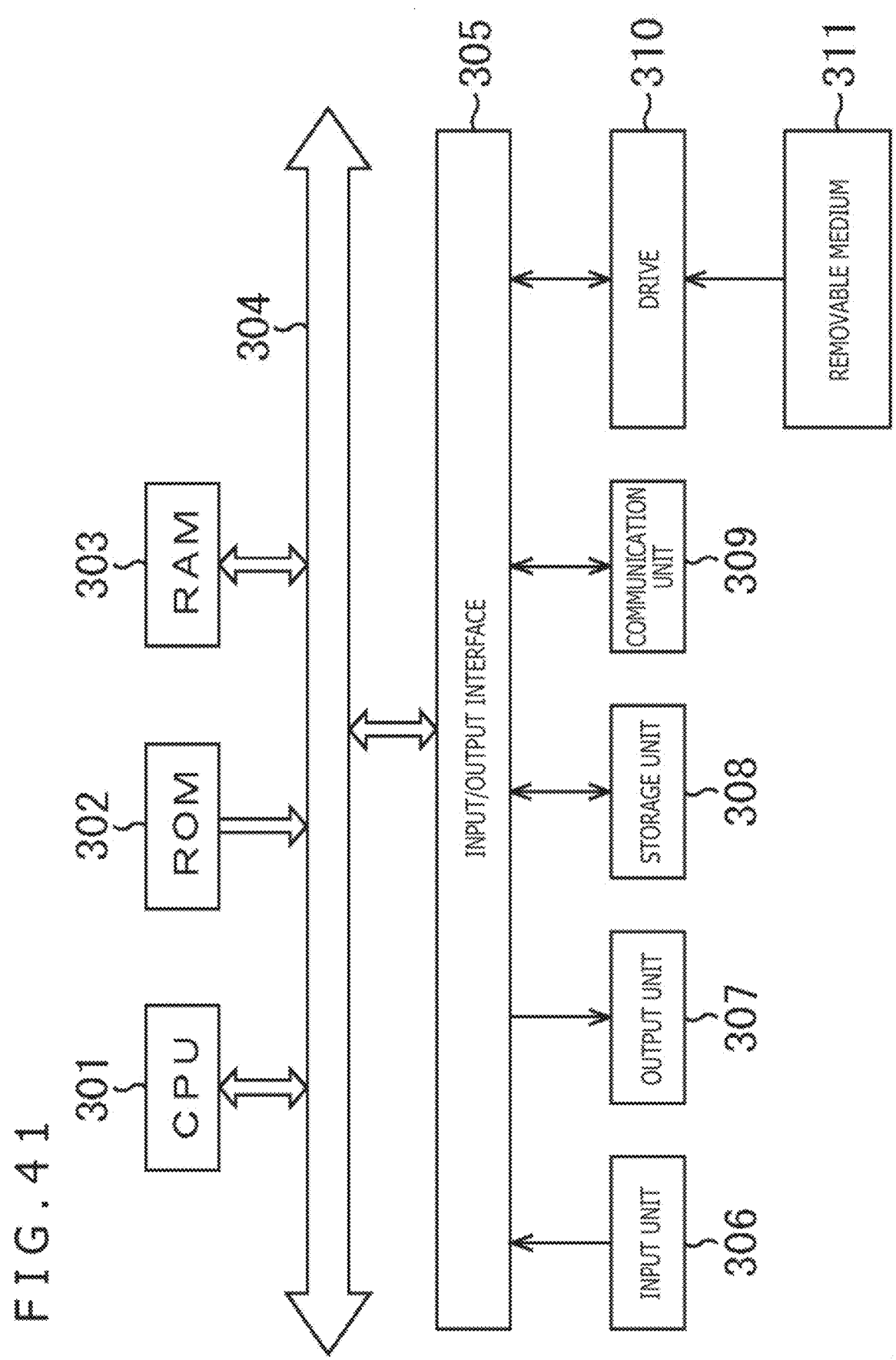
FIG. 41 is a block diagram illustrating a configuration example of a computer.

FIG. 41 is a block diagram illustrating a configuration example of the hardware of a computer configured to execute the above-mentioned series of processing processes with the program.

A CPU (Central Processing Unit) 301, a ROM (Read Only Memory) 302, and a RAM (Random Access Memory) 303 are connected to each other through a bus 304.

An input/output interface 305 is further connected to the bus 304. The input/output interface 305 is connected to an input unit 306 including a keyboard, a mouse, or the like and an output unit 307 including a display, a speaker, or the like. Further, the input/output interface 305 is connected to a storage unit 308 including a hard disk, a non-volatile memory, or the like, a communication unit 309 including a network interface or the like, and a drive 310 configured to drive a removable medium 311.

In the computer configured as described above, for example, the CPU 301 loads the program stored in the storage unit 308 into the RAM 303 through the input/output interface 305 and the bus 304 and executes the program to perform the series of processing processes described above.

The program that is executed by the CPU 301 can be recorded on the removable medium 311 to be installed on the storage unit 308, for example. Alternatively, the program can be provided via a wired or wireless transmission medium such as a local area network, the Internet, or digital satellite broadcasting to be installed on the storage unit 308.

Note that, as for the program that is executed by the computer, the processing processes of the program may be performed chronologically in the order described herein or in parallel. Alternatively, the processing processes may be performed at appropriate timings, for example, when the program is called.

Note that, a system herein means a set of plural components (devices, modules (parts), or the like), and it does not matter whether or not all the components are in the same housing. Thus, plural devices that are accommodated in separate housings and connected to each other via a network, and a single device in which plural modules are accommodated in a single housing are both systems.

Note that, the effects described herein are only exemplary and not limited, and other effects may be provided.

The embodiment of the present technology is not limited to the embodiments described above, and various modifications can be made without departing from the gist of the present technology.

For example, the present technology can be implemented as cloud computing in which a single function is shared and processed by plural devices via a network.

Further, the steps of the flowcharts described above may be executed by a single device or shared and executed by plural devices.

Further, in a case where plural processing processes are included in a single step, the plural processing processes included in the single step can be executed by a single device or shared and executed by plural devices.

<Combination Examples of Configurations>

The present technology can also take the following configurations.

(1)

An image processing device including:
a control unit configured to partition a unit of processing into partitioned processing units each of which corresponds to a VPDU size or is equal to or smaller than the VPDU size, the unit of processing being used for calculation of a cost that is used for determining whether or not to perform bidirectional prediction; and
a determination unit configured to make the determination by using the cost calculated based on the partitioned processing units.

(2)

The image processing device according to Item (1), in which
the determination unit makes the determination by using the cost calculated by each of the partitioned processing units.

(3)

The image processing device according to Item (1), in which
the determination unit makes, by using the cost calculated for a first one of the partitioned processing units, the determination on the first one of the partitioned processing units, and makes the determination on another of the partitioned processing units by using a result of the determination on the first one of the partitioned processing units.

(4)

The image processing device according to Item (1), in which
the determination unit makes the determination by each of the partitioned processing units by using the cost calculated for each of partial regions in the partitioned processing units.

(5)

The image processing device according to Item (1), in which
the determination unit makes the determination by each of the partitioned processing units based on a flag set to each of the partitioned processing units, the flag indicating whether or not to perform the bidirectional prediction.

(6)

The image processing device according to any one of Items (1) to (5), in which
the bidirectional prediction includes the bidirectional prediction employing BIO.

(7)

The image processing device according to Item (1) or (2), in which
the bidirectional prediction includes the bidirectional prediction employing FRUC or DMVR.

(8)

An image processing method for causing an image processing device to:
partition a unit of processing into partitioned processing units each of which corresponds to a VPDU size or is equal to or smaller than the VPDU size, the unit of processing being used for calculation of a cost that is used for determining whether or not to perform bidirectional prediction; and
make the determination by using the cost calculated based on the partitioned processing units.

REFERENCE SIGNS LIST

1: Encoding device
36: Lossless encoding unit
47: Motion prediction/compensation unit
51: Inter prediction unit
101: Decoding device
132: Lossless decoding unit
201: Inter prediction control unit
202: L0 prediction block generation unit
203: L1 prediction block generation unit
204: BIO cost calculation unit
205: BIO application determination unit
206: Bi prediction block generation unit
207: BIO processing-included Bi prediction block generation unit
208: Bi prediction block selection unit
209: Prediction block selection unit

The invention claimed is:

1. An image decoding device comprising:
circuitry configured to
determine a coding unit used for inter prediction based on Bi-directional optical flow (BIO), wherein the inter prediction based on BIO is bi-prediction based on an optical flow method in which reference frames are referred to for a B picture;
virtually partition the coding unit into pipeline units each having a size of one of 8, 16, 32 and 64, wherein the size is width and length;
acquire a sum of absolute difference (SAD) of respective prediction blocks in the reference frames;
calculate a BIO threshold based on the size of the pipeline unit that is smaller than the coding unit;
determine whether the SAD is less than the BIO threshold; and
set, on the determination that the SAD is less than the BIO threshold, a BIO flag to OFF.

2. The image decoding device of claim 1, wherein the pipeline units each have a size of 8.

3. The image decoding device of claim 1, wherein the pipeline units each have a size of 16.

4. The image decoding device of claim 1, wherein the pipeline units each have a size of 32.

5. The image decoding device of claim 1, wherein the pipeline units each have a size of 64.

6. The image decoding device of claim 1, wherein the bi-prediction employs Frame Rate Up-Conversion or Decoder-side motion vector refinement.

7. The image decoding device of claim 1, wherein the bi-prediction employs Frame Rate Up-Conversion.

8. The image decoding device of claim 1, wherein the bi-prediction employs Decoder-side motion vector refinement.

9. The image decoding device of claim 1, wherein the circuitry is configured to set, on the determination that the SAD is greater than the BIO threshold, the BIO flag to ON.

10. The image decoding device of claim 9, wherein the circuitry is configured to generate, after the BIO flag is set to ON, Bi prediction images from L0 prediction images and L1 prediction images.

11. An image decoding method comprising:
- determining a coding unit used for inter prediction based on Bi-directional optical flow (BIO), wherein the inter prediction based on BIO is bi-prediction based on an optical flow method in which reference frames are referred to for a B picture;
- virtually partitioning the coding unit into pipeline units each having a size of one of 8, 16, 32 and 64, wherein the size is width and length;
- acquiring a sum of absolute difference (SAD) of respective prediction blocks in the reference frames;
- calculating a BIO threshold based on the size of the pipeline unit that is smaller than the coding unit;
- determining whether the SAD is less than the BIO threshold; and
- setting, on the determination that the SAD is less than the BIO threshold, a BIO flag to OFF.

12. The image decoding method of claim 11, wherein the pipeline units each have a size of 8.

13. The image decoding method of claim 11, wherein the pipeline units each have a size of 16.

14. The image decoding method of claim 11, wherein the pipeline units each have a size of 32.

15. The image decoding method of claim 11, wherein the pipeline units each have a size of 64.

16. The image decoding method of claim 11, wherein the bi-prediction employs Frame Rate Up-Conversion or Decoder-side motion vector refinement.

17. The image decoding method of claim 11, wherein the bi-prediction employs Frame Rate Up-Conversion.

18. The image decoding method of claim 11, wherein the bi-prediction employs Decoder-side motion vector refinement.

19. The image decoding method of claim 11, further comprising:
- setting, on the determination that the SAD is greater than the BIO threshold, the BIO flag to ON.

20. The image decoding method of claim 19, further comprising:
- generating, after the BIO flag is set to ON, Bi prediction images from L0 prediction images and L1 prediction images.

* * * * *